United States Patent
Behrens et al.

(10) Patent No.: US 10,934,191 B2
(45) Date of Patent: Mar. 2, 2021

(54) CAPILLARY FOAMS, METHODS OF MAKING THEREOF, AND USES THEREOF INCLUDING FOR MITIGATION OF OIL SPILLS

(71) Applicant: Georgia Tech Research Corporation, Atlanta, GA (US)

(72) Inventors: Sven Holger Behrens, Atlanta, GA (US); James Carson Meredith, III, Marietta, GA (US); Jie Wu, Pearland, TX (US); Yi Zhang, Evanston, IL (US)

(73) Assignee: Georgia Tech Research Corporation, Atlanta, GA (US)

( * ) Notice: Subject to any disclaimer, the term of this patent is extended or adjusted under 35 U.S.C. 154(b) by 873 days.

(21) Appl. No.: 15/257,668

(22) Filed: Sep. 6, 2016

(65) Prior Publication Data
US 2017/0066896 A1    Mar. 9, 2017

Related U.S. Application Data

(60) Provisional application No. 62/214,566, filed on Sep. 4, 2015, provisional application No. 62/241,922, filed on Oct. 15, 2015.

(51) Int. Cl.
*B03D 1/012* (2006.01)
*B03D 1/01* (2006.01)
(Continued)

(52) U.S. Cl.
CPC .......... *C02F 1/681* (2013.01); *B01D 17/0205* (2013.01); *B01D 17/0214* (2013.01);
(Continued)

(58) Field of Classification Search
CPC .... C02F 1/24; C02F 1/681; C02F 1/40; C02F 2101/32; B01D 17/0205; B01D 17/12;
(Continued)

(56) References Cited

U.S. PATENT DOCUMENTS 4,203,837 A * 5/1980 Hoge .................. B03D 1/02
209/166
5,338,766 A  8/1994 Phan et al.
(Continued)

FOREIGN PATENT DOCUMENTS

DE    102011106834 B3    9/2012

OTHER PUBLICATIONS

Wege, H. A. et al, Long Term Stabilization of Foams and Emulsions with In-Situ Formed Microparticles from Hydrophobic Cellulose, Jul. 23, 2008, Langmuir, vol. 24, pp. 9245-9253. (Year: 2008).*
(Continued)

*Primary Examiner* — Thomas M Lithgow
(74) *Attorney, Agent, or Firm* — Thomas|Horstemeyer, LLP

(57) ABSTRACT

Methods of making various capillary foams are provided. The foams can include liquid foams having a plurality of particles connected by a network of a secondary fluid at the interface between the discontinuous and continuous phase. The foams can also include solid foams where the continuous phases (bulk fluid) is removed to produce the solid foam having high overall porosities and low densities. Densities as low as 0.3 g cm$^{-3}$ and porosities as high as 95% or higher can be achieved. The secondary fluid can be polymerized to further strengthen the solid foam. Methods and devices are also provided for oil recovery from water using a capillary foam. The methods can include forming a capillary foam wherein the oil is the secondary fluid, and wherein the foam can transport the oil to the surface of the water.

17 Claims, 44 Drawing Sheets

(51) Int. Cl.
*B03D 1/006* (2006.01)
*B03D 1/016* (2006.01)
*C02F 1/68* (2006.01)
*B01D 17/02* (2006.01)
*C02F 1/24* (2006.01)
*B01D 17/12* (2006.01)
*B01D 19/02* (2006.01)
*C02F 101/32* (2006.01)
*C02F 1/40* (2006.01)
*B03D 1/02* (2006.01)

(52) U.S. Cl.
CPC .............. *B01D 17/12* (2013.01); *B01D 19/02* (2013.01); *B03D 1/006* (2013.01); *B03D 1/01* (2013.01); *B03D 1/012* (2013.01); *B03D 1/016* (2013.01); *C02F 1/24* (2013.01); *B03D 1/02* (2013.01); *C02F 1/40* (2013.01); *C02F 2101/32* (2013.01)

(58) Field of Classification Search
CPC ...... B01D 17/0214; B01D 19/02; B03D 1/02; B03D 1/012; B03D 1/01; B03D 1/006; B03D 1/016
USPC .......................................................... 252/61
See application file for complete search history.

(56) References Cited

U.S. PATENT DOCUMENTS

| | | | |
|---|---|---|---|
| 5,750,585 A | 5/1998 | Park et al. | |
| 6,068,054 A | 5/2000 | Bragg | |
| 6,959,815 B2 * | 11/2005 | Xu | B03D 1/02 209/166 |
| 8,100,178 B2 | 1/2012 | Bragg et al. | |
| 8,196,750 B2 | 6/2012 | Kanel et al. | |
| 2011/0202016 A1 | 8/2011 | Zugates et al. | |
| 2015/0175876 A1 | 6/2015 | Resasco et al. | |
| 2015/0198018 A1 | 7/2015 | Farajzadeh et al. | |

OTHER PUBLICATIONS

Zhang, S. et al, Aqueous Foams Stabilized with Particles and Nonionic Surfactants, 2008, Colloids and Surfaces A: Physicochem. Eng. Aspects, vol. 324, pp. 1-8. (Year: 2008).*
Lam S., et al, Pickering Stabilization of Foams and Emulsions with Particles of Biological Origins, 2014, Current Opinions in Colloid & Interface Science, vol. 19, pp. 490-500 (Year: 2014).*
Everitt, et al., Bubble Growth in a Two-Dimensional Viscoelastic Foam, Journal of Non-Newtonian Fluid Mechanics (2006) 1-33.
Zhang, et al., Stabilization of Liquid Foams through the Synergistic Action of Particles and an Immiscible Liquid, Angew Chem 126 (2014) 13603-13607.
Zhang, et al., Capillary Foams: Stabilization and Functionalization of Porous Liquids and Solids, Langmuir 31 (2015) 2669-2676.
Zhang, et al., Bubble Meets Droplet: Particle-Assisted Reconfiguration of Wetting Morphologies in Colloidal Multiphase Systems (2016) 1-11.
Binks, Curr. Opin. Colloid Interface Sci 7 (2002) 21-41.
Lee, et al., Ind. Eng. Chem. Res. 52 (2013) 66-72.
Su, L., Z. Xu, and J. Masliyah, Role of oily bubbles in enhancing bitumen flotation. Minerals Engineering, 2006. 19: p. 641-650.
Calcagnile, P., et al., Magnetically Driven Floating Foams for the Removal of Oil Contaminants from Water. ACS Nano, 2012. 6: p. 5413-5419.
Li, H., L. Liu, and F. Yang, Covalent assembly of 3D graphene/polypyrrole foams for oil spill cleanup. J. Mater. Chem. A, 2013. 1: p. 3446.

* cited by examiner

14A

14B

14C

14D

CAPILLARY FOAMS, METHODS OF MAKING THEREOF, AND USES THEREOF INCLUDING FOR MITIGATION OF OIL SPILLS

CROSS-REFERENCE TO RELATED APPLICATIONS

This application claims priority to, and the benefit of, co-pending U.S. provisional application entitled "LIGHT WEIGHT POROUS MATERIALS (CAPILLARY FOAMS)" having Ser. No. 62/214,566, filed Sep. 4, 2015 and co-pending U.S. provisional application entitled "MOBILITY AND CONFORMANCE CONTROL IN ENHANCED OIL RECOVERY BY USING PARTICLE-OIL STABILIZED CAPILLARY FOAMS" having Ser. No. 62/241,922, filed Oct. 15, 2015, the contents of which are incorporated by reference in their entirety.

STATEMENT REGARDING FEDERALLY SPONSORED RESEARCH OR DEVELOPMENT

This invention was made with government support under awards CBET-1134398 and CBET-1160138 awarded by the National Science Foundation and award FA9550-10-1-0555 awarded by the Air Force Office of Scientific Research. The government has certain rights in the invention.

TECHNICAL FIELD

The present disclosure generally relates to capillary foams and methods of making and uses thereof.

BACKGROUND

The worldwide demand for petroleum-based products continues to increase, yet every year more than 1.2 million tons of hydrocarbons spill into marine environments (GE-SAMP, *Estimates of oil entering the marine environment from sea-based activities,* 2007, International Maritime Organization: London). In fact, 80% of the largest spills occur offshore, and the largest of these was the 4.9 million barrels of crude oil released into the Gulf of Mexico (GoM) during the BP Deepwater Horizon incident in 2010 (Etkin, *Historical overview of oil spills from all sources* (1960-1998), in *Proceedings of the* 1999 International Oil Spill Conference, 1999, API: Washington, D.C., 1097-1102; Kerr, Science 2010, 329: 734-735). It is now recognized that the arsenal of technologies available to contain and recover oil from deepwater well leaks is inadequate. Some reports estimate that up to 75% of the BP Horizon released oil was never recovered and continued to pollute shores and marshes for several years (Kerr, Science 2010, 329: 734-735; Wang, *Colloid Chemistry-Based Principles and Solutions,* Somasundaran, et al., eds., 2014, Wiley: Hoboken, N.J.). The use of dispersants to break up the leaking oil plume into droplets may have actively done harm to marine life (Kujawinski, et al., *Environ. Sci. Technol.* 2011, 45:1298-1306). Yet, deep water wells continue to be planned in the GoM, including new wells at nearly 3 km depth, twice that of the BP Horizon. New containment and recovery approaches for deep well leaks are needed in order to contain oil at the leak site of the leak and direct it rapidly towards the surface in order to recover or remediate it before oil disperses, forms emulsions or reaches shorelines and marshes.

Containment of surface oil slicks by current technology calls for the rapid deployment of booms to confine the oil, followed by recovery using surface vessels equipped with skimming equipment. During the BP Horizon leak, dispersants were both applied to the surface and were injected directly in the vicinity of the deep-well leak. However, recent studies recognize that dispersants prevented oil from rising to the surface quickly where it could be recovered and question their utilization. Solidification of surface oil slicks is a less-common technology, involving addition of polymerizer or cross-linker to solidify surface oil and allow it to be collected as a solid. It is not broadly accepted because of the difficulty of recovering solids with current skimming equipment and the large amount of solidifier often necessary, with deleterious effects on marine health. The existing literature proposes a number of solid foam systems that can be applied only at the surface and function by absorbing oil from water or by supporting microbes for bioremediation.

There remains a need for improved systems and compositions, and improved methods of mediation of oil spills that overcome the aforementioned deficiencies.

SUMMARY

In various aspects, a variety of capillary foams and methods of making capillary foams are provided. The capillary foams can include liquid foams, i.e. having a continuous liquid phase, or solid foams, i.e. foams where the continuous liquid phase has been removed and that still maintain structural integrity. The capillary foams are stabilized by the absorption of particles and a small amount of a secondary fluid at the interface between the discontinuous phase and the continuous phase. The synergistic action between the particles and the secondary fluid can provide for foams with overall low densities and very high porosities while still maintaining structural integrity. In various aspects, the secondary fluid can be further reacted to polymerize or to cross-link the particles, thereby providing additional stability to the foam.

In a variety of embodiments, methods for producing high-strength lightweight foams are provided. Mixing a liquid dispersion of colloidal particles with a small amount (0.05%-10 wt %) of a secondary liquid that is immiscible with the dispensing medium (primary liquid) can lead to the formation of a network (gel) of particles, held together by bridges of the secondary liquid and capable of entrapping gas bubbles introduced e.g. by mechanical frothing. When such a foamed gel dries, the resulting solid foam can have pores originating from the immobilized gas bubbles in addition to the porosity of the particle network in the originally wet part of the foam. The result is a low weight, high porosity foam.

In various aspects, methods of making a liquid foam are provided. In some embodiments, the methods can include (a) forming a suspension of particles in a bulk fluid, (b) mixing the suspension with a secondary liquid to form a Pickering emulsion, and (c) mixing the Pickering emulsion with a gas to form the liquid foam. In some embodiments, the methods can include (a) forming a suspension of particles in a bulk fluid, (b) mixing the suspension with a secondary liquid to form a capillary suspension, and (c) mixing the capillary suspension with a gas to form the liquid foam. In some embodiments, the methods can include (a) forming a suspension of particles in a bulk fluid, (b) mixing the suspension with gas to form a Pickering foam, and (c) mixing the Pickering foam with a secondary fluid to form the liquid foam. In some embodiments, the methods can include (a) forming a suspension of particles in a bulk fluid, (b) mixing the suspension with gas to form liquid marbles, and (c) mixing the liquid marbles with a secondary fluid to form the liquid foam. In various embodiments, the liquid foam includes a continuous liquid phase containing the bulk fluid and a discontinuous phase containing the gas, wherein the discontinuous phase is dispersed within the continuous phase to form a plurality of bubbles having an interface between the continuous phase and the discontinuous phase, and wherein the secondary fluid and the particles are adsorbed at the interface between the continuous phase and the discontinuous phase.

A variety of liquid foams are also provided. In various embodiments, the liquid foams can include a continuous liquid phase containing a bulk fluid; a discontinuous phase containing a gas, wherein the discontinuous phase is dispersed within the continuous phase to form a plurality of bubbles having an interface between the continuous phase and the discontinuous phase, and a secondary fluid and a plurality of particles adsorbed at the interface between the continuous phase and the discontinuous phase. The liquid foams can be very stable. For example, in some aspects the liquid foam is stable for a period of time from about 2 days to about 14 days. In various aspects, the bubbles in the liquid foam have an average diameter of about 50 µm to about 500 µm. In various aspects, the particles have an affinity for an interface between the secondary fluid and the gas characterized by a contact angle from about 60° to about 120°. In various aspects, the particles have an affinity for an interface between the secondary fluid and the bulk fluid characterized by a contact angle from about 60° to about 120°. In many aspects, the secondary fluid has an effective spreading coefficient in the liquid foam from about 2 mN m$^{-1}$ to about 100 mN m$^{-1}$ or from about 5 mN m$^{-1}$ to about 100 mN m$^{-1}$.

In various embodiments, methods of making a solid foam are also provided. In some embodiments, the methods can include (a) making a liquid foam according to any method described herein, wherein the liquid foam has (i) a continuous liquid phase containing a bulk fluid, (ii) a discontinuous phase containing a gas, wherein the discontinuous phase is dispersed within the continuous phase to form a plurality of bubbles having an interface between the continuous phase and the discontinuous phase, and (iii) a secondary fluid and a plurality of particles adsorbed at the interface between the continuous phase and the discontinuous phase; and (b) removing the bulk fluid to form the solid foam, wherein the secondary fluid forms a capillary network connecting the particles and forming the plurality of bubbles or pores. In various embodiments, the methods further include polymerizing or reacting the secondary fluid. In some embodiments, the secondary fluid is polymerized to form a polymer network connecting the particles prior to removal of the bulk fluid. In some embodiments, the bulk fluid is removed and then the secondary fluid is polymerized to form a polymer network connecting the particles.

In various embodiments, solid foams are provided. The solid foams can have a solid network of particles connected via a capillary network and forming a plurality of bubbles or pores. The capillary network can include a secondary fluid, wherein the solid foam is formed by removal of the bulk fluid from a liquid foam described herein. In various embodiments, the capillary network is a polymer network connecting the particles and forming a plurality of bubbles or pores. The polymer network can be formed from the polymerization of the secondary fluid. The solid foam can have incredibly low densities, e.g. about 0.03 g cm$^{-3}$ to about 0.3 g cm$^{-3}$. In various aspects, the solid foam has a porosity from about 85% to about 95%.

A variety of particles can be used in the foams and methods described herein. In various aspects, the particles have an average diameter from about 0.05 µm to about 700 µm. In a variety of aspects, the particles can include polymer particles, metal particles, metal oxide particles, silica particles, or combinations thereof. The particles can include biodegradable polymers in some embodiments. In some aspects, the particles can include cellulose or other cellulosic polymers in the particles and/or disposed on the surface of the particles. In some aspects, the particles can include polymers derived from those obtained naturally, such as cellulose, chitin, starches and other polysaccharides, or their derivatives, such as cellulose esters. In some aspects, the particles can include proteins in the particles and/or disposed on the surface of the particles. In various aspects, the particles are present at a concentration from about 0.2 wt % to about 50 wt % or from about 5 wt % to about 50 wt % based upon the weight of the liquid foam or based upon the weight of the solid foam.

A variety of bulk fluids can be used in the various embodiments described herein. In some embodiments, the bulk fluid is water or other aqueous solution. In some embodiments, the bulk fluid is water, $C_1$-$C_5$ alcohols, $C_1$-$C_5$ glycols, $C_1$-$C_5$ aminoalcohols, dimethyl sulfoxide, dimethylformamide, dimethylacetamide, dimethyl sulfone, sulfolane, or a mixture thereof.

A variety of secondary fluids can be used in the various embodiments described herein. In some embodiments, the secondary fluid is trimethylolpropane trimethacrylate (TMPTMA), diisonyl phthalate (DINP), paraffin, or a combination thereof. In some embodiments, the secondary fluid is a substituted or unsubstituted $C_{12}$-$C_{50}$ linear, branched, or cyclic alkane; substituted or unsubstituted phenyl; or a combination thereof. In some embodiments, the secondary fluid includes a photopolymerizable monomer, a crosslinkable monomer, or a combination thereof. In some embodiments, the secondary fluid further includes a photoinitiator. The secondary fluid, in some aspects, further includes a dye molecule. In various embodiments, the secondary fluid is present at a concentration from about 0.5 wt % to about 5 wt % based upon the weight of the bulk fluid.

The various foams and methods described herein can include a variety of gases. In some embodiments, the gas is air. In some aspects, the gas can be air, oxygen, nitrogen, carbon dioxide, helium, neon, argon, or a combination thereof. In some aspects, when the gas is being mixed, e.g. with liquids, suspensions, or foams, the gas can be mixed using a standard frothing technique, using a gas bubbler, or a combination thereof.

The capillary foams and methods of making capillary foams can be utilized in a wide range of technologies, overcoming many of the limitations of traditional surfactant-based foams in mobility and conformance control. In a variety of embodiments described herein, methods of oil recovery from water are provided using the capillary foam technologies. The oil can include crude oil, refined petrochemical products such as diesel, gasoline, jet fuel, fuel oil, and bunker oil, and combinations thereof. The methods provide numerous advantages over conventional oil recovery approaches, and can be applied in a variety of off-shore oil spill situations. The methods of oil recovery from water can include (i) combining the oil with a gas to form gas bubbles having the oil on the surface of the bubbles, and (ii) contacting the bubbles with particles to form a liquid foam having the water as a continuous phase and the gas as a discontinuous phase dispersed within the water, wherein the oil and particles are absorbed at an interface between the continuous phase and the discontinuous phase. In various embodiments, the methods can include forming the liquid foam at or near an oil source deep below the surface of the water. In some aspects, the methods further include allowing the foam to rise to or near the surface of the water, and collecting the foam at or near the surface of the water to remove the oil from the water. The capillary foams formed in this manner can be capable of withstanding very high oil concentrations observed at oil spills, while still maintaining the structural integrity of the foam and without the need for surfactants. In some embodiments, the oil is combined with the gas in a lower compartment of a collector to form the bubbles, and the bubbles are contacted with the particles in an upper compartment of the collector to form the foam. In some embodiments, once the liquid foam is captured, the liquid foam can be contacted with a defoamer to collapse the foam. In some aspects, the oil can be separated from the particles, e.g. such that the particles can be recycle to produce additional foam and remove additional oil.

In some embodiments, devices are provided for performed the oil recovery methods described herein. The devices can include a collector for collecting the oil in the water; a gas inlet for injecting a gas into a lower compartment of the collector to form bubbles in the lower compartment of the collector; and a particle inlet for injecting particles into the collector and configured such that when the particles and the gas are injected into the collector, the particles will contact the bubbles to form a liquid foam having the water as a continuous phase and the gas as a discontinuous phase dispersed within the water, wherein the oil and particles are absorbed at an interface between the continuous phase and the discontinuous phase. In various aspects, the gas inlet is connected to a gas source at or near the surface of the water (e.g. on a ship or tanker at the surface of the water). In various aspects, the particle inlet is connected to a particle source at or near the surface of the water (e.g. on a ship or tanker at the surface of the water). In some aspects, the device further comprises a skimmer capable of collecting the liquid foam at or near the surface of the water.

Other systems, methods, features, and advantages of the capillary foams and methods of making will be or become apparent to one with skill in the art upon examination of the following drawings and detailed description. Other systems, methods, features, and advantages of the devices and methods for oil recovery will also be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Further aspects of the present disclosure will be readily appreciated upon review of the detailed description of its various embodiments, described below, when taken in conjunction with the accompanying drawings.

FIGS. 4A-4B demonstrate wetting morphologies and corresponding effective oil spreading coefficients for the air-hexadecane-water system at different concentrations of hypromellose phthalate particles (HP 55). FIGS. 4C-4D demonstrate wetting morphologies and corresponding effective oil spreading coefficients for the air-TEGDMA-water system at different concentrations of ethyl cellulose (EC) particles. Scale bars are 500 µm.

FIG. 6A is a schematic illustration of the experimental procedure: an air bubble and an oil droplet are brought into contact in a particle-free water phase inside an open microfluidic glass channel, which is then placed in a particle suspension containing either 0.2 wt % HP 55 or 0.4 wt % EC particles. FIG. 6B demonstrates the wetting morphology transition for the air-hexadecane-water system upon exposure to HP 55 particles. FIG. 6C demonstrates the wetting morphology transition for the air-TEGDMA-water system upon exposure to EC particles. Scale bars are 500 µm.

FIGS. 8A-8C are SEM images of a dried capillary foam formed by addition of gas bubbles and 1 wt % TMPTMA as the secondary liquid to suspensions of PE or PVC Vinnolit 1062/7 or glass particles in water with a solids loading of 10 vol. %. The secondary liquid was first solidified by photopolymerization, and then the water was removed by drying. FIGS. 8D-8F are close-up of particles and polymerized secondary liquid surrounding a gas bubble. FIGS. 8G-8I demonstrate the network of particles and polymerized secondary liquid bridges in the aqueous suspension bulk. FIGS. 8J-8L are confocal microscope image of the wet capillary foam with the secondary liquid TMPTMA labelled by Nile red.

FIG. 9A demonstrates the results from an attempt of producing a capillary foam from a silica particle suspension (2 wt %) in the presence of a secondary liquid TMPTMA (3 wt %, with respect to the amount of bulk phase water). FIGS. 9B-9C are SEM images of a dried silica particles suspension. The secondary liquid was solidified by photopolymerization prior to water removal.

(FIG. 13A) Modified silica (Aerosil 200), mean diameter: 619.15 nm. (FIG. 13B) Modified cellulose powder, mean diameter: 33.90 μm. (FIG. 13C) PVC Vinnolit SA/1062/7, mean diameter: 29.59 μm. (FIG. 13D) Aluminum oxide particles, mean diameter: 5.27 μm. (FIG. 13E) Glass (Spheriglass 5000), mean diameter: 4.44 μm. (FIG. 13F) Polyethylene particles, mean diameter: 9.65 μm. (FIG. 13G) Monodisperse silica spheres (SS03N), diameter: 0.96 μm. (FIG. 13H) PVC Vinnolit P70F, mean diameter: 0.93 μm.

(FIG. 14A) Modified silica (Aerosil 200), mean diameter: 619.15 nm. (FIG. 14B) Modified cellulose powder, mean diameter: 33.90 μm. (FIG. 14C) PVC Vinnolit SA/1062/7, mean diameter: 29.59 μm. (FIG. 14D) Aluminum oxide particles, mean diameter: 5.27 μm. (FIG. 14E) Glass (Spheriglass 5000), mean diameter: 4.44 μm. (FIG. 14F) Polyethylene particles, mean diameter: 9.65 μm. (FIG. 14G) Monodisperse silica spheres (SS03N), diameter: 0.96 μm·h) PVC Vinnolit P70F, mean diameter: 0.93 μm.

FIG. 15A demonstrates contract angle smaller than 90°. FIG. 15B demonstrates contact angle larger than 90°.

(FIG. 16B) Schematic of the capillary state, in which drops of the secondary liquid from the center of particle agglomerates. (FIG. 16C) Particle-decorated droplets of Pickering emulsion (particle-stabilized emulsion) formed at much higher volume fraction of the secondary liquid (Butt, *Science* 331, 868-869).

FIG. 17B is a microscopic image of wet capillary foam. FIG. 17C is a dried capillary foam. FIG. 17D is a cross-sectional SEM image of dried foam. FIG. 17E depicts a dry solid made without secondary fluid. FIG. 17F is a cross-sectional SEM image of dry solid formed without secondary fluid.

(FIG. 20B) a cross-sectional SEM image of dried foam.

(FIG. 36A) 4 ms for water. (FIG. 36B) 10 ms for silicone-oil coated bubbles.

DETAILED DESCRIPTION

Figure 1:
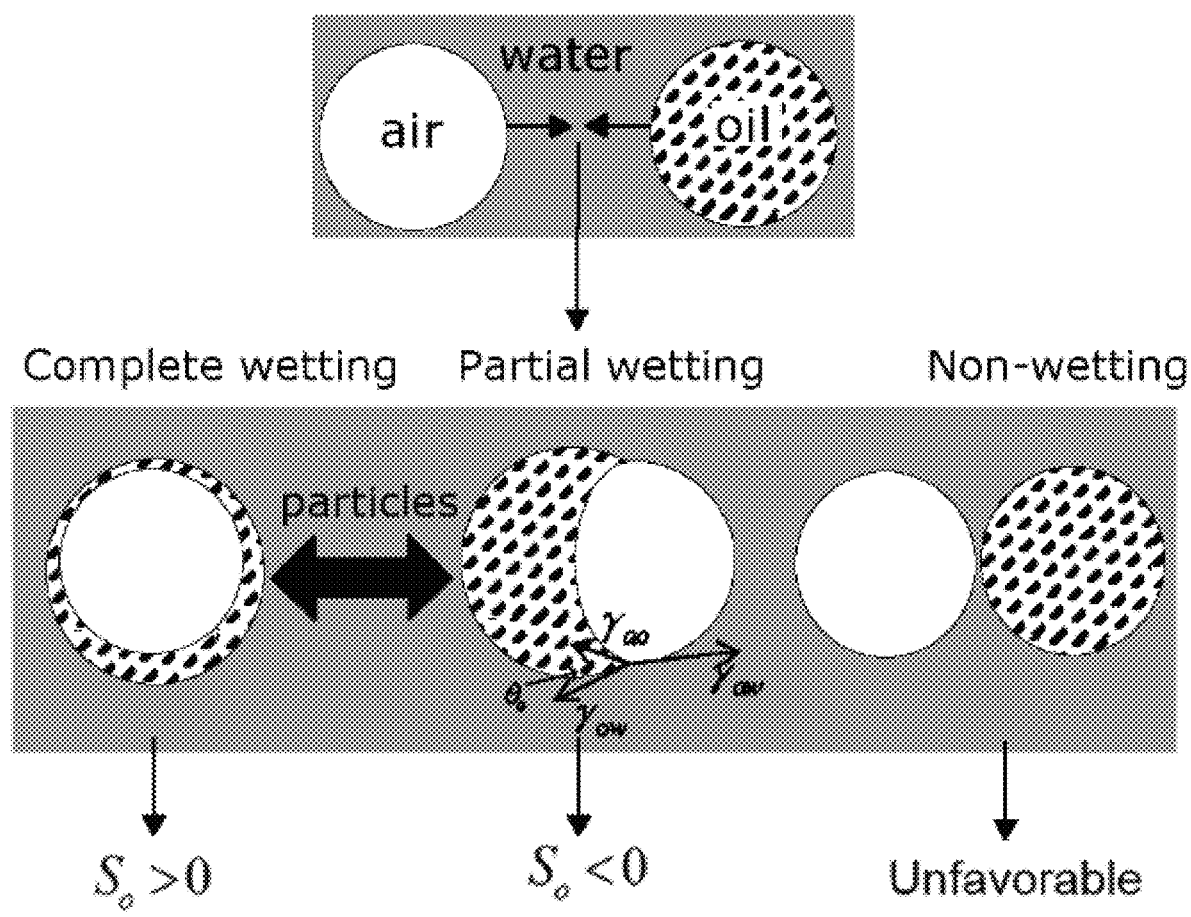
FIG. 1 shows possible wetting morphologies of an air bubble and an oil droplet in water and schematic illustration of the equilibrium contact angle at the three-phase contact line. Here $S_o = \gamma_{aw} - (\gamma_{ao} + \gamma_{ow})$, where a, o, and w denote the air, oil, and water phase, respectively.

In various aspects, the technologies described herein utilize capillary foams to overcome the limitations of traditional surfactant-based foams in mobility and conformance control. Capillary foams are remarkably tolerant to oil—in fact oils can be used to stabilize their formulation. FIGS. 29A-29E show the structure of an exemplary capillary foam. Two characteristics distinguish these foams from surfactant-based and nano-particle-based foams. First, particles aid in the spreading of oil around the gas-water interface, by reducing the exposed surface of air and water. Secondly, capillary bridges between the particles enable a system-spanning network of particles that connect air bubbles, and reduce their mobility. These foams present game-changing opportunities to advance a variety of technologies, including capillary foam enhanced oil recovery (CF-EOR) technology described herein. For oil recovery, a suitable colloidal particle, water, a gas, and an oil phase (crude oil or other hydrocarbon) can be combined into an EOR foam formulation. The bubbles in the capillary foam can be stabilized by an outer coating of the oil-wetted particles, and floes of these bubbles can be held together by bubble-spanning oil bridges between particles. This strategy can have a number of significant benefits versus the state of the art foaming agents, including (i) surfactants are not required, (ii) stability in the presence of oil, and (iii) the ability to use environmentally benign, readily-available (mass-produced) materials such as partially-hydrophobized silica. Surfactants represent a significant cost that also has associated environmental concerns and eliminating surfactant loss through adsorption. Conventional surfactant-based foams are typically unstable in the presence of significant quantities of oil.

Although nanoparticles have been proposed to stabilize bubbles at the $CO_2$-water interface, these approaches still rely upon the presence of added surfactant (Adkins, et al., *Phys. Chem. Chem. Phys.* 2007, 9:48, 6333-6343; Attar-Hamed, et al., *Petr. Sci. Tech.* 014, 32:21, 2549-2558; Manan, et al., *Petr. Sci. Tech.* 2015, 33:12, 1286-1294; Nguyen, et al., *Energy and Fuels* 2014, 28:10, 6221-6227;

Worthen, et al., Aiche Journal 2013, 59:9, 3490-3501; Yu, et al., Fuel 2014, 126, 104-108). In addition, these studies do not consider the more general behavior of the 4-component system that involves usage of a secondary fluid such as oil (either crude oil or another oil) as a synergistic component. Capillary foam technology takes advantage of particle-assisted wetting of oil at the air water interface and the formation of a stabilizing network of capillary-bridged particles between bubbles (FIGS. 29A-29E). These two features are not present in nanoparticle stabilized water-gas or water-$CO_2$ foams.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting. The skilled artisan will recognize many variants and adaptations of the embodiments described herein. These variants and adaptations are intended to be included in the teachings of this disclosure and to be encompassed by the claims herein.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Although any methods and materials similar or equivalent to those described herein can also be used in the practice or testing of the present disclosure, the preferred methods and materials are now described. Functions or constructions well-known in the art may not be described in detail for brevity and/or clarity. Embodiments of the present disclosure will employ, unless otherwise indicated, techniques of nanotechnology, organic chemistry, material science and engineering and the like, which are within the skill of the art. Such techniques are explained fully in the literature.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In some embodiments, the term "about" can include traditional rounding according to significant figures of the numerical value. In addition, the phrase "about 'x' to 'y'", where 'x' and 'y' are numerical values, includes "about 'x' to about 'y'".

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

Wetting Morphologies in Colloidal Multiphase Systems

Wetting phenomena are ubiquitous both in nature and in various industrial processes and products (Myers, *Surfaces, Interfaces, and Colloids: Principles and Applications*, Wiley-VCH, Weinheim, Germany 1991; Wong, et al., *Nature* 2011, 447, 443; Liu, et al., *Angew. Chem. Int. Ed.* 2012, 51, 8348; Tian, et al., *Adv. Mater.* 2014, 26, 6872). When a liquid droplet is put in contact with a flat homogenous solid surface, three distinct wetting configurations may be found: complete wetting, partial wetting, and non-wetting (Liu, et al., *Angew. Chem. Int. Ed.* 2012, 51, 8348; Tian, et al., *Adv. Mater.* 2014, 26, 6872). While the wetting of a solid surface has been intensively studied, the wetting morphologies resulting from the encounter of two immiscible fluid droplets within a fluid medium have received less attention (Myers, *Surfaces, Interfaces, and Colloids: Principles and Applications*, Wiley-VCH, Weinheim, Germany 1991; Wong, et al., *Nature* 2011, 447, 443; Liu, et al., *Angew. Chem. Int. Ed.* 2012, 51, 8348; Tian, et al., *Adv. Mater.* 2014, 26, 6872). Nevertheless, wetting in disperse multiphase systems plays a major role in many industrial processes, related e.g., to encapsulation, enhanced oil recovery, water purification, food technology, or defoaming (Torza, et al., *J. Colloid Interface Sci.* 1970, 33, 67; Pannacci, et al., *Phys. Rev. Lett.* 2008, 101, 164502.1; Guzowski, et al., *Soft Matter* 2012, 8, 7269; Xu, et al., *Lab Chip* 2012, 12, 2029; Yang, et al., *Lab Chip* 2013, 13, 3355; Rodriguez-Rodriguez, et al., *Annu. Rev. Fluid Mech.* 2015, 47, 405; Deng, et al., *Lab Chip* 2013, 13, 4047; Wang, et al., *Langmuir* 2014, 30, 14460; Moosai, et al., *Sep. Purif. Technol.* 2003, 33, 303; Grattoni, et al., *Colloids Surf., A* 2003, 214; Eftekhardad-khah, et al., *Environ. Sci. Technol.* 2013, 47, 14154; Tiarks, et al., *Langmuir* 2001, 17, 9-8; Chu, et al., *Angew. Chem. Int. Ed.* 2007, 46, 8970; Garrett, Defoaming, Marcel Dekker, New York 1993; Denkov, et al., *Adv. Colloid Interface Sci.* 2014, 206, 57; Walther, et al., *Chem. Rev.* 2013, 113, 5194; Lone, et al., *RSC Adv.* 2014, 4, 13322; Huang, et al., *Small* 2014, 10, 1412; Chen, et al., *Langmuir* 2007, 23, 2255;

Evans, et al., *The Colloidal Domain*, Wiley-VCH, Weinheim 2001; Zarzar, et al., *Nature* 2015, 518, 520).

Unlike surfactants, which adsorb at and desorb from an interface readily as an effect of thermal fluctuations, particles with suitable wettability can be strongly adsorbed to the interface of immiscible fluids because of high adsorption energy (Binks, *Curr. Opin. Colloid Interface Sci.* 2002, 7, 21; Binks, et al., *Colloidal Particles at Liquid Interfaces*, Cambridge University Press, Cambridge 2006; Poulichet, et al., *Proc. Natl. Acad. Sci. USA* 2015, 112, 5932). Since the pioneering work of Ramsden and Pickering in the early 20th century, numerous studies have reported the fabrication of ultrastable colloidal multiphase systems, such as foams, emulsions, liquid marbles, colloidosomes, and bijels, using colloidal particles (Ramsden, *Proc. R. Soc.* 1903, 72, 156; Pickering, *J. Chem. Soc. Trans.* 1907, 91, 2001; Alargova, et al., *Langmuir* 2004, 20, 10371; Binks, et al., *Angew. Chem. Int. Ed.* 2005, 44, 3722; Gonzenbach, et al., *Angew. Chem. Int. Ed.* 2006, 45, 3526; Zhang, et al., *Angew. Chem. Int. Ed.* 2014, 126, 13603; Li, et al., *Angew. Chem. Int. Ed. Edit.* 2009, 48, 8490; Destribats, et al., *Langmuir* 2014, 30, 9313; Aussillous, et al., *Nat. Mater.* 2006, 5, 865; Dinsmore, et al., *Science* 2002, 298, 1006; Miguel, *Soft Matter* 2011, 7, 1948; Herzig, et al., *Nat. Mater.* 2007, 6, 966). Particle-stabilized colloidal multiphase systems have applications in cosmetics, food products, wastewater treatment, and oil recovery processes. Goedel found that particles can assist the spreading of trimethylpropane trimethacrylate (TMPTMA) at a planar air-water interface (Xu, et al., *Langmuir* 2003, 19, 4950; Xu, et al., *Angew. Chem. Int. Ed.* 2003, 42, 4694; Ding, et al., *Langmuir* 2005, 21, 1371; Ding, et al., *J. Am. Chem. Soc.* 2006, 128, 4930. It is demonstrated herein that particles can act as both stabilizers and wetting modifiers in colloidal multiphase systems.

It is demonstrated that the wetting configuration of a colloidal multiphase system can be tuned by selection of appropriate colloidal particles, as predicted by an effective spreading coefficient. The wetting and engulfment of an air bubble by an oil droplet in a water medium was used as a model system because it is relevant in a wide variety of industrial processes such as contrast-enhanced ultrasonography, gas flotation, and defoaming (Xu, et al., *Lap Chip* 2012, 12, 2029; Yang, et al., *Lab Chip* 2013, 13, 3355; Rodriguez-Rodriguez, et al., *Annu. Rev. Fluid Mech.* 2015, 47, 405; Moosai, et al., *Sep. Purif. Technol.* 2003, 33, 303; Grattoni, et al., *Colloids Surf, A* 2003, 214, 151; Eftekhardahkhah, et al., *Environ. Sci. Technol.* 2013, 47, 14154; Tiarks, et al., *Langmuir* 2001, 17, 908; Chu, et al., *Angew. Chem. Int. Ed.* 2007, 46, 8970; Garrett, *Defoaming: Theory and Industrial Applications*, Marcel Dekker, New York 1993; Denkov, et al., *Adv. Colloid Interface Sci.* 2014, 206, 57). It is also demonstrated that particles can be used both to promote "bubble wetting" and induce the complete bubble engulfment by an oil drop, or to trigger progressive "bubble dewetting", i.e., to substantially reduce the oil-bubble contact area. A mechanistic understanding of this reconfiguration process was obtained by measuring the effective dynamic surface and interfacial tensions obtained via axisymmetric drop shape analysis. The tunability is attributed to changes in interfacial energy caused by the adsorption of particles at fluid-fluid interfaces.

A variety of high mechanical strength and lightweight foams are provided based on these technologies. Such foams can be used as materials for construction, packaging, thermal insulation and soundproofing. Most traditional polymeric foams are produced by dispersing blowing agents in a polymer solution, and can also be produced by using surfactant-stabilized foams. As demonstrated herein, foams can be generated by introducing gas bubbles in a liquid colloidal dispersion of particles with appropriate wetting properties and strong tendency to adsorb at the gas liquid interface. The adsorption of such particles at the bubble surface substantially lowers the interfacial free energy, which makes removal of the particles from the interface energetically unfavorable and promotes bubble coverage with a dense particle layer that acts as a mechanical barrier against bubble coalescence and film drainage.

Figures 16A, 16B, 16C:
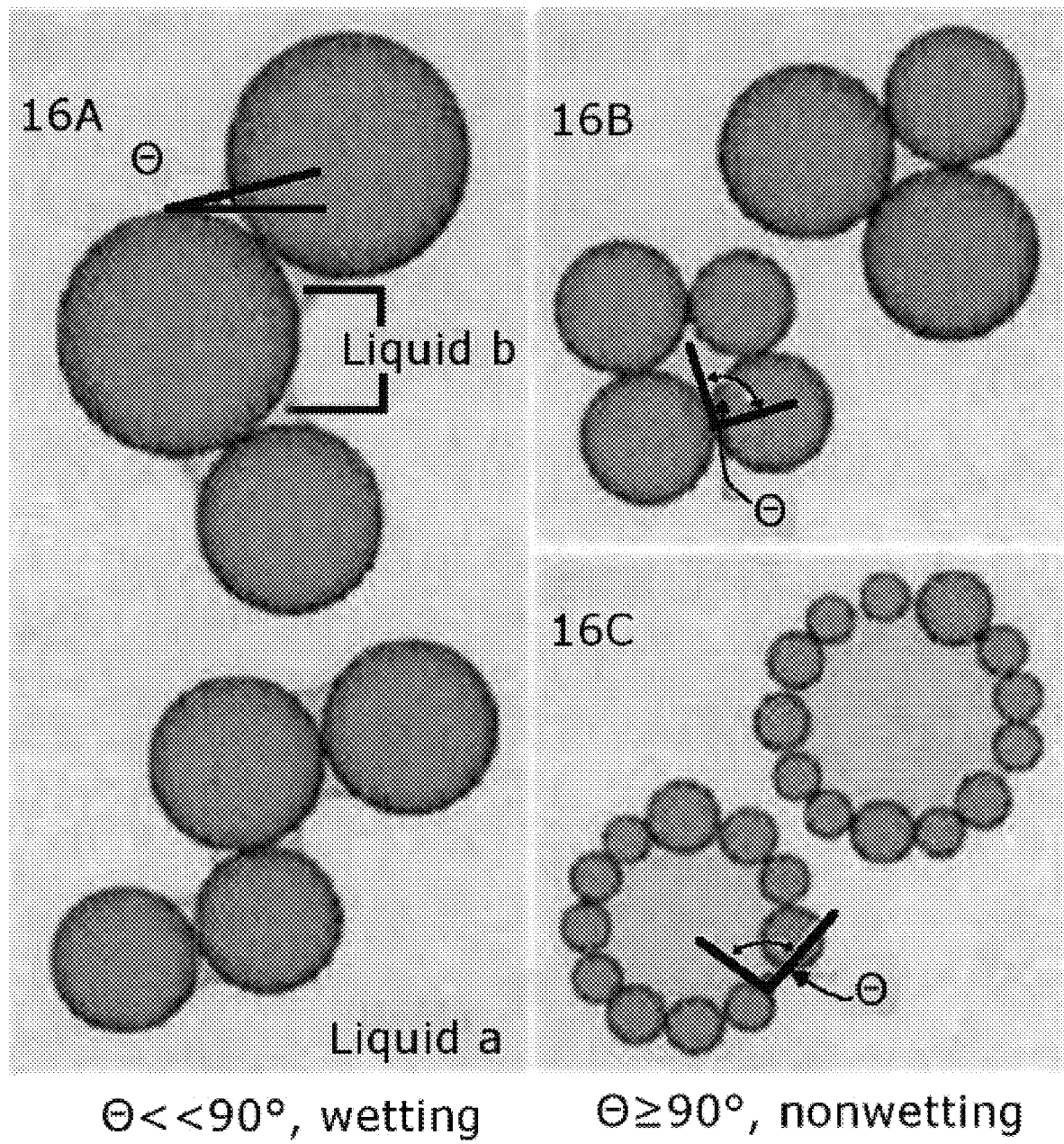
FIGS. 16A-16C show (FIG. 16A) dispersed particles forming a pendular state in a primary liquid a (continuous phase, gray). The particles are kept together by pedular menisci of a second, immiscible liquid b (blue). This happens if the contact angle is low and the added liquid wets the particles.

In 2011 it was reported that the addition of a small amount (0.05-10 wt. %) of an immiscible secondary liquid to a particle suspension can transform it from a viscous fluid into an elastic gel, in which particles at a relatively low volume fraction form a system-spanning network, held together by the strong capillary forces associated with small liquid bridges between the particles, giving the suspension solid-like properties (Koos, et al., *Science* 331, 897-900, 2011). Two different types of liquid bridges and particle network states were distinguished (Butt, *Soft Matter* 9, 3988-3994): the scenario in which particles are preferentially wetted by the bridging secondary liquid is referred to as the pendular state, whereas the scenario of preferential particle wetting by the continuous phase (primary liquid) is referred to as the capillary state (see FIGS. 16A-16C). Liquid bridges in the pendular state tend to connect two particles per bridge and promote the formation of chain-like networks, whereas a typical bridge in the capillary state connects more than two particles. The term capillary suspension has been used to summarily describe "suspensions formed through the addition of a secondary fluid [to a classical particle suspension]" (Koos, et al., *Soft Matter* 8, 3988-3994), which includes suspensions in both the pendular and capillary states.

Capillary Foams

A variety of capillary foams are provided herein. The term "capillary foam," as used herein, refers both to foams having a plurality of particles held together by the strong capillary forces of liquid bridges as well as foams where the liquid bridges have been formed in a liquid state but then reacted to solidify such as though polymerization, crosslinking, or the like. The foams can be liquid foams, i.e. foams having a gaseous discontinuous phase and a liquid continuous phase. The foams can also be solid foams, i.e. having a plurality of pores and/or bubbles formed by a solid network. The solid foams can, in some embodiments, be formed by drying a liquid foam, e.g. by removing the continuous liquid phase from a liquid foam.

In some embodiments, liquid foams are provided having (i) a continuous liquid phase containing a bulk fluid; (ii) a discontinuous phase containing a gas, wherein the discontinuous phase is dispersed within the continuous phase to form a plurality of bubbles having an interface between the continuous phase and the discontinuous phase; and (iii) a secondary fluid and a plurality of particles adsorbed at the interface between the continuous phase and the discontinuous phase. A variety of bulk fluids, secondary fluids, particles, and gases can be used as described herein. In some embodiments, the gas is air and the bulk fluid is water or other aqueous solution.

The liquid foams can be prepared with large bubble diameters. In various aspects, the bubbles have an average diameter of about 10 μm to about 1000 μm, about 50 μm to about 1000 μm, about 100 μm to about 1000 μm, about 250 μm to about 1000 μm, about 250 μm to about 750 μm, about 250 μm to about 500 μm, about 100 μm to about 500 μm, about 50 μm to about 500 μm, about 50 μm to about 250 μm, or about 500 μm to about 750 μm. The liquid foams, while having large bubble sizes and porosities, can remain very stable over an extended period of time. In some aspects, the liquid foam is stable for a period of time from about 1 day to about 14 days, about 2 days to about 14 days, about 3 days to about 14 days, or about 7 days to about 14 days. The foam can be said to be stable, when the volume of the foam decreases by less than about 5% over the period of time.

As described herein, the formation of the capillary bridges can help to stabilize the liquid foams. The particles, adsorbed at the interface of the secondary fluid and the gas or at the interface of the secondary fluid and the bulk fluid can help the secondary fluid spread to cover the surface of the gas bubbles, with the secondary fluid forming strong capillary bridges between the particles. In various aspects, the particles have an affinity for the interface between the secondary fluid and the gas that can be characterized by a contact angle from about 60° to about 120°, from about 70° to about 110°, from about 75° to about 105°, or from about 80° to about 100°. In various aspects, the particles have an affinity for the interface between the secondary fluid and the bulk fluid that can be characterized by a contact angle from about 60° to about 120°, from about 70° to about 110°, from about 75° to about 105°, or from about 80° to about 100°. In some aspects, the affinity of the particles for both interfaces can be characterized by a contact angle from about 60° to about 120°, from about 70° to about 110°, from about 75° to about 105°, or from about 80° to about 100°.

By reducing the exposed surface area of the secondary fluid, the particles can increase the effective spreading coefficient of the secondary fluid when in the liquid foam. The effective spreading coefficient of the secondary fluid in the presence of adsorbing particles has to be positive to ensure coating of the gas bubbles by a film of the secondary fluid. This coefficient is given by $$S_{\mathit{eff}} = S_0 + \frac{n_p}{4}\left(\frac{R_p}{R_b}\right)\gamma_{sb}(1 - |\cos\theta_{bsp}|)^2$$

where $S_0 = \gamma_{gb} - (\gamma_{bs} + \gamma_{gs})$ is the usual spreading coefficient (without the particles), dependent only on the interfacial tensions $\gamma_{ij}$ where i and j can be gas (g), bulk fluid (b), or secondary fluid (s). The usual spreading coefficient can be readily assessed by drop volume tensiometry and drop shape analysis. The $n_p$ is the average number of particles adsorbed to the interface between the secondary fluid and the bulk fluid of the bubble, $R_p/R_b$ is the size ratio of the particle to the oily bubble, and $\theta_{bsp}$ is the equilibrium contact angle of the particles with the bulk-secondary fluid interface. The contact angle should generally be from about 60° to about 120°, from about 70° to about 110°, from about 75° to about 105°, or from about 80° to about 100°. The secondary fluid can have an effective spreading coefficient in the liquid foam from about 5 mN m$^{-1}$ to about 100 mN m$^{-1}$, from about 5 mN m$^{-1}$ to about 15 mN m$^{-1}$, from about 15 mN m$^{-1}$ to about 30 mN m$^{-1}$, from about 30 mN m$^{-1}$ to about 45 mN m$^{-1}$, from about 45 mN m$^{-1}$ to about 60 mN m$^{-1}$, from about 60 mN m$^{-1}$ to about 75 mN m$^{-1}$, from about 75 mN m$^{-1}$ to about 90 mN m$^{-1}$, from about 10 mN m$^{-1}$ to about 50 mN m$^{-1}$, from about 20 mN m$^{-1}$ to about 60 mN m$^{-1}$, from about 30 mN m$^{-1}$ to about 70 mN m$^{-1}$, from about 40 mN m$^{-1}$ to about 80 mN m$^{-1}$, or from about 50 mN m$^{-1}$ to about 90 mN m$^{-1}$.

A variety of solid foams are also provided. The solid foams can have a solid network of particles connected via a capillary network and forming a plurality of bubbles or pores. For example, the solid foams can be made from a liquid foam by drying and/or removing the bulk fluid from a liquid foam described herein, thereby leaving a highly porous solid foam with the secondary fluid forming a network of capillary bridges connecting the particles. In some embodiments, the particles are connected via a capillary network that has been polymerized, cross-linked, or otherwise reacted to provide increased structural integrity to the network. In some embodiments, solid foams are provided having a solid network of particles connected via a polymer network and forming a plurality of bubbles or pores. The solid foams can have a low density and a high porosity. In various aspects, the solid foams have a density of about 0.01 g cm$^{-3}$ to about 0.5 g cm$^{-3}$, about 0.03 g cm$^{-3}$ to about 0.5 g cm$^{-3}$, about 0.05 g cm$^{-3}$ to about 0.5 g, about 0.1 g cm$^{-3}$ to about 0.5 g cm$^{-3}$, cm$^{-3}$, about 0.1 g cm$^{-3}$ to about 0.3 g cm$^{-3}$, about 0.1 g cm$^{-3}$ to about 0.2 g cm$^{-3}$, about 0.01 g cm$^{-3}$ to about 0.5 g cm$^{-3}$, about 0.01 g cm$^{-3}$ to about 0.3 g cm$^{-3}$, about 0.03 g cm$^{-3}$ to about 0.3 g cm$^{-3}$, about 0.01 g cm$^{-3}$ to about 0.25 g cm$^{-3}$, about 0.03 g cm$^{-3}$ to about 0.25 g cm$^{-3}$, about 0.03 g cm$^{-3}$ to about 0.2 g cm$^{-3}$, or about 0.01 g cm$^{-3}$ to about 0.2 g cm$^{-3}$. In various aspects, the solid foam have a porosity of about 80% to about 99%, about 80% to about 98%, about 80% to about 95%, about 85% to about 99%, about 85% to about 98%, about 85% to about 95%, about 90% to about 99%, about 90% to about 98%, or about 90% to about 95%. The resulting high porosity, low-weight, high strength foams can be used, for instance, as (thermal and acoustic) insulation, packaging and transportation, shock absorption, and—if biocompatible/biodegradable particles are used—for cell tissue scaffolding and other biomedical applications.

The capillary foams provided herein can be made with a variety of particles, wherein the particles adsorb at the interface between the discontinuous gas phase and the continuous bulk fluid phase of the capillary foam. This can include adsorbing at one or both of the interface between the secondary fluid and the gas and the interface between the secondary fluid and the bulk fluid. This can result in the formation of the capillary bonds containing the secondary fluid connecting the particles and assisting the spreading of the secondary fluid across the surface of the gas bubble. In some aspects, the particles can be present at a concentration from about 0.1 wt % to about 10 wt %, from about 0.1 wt % to about 5 wt %, or from about 0.2 wt % to about 5 wt %, based upon the weight of the foam.

A variety of particles can be used in this regard, the choice impacted by the choice of bulk fluid, secondary fluid, and gas. The particles can include polymer particles, metal particles, metal oxide particles, silica particles, and combinations thereof. The particles can include polymer particles. Suitable polymer particles can include homo- and co-polymers prepared from vinyl or acrylic monomers, such as polyvinyl chloride (PVC), polyvinylidene fluoride (PVDF), polystyrene, poly(alkylacrylates), poly(alkylmethacrylates); homo- and co-polymers prepared from olefinic monomers such as polyethylene and polypropylene; and those prepared from functional polyaddition or condensation, including polyesters, polyamides, polylactic acid), poly(glycolic acid), polyethylene oxide), poly(propylene oxide), epoxies, polyimides, polyurethanes and polyureas, including copolymers with other polymers, and mixtures thereof. The polymers can be derived from those obtained naturally, such as cellulose, chitin, starches and other polysaccharides, or their derivatives, such as cellulose esters. The polymer can be biodegradable, in whole or in part. The particles can include metal particles, including iron, lead, tin, silver, gold, zinc, zirconium, and alloys thereof. The particles include metal oxide particles, such as aluminum oxide, titanium oxide, magnesium oxide, cerium oxide, tin oxide, indium oxide, iron oxide, and combinations thereof. The particles can include glass particles, silica particles, ceramic particles, or the like.

The particles can be a variety of sizes depending upon the application. The particles can be nanoparticles, e.g. having an average diameter from about 50 nm to about 1000 nm, about 200 nm to about 1000 nm, about 500 nm to about 1000 nm, or about 600 nm to about 1000 nm. The particles can be microparticles, e.g. having an average diameter from about 0.5 µm to about 1000 µm, from about 0.5 µm to about 800 µm, from about 0.5 µm to about 700 µm, from about 1 µm to about 1000 µm, from about 1 µm to about 800 µm, from about 1 µm to about 700 µm, from about 50 µm to about 1000 µm, from about 50 µm to about 800 µm, from about 50 µm to about 700 µm, from about 100 µm to about 1000 µm, from about 100 µm to about 800 µm, or from about 100 µm to about 700 µm. In some embodiments, the particles have an average diameter from about 0.05 µm to about 700 µm.

The capillary foams can include a bulk fluid forming a continuous liquid phase. The bulk fluid can include water or other aqueous liquids, e.g. salt water, brine, etc. The aqueous liquids can include industrial discharge or other chemical waste streams. In various aspects, the bulk fluid includes a polar fluid. Example of bulk fluids can include water, $C_1$-$C_5$ alcohols, $C_1$-$C_5$ glycols, $C_1$-$C_5$ aminoalcohols, dimethyl sulfoxide, dimethylformamide, dimethylacetamide, dimethyl sulfone, sulfolane, and mixtures thereof.

The secondary fluid in the capillary foam can be used to form capillary bridges connecting the particles, and thereby inducing spreading of the secondary fluid at the interface between the discontinuous gas phase and the continuous bulk fluid. The secondary fluid can include such fluids as trimethylolpropane trimethacrylate (TMPTMA), diisonyl phthalate (DINP), paraffin, and combinations thereof. The secondary fluid can include vinyl or acrylic functional molecules, epoxides, phthalates, paraffins, isocyanates, silicone oils, and combinations thereof. In various aspects, the secondary fluid include substituted or unsubstituted linear, branched, or cyclic alkanes having from about 12 to 15, about 12 to 40, about 15 to 40, or about 15 to 35 carbon atoms; substituted or unsubstituted phenyl; or combinations thereof. The secondary fluid can include a mixture of oils, including crude oils, fuel oils, heavy oils, and the like.

The secondary fluid can include a reactive fluid. For example, in some embodiments the secondary fluid is polymerizable. The secondary fluid can include a photopolymerizable monomer capable of being polymerized, for example, via UV light. In some aspects, the secondary fluid also includes a small amount of a photo-initiator for initiating the polymerization. In some embodiments, the secondary fluid includes a cross-linkable monomer. The secondary fluid can include an organic dye molecule. In various aspects, the secondary fluid can be present at a concentration from about 0.1 wt % to about 10 wt %, from about 0.2 wt % to about 10 wt %, from about 0.5 wt % to about 10 wt %, or from about 0.5 wt % to about 5 wt %, based upon the weight of the bulk fluid.

The capillary foams can include a variety of gasses. The gas can include air, oxygen, nitrogen, carbon dioxide, helium, neon, argon, or a combination thereof.

Methods of Making Capillary Foams

Various methods of making capillary foams are also provided. The methods can include making a liquid foam having a continuous liquid phase containing the bulk fluid and a discontinuous phase containing the gas, wherein the discontinuous phase is dispersed within the continuous phase to form a plurality of bubbles having an interface between the continuous phase and the discontinuous phase, and wherein the secondary fluid and the particles are adsorbed at the interface between the continuous phase and the discontinuous phase. The particles can form networks that are connected by capillary or pendular bridges of the secondary fluid that span the space between the bubbles. The methods can include (a) forming a suspension of particles in a bulk fluid, (b) mixing the suspension with a secondary liquid to form a Pickering emulsion, and (c) mixing the Pickering emulsion with a gas to form the liquid foam. The methods can include (a) forming a suspension of particles in a bulk fluid, (b) mixing the suspension with a secondary liquid to form a capillary suspension, and (c) mixing the capillary suspension with a gas to form the liquid foam. The methods can include (a) forming a suspension of particles in a bulk fluid, (b) mixing the suspension with gas to form a Pickering foam, and (c) mixing the Pickering foam with a secondary fluid to form the liquid foam. The methods can include (a) forming a suspension of particles in a bulk fluid, (b) mixing the suspension with gas to form liquid marbles, and (c) mixing the liquid marbles with a secondary fluid to form the liquid foam. The mixing of the gas can include standard frothing techniques, can include using a gas bubbler to create the bubbles having a controllable size, or a combination thereof. In some embodiments, the methods can be performed without the addition of a surfactant to the foam, e.g. a surfactant is not needed to form a stable foam.

The methods can include making a solid foam from a liquid foam, e.g. by drying the liquid foam or otherwise removing the bulk fluid. In some embodiments, the secondary fluid in the liquid foam is cured or polymerized prior to removal of the bulk fluid. In some embodiments, the bulk fluid is removed prior to the curing or polymerization of the secondary fluid. The reaction can be carried out, for example, by applying heat and/or UV light to the secondary fluid. The secondary fluid, by reacting to polymerize the secondary fluid and/or to crosslink the fluid to the particles, can form a polymer network connecting the particles.

Methods and Devices for Oil Recovery

The capillary foams and methods of making capillary foams can be utilized in a wide range of technologies, overcoming many of the limitations of traditional surfactant-based foams in mobility and conformance control. In a variety of embodiments described herein, methods of oil recovery from water are provided using the capillary foam technologies. Containment of oil slicks and spills by traditional technologies calls for the rapid deployment of booms to confine the oil, followed by recovery using surface vessels equipped with skimming equipment.

Figure 33:
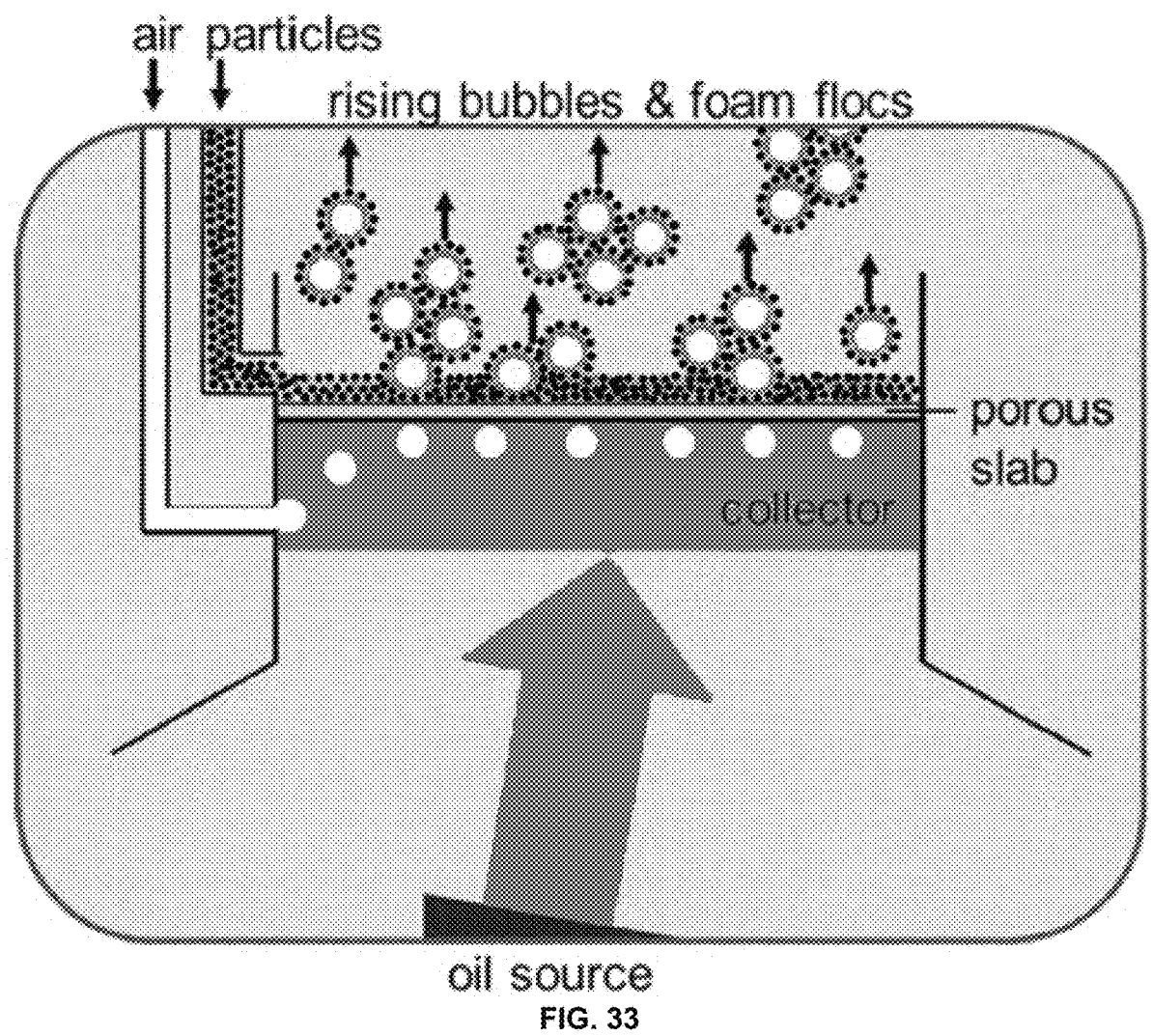
FIG. 33 shows a schematic of an exemplary oil recovery system having a collector that combines oil from the oil source with air and particles to form a capillary foam.
Figure 34:
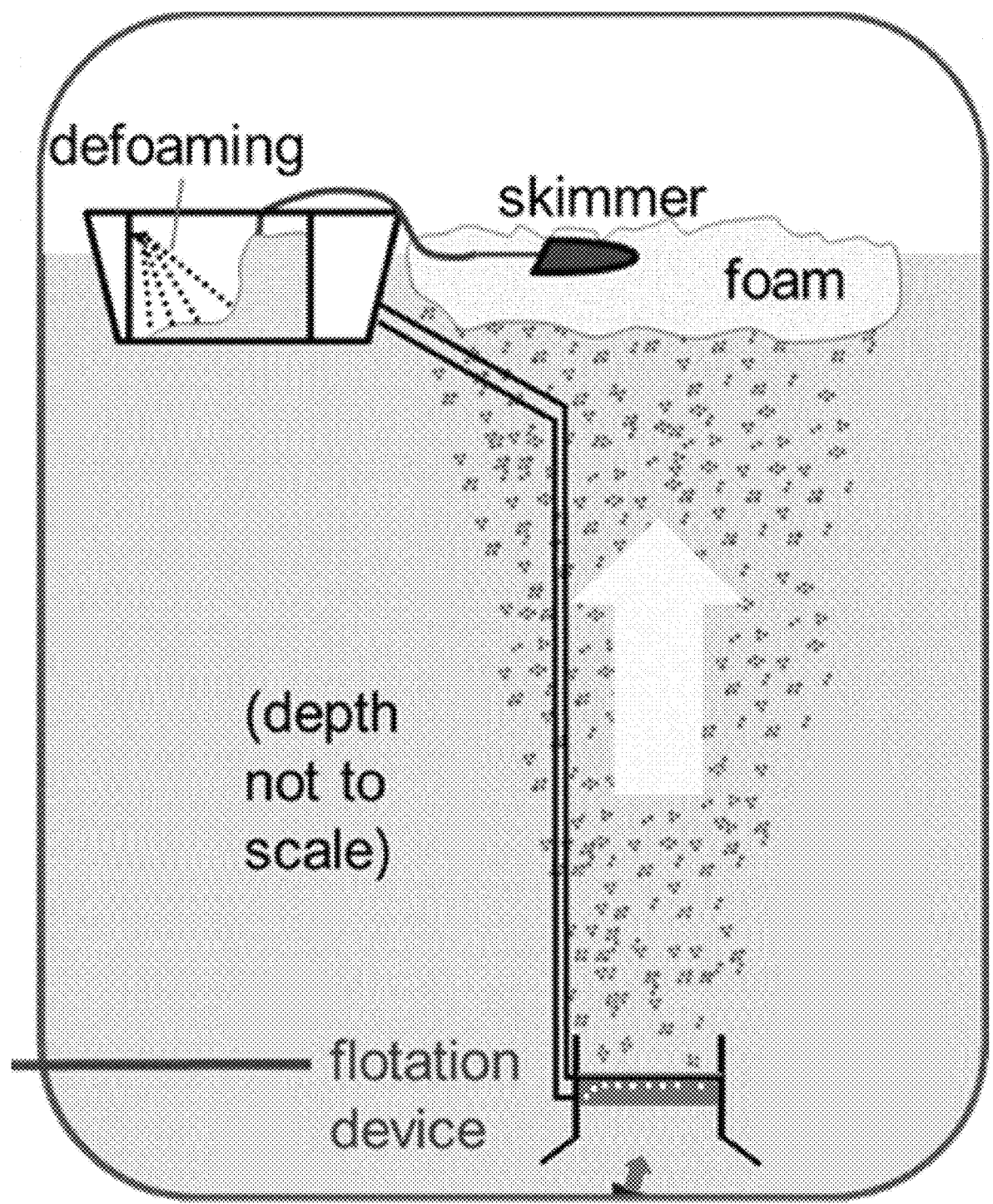
FIG. 34 shows a schematic of an exemplary strategy for oil recovery including the collector (FIG. 34) attached to a source of air and particles at the surface. The capillary foam floats to the surface of the water, where it is collected by a skimmer and defoamed to collect the oil. In some embodiments, the particles, after defoaming, can be recycled to form more capillary foam.
Figures 35A, 35B, 35C, 35D:
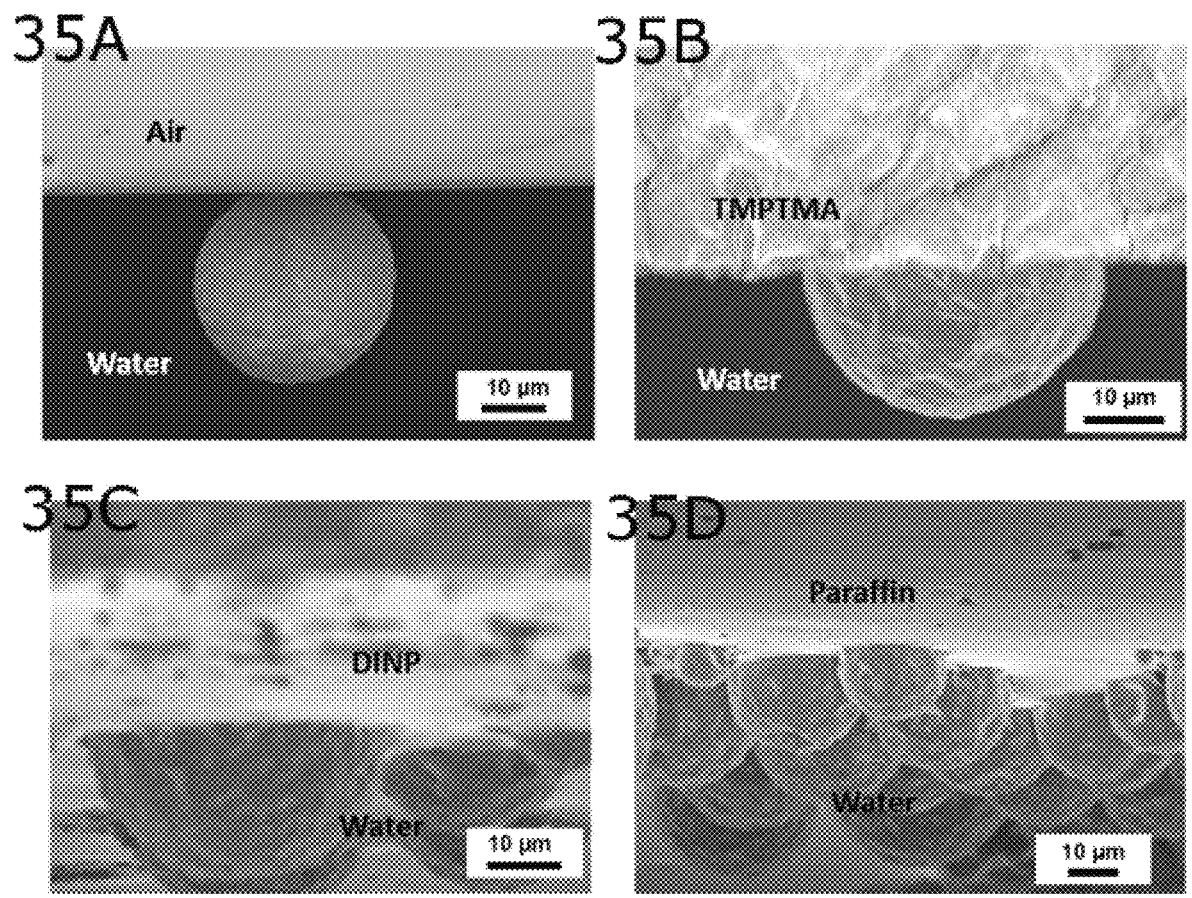
FIGS. 35A-35D show scanning electron micrographs of PVC particles in the PDMS replica of a macroscopic air-water interface (FIG. 35A) and of several oil-water interfaces (FIGS. 35B-35D) using the gel trapping technique. The visible portion of the particles originally resided in the water phase. Because of their favorable contact angle (close to 90°) with the oil-water interfaces (FIGS. 35B-35D), these particles can stabilize oil-coated bubbles, whereas their attachment to air-water interfaces is too weak (as indicated by the small contact angle seen in FIG. 35A) to allow for the stabilization of uncoated bubbles.
Figures 36A, 36B:
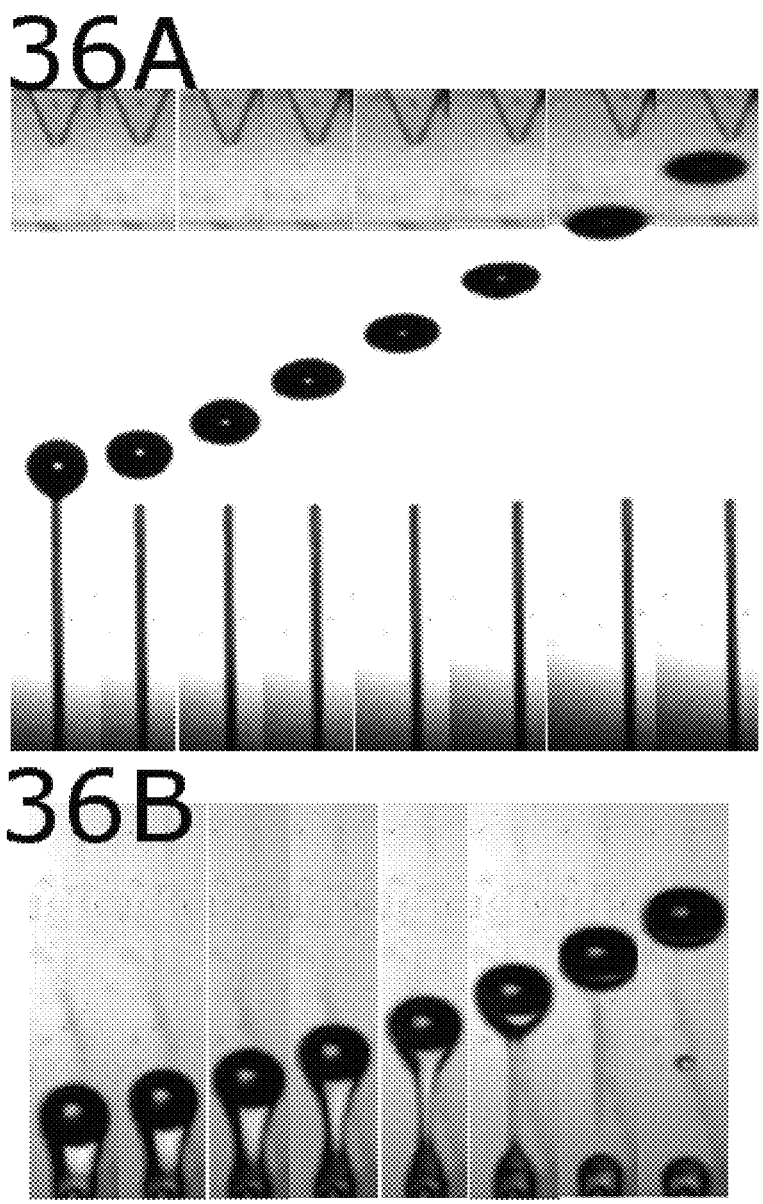
FIGS. 36A-36B show images of bubble rise dynamics at 500 fps.
Figure 37:
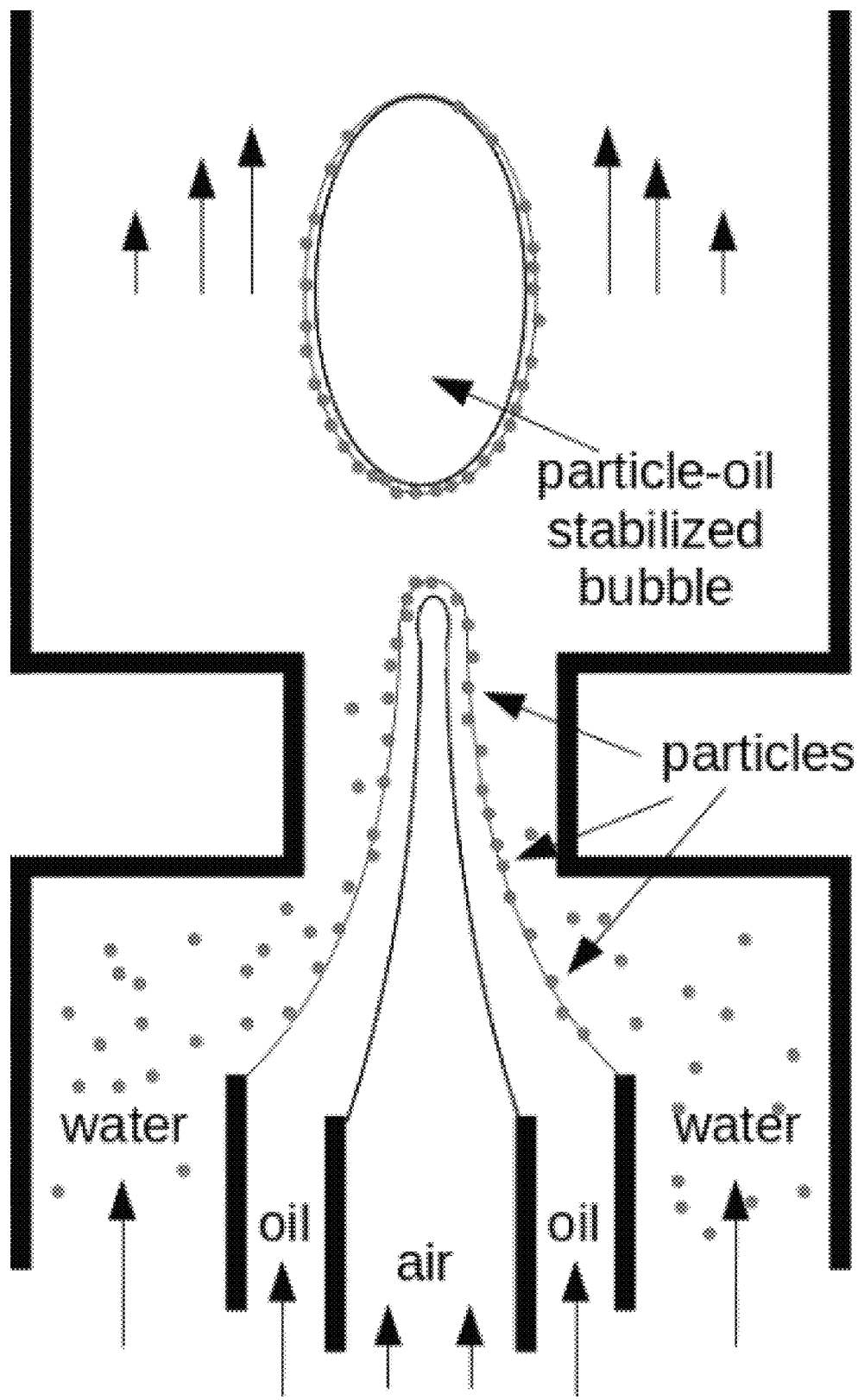
FIG. 37 shows a schematic of an exemplary microfluidic device for creating particle-oil stabilized bubbles and then studying their stability to shear within the channel. In the lower section, the four components (gas, water, oil, and particles) are introduced and passed through a constriction to create an individual bubble. In the upper section, the bubble transport through the device continues and provides a study of the shear stability of the coated bubble.

The methods provide herein offer numerous advantages over conventional oil recovery approaches, and can be applied in a variety of off-shore oil spill situations. An exemplary methods is depicted, for example, in FIGS. 33-34. The methods of oil recovery from water can include (i) combining the oil with a gas to form gas bubbles having the oil on the surface of the bubbles, and (ii) contacting the bubbles with particles to form a liquid foam having the water as a continuous phase and the gas as a discontinuous phase dispersed within the water, wherein the oil and particles are adsorbed at an interface between the continuous phase and the discontinuous phase. In some aspects, the particles form a network connected by capillary or pendular bridges of the oil that span the space between the particles. In various embodiments, the methods can include forming the liquid foam at or near an oil source deep below the surface of the water. The methods offer several advantages, including that foam formation occurs deep under water at the site of the leak, and aids in bringing oil to the surface. In various embodiments, the methods can be performed without the addition of a surfactant, e.g. a surfactant is not needed to create a stable foam capable of transporting the oil to the surface of the water.

In some aspects, the methods further include allowing the foam to rise to or near the surface of the water, and collecting the foam at or near the surface of the water to remove the oil from the water. Upon reaching the surface, the network of capillary-connected particles between bubbles aid in the containment of oil and prevent spreading. The potential increases in viscosity as oil ages on the surface through evaporation and photo-oxidation may also act to increase the strength of these capillary networks. The capillary foams formed in this manner can be capable of withstanding very high oil concentrations observed at oil spills, while still maintaining the structural integrity of the foam and without the need for surfactants. In some embodiments, the oil is combined with the gas in a lower compartment of a collector to form the bubbles, and the bubbles are contacted with the particles in an upper compartment of the collector to form the foam. In some embodiments, once the liquid foam is captured, the liquid foam can be contacted with a defoamer to collapse the foam. In some aspects, the oil can be separated from the particles, e.g. such that the particles can be recycle to produce additional foam and remove additional oil.

In some embodiments, devices are provided for performed the oil recovery methods described herein. The devices can include a collector for collecting the oil in the water; a gas inlet for injecting a gas into a lower compartment of the collector to form bubbles in the lower compartment of the collector; and a particle inlet for injecting particles into the collector and configured such that when the particles and the gas are injected into the collector, the particles will contact the bubbles to form a liquid foam having the water as a continuous phase and the gas as a discontinuous phase dispersed within the water, wherein the oil and particles are absorbed at an interface between the continuous phase and the discontinuous phase. In various aspects, the gas inlet is connected to a gas source at or near the surface of the water (e.g. on a ship or tanker at the surface of the water). In various aspects, the particle inlet is connected to a particle source at or near the surface of the water (e.g. on a ship or tanker at the surface of the water). In some aspects, the device further comprises a skimmer capable of collecting the liquid foam at or near the surface of the water.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Example 1: Wetting Morphologies in Colloidal Multiphase Systems

Experimental Section

A Single Air Bubble and Oil Droplet Were Generated and Brought into Contact: The experimental setup consisted of one square capillary (VitroCom, Inc., with an inner diameter of 1 mm and an outer diameter of 1.4 mm unless otherwise mentioned) to hold the sample and two round capillary tubes (VitroCom, Inc., with an inner diameter of 0.7 mm, an outer diameter of 0.87 mm) through which the air bubble and oil droplet were injected. The square capillary was pretreated with "piranha solution" (a 3:1 mixture of concentrated sulfuric acid and 30% hydrogen peroxide) for 1.5 h. One end of each round capillary tube was shaped into a tapered orifice using a flaming/brown micropipette puller; this end could be used to introduce the air bubble or oil droplet. The other end of the round capillary was connected to a microsyringe (containing air or oil) by using polytetrafluoroethylene (PTFE) tubing. A single air bubble was generated in a petri dish with DI water or particle suspension using a microsyringe and then transferred into the square capillary prefilled with DI water or particle suspension. Next, a single oil droplet was dispensed directly into the square capillary through the second injection tube with a slowly and manually operated microsyringe. The generated bubble and oil droplet were kept in the device to allow particles to adsorb on the bubble and oil droplet surfaces; then they were brought into contact through the buoyancy force on the air bubble. The morphologies were studied in the microfluidic device after the air bubble and oil drop made contact. The radius of oil droplet and air bubble was always ≈300-400 µm.

Measurement of Interfacial Tensions: The dynamic surface and interfacial tension were measured via axisymmetric drop shape analysis of pendant drops with a Ramé-hart goniometer. This method has proven extremely useful to determine the evolution of the interfacial tension due to the adsorption of particles to the interface (Stocco, et al., *Soft Matter* 2009, 5, 2215; Du, et al., *Langmuir* 2010, 26, 12518; Garbin, *Phys Today* 2013, 66, 68; Isa, et al., *Soft Matter* 2011, 7, 7663; Foster, et al., *Langmuir* 2014, 30, 10188; Nelson, et al., *Soft Matter* 2015, 11, 118.). Briefly, an inverted pendant drop of oil or an air bubble immersed in the aqueous phase was created by a syringe with a steel needle, and a high speed CCD camera was programmed to capture the variation of drop/bubble shape with time. The interfacial/surface tension is obtained by analyzing the contour shape resulting from the balance of gravitational forces and tension forces. All experiments were performed at room temperature of 21° C.

Selection of Colloidal Multiphase Systems

This example focuses on the wetting of an air bubble by an oil droplet in a water medium. Hexadecane and triethyleneglycol dimethacrylate (TEGDMA) were chosen as oil phases because these are commonly found in industrial processes and have different wetting in the absence of particles (Keller, et al., *Water Resour. Res.* 2003, 39, 1288). Particles of ethyl cellulose (EC) and hydroxypropyl methylcellulose phthalate (hypromellose phthalate, HP 55) were used as wetting modifiers because they are readily available, chemically modifiable, and biorenewable (Wege, et al., *Langmuir* 2008, 24, 9245; Lam, et al., *J. Am. Chem. Soc.* 2011, 133, 13856; Blanco, et al., *Langmuir* 2013, 29, 10019; Jin, et al., *Soft Matter*, 2012, 8, 2194; Lam, et al., *Curr. Opin. Colloid Interface Sci.* 2014, 19, 490). The hydrodynamic diameters of the EC and HP 55 particles as obtained by dynamic light scattering were 102.3 and 137.4 nm, respectively. The corresponding coefficients of variation were 13% and 10%, respectively. A glass capillary tube with square crosssection was used to observe the wetting configurations of air-water-oil particle combinations. One air bubble and one oil droplet were dispensed from microsyringes, transferred to a square capillary containing the aqueous particle dispersion, and kept stationary for 30 min to allow for particles to adsorb on their surfaces. Then the bubble and oil droplet were brought into contact by slightly tilting the capillary and exploiting the bubble's buoyancy. The wetting configuration assumed upon bubble-droplet contact was examined optically in the glass capillary.

For a three-phase system, the final wetting morphology can be determined by knowing at least two spreading coefficients (Torza, et al., *J. Colloid Interface Sci.* 1970, 33, 67; Panacci, et al., *Phys. Rev. Lett.* 2008, 101, 164502.1; Guzowski, et al., *Soft Matter* 2012, 8, 7269). In the wetting of an air bubble by an oil drop in an aqueous medium, there are only two kinds of possible wetting configurations: partial and complete wetting. The non-wetting state is energetically unfavorable: because of the high air-water surface tension, yaw, water cannot spread at an air-oil interface. Similarly, it is energetically unfavorable for the gas bubble to engulf the oil droplet. Therefore, the final wetting morphology can be determined from knowledge of only the oil spreading coefficient. If the oil phase has a positive spreading coefficient, the oil will engulf the bubble completely, otherwise partial wetting will occur (FIG. 1).

Figure 2A:
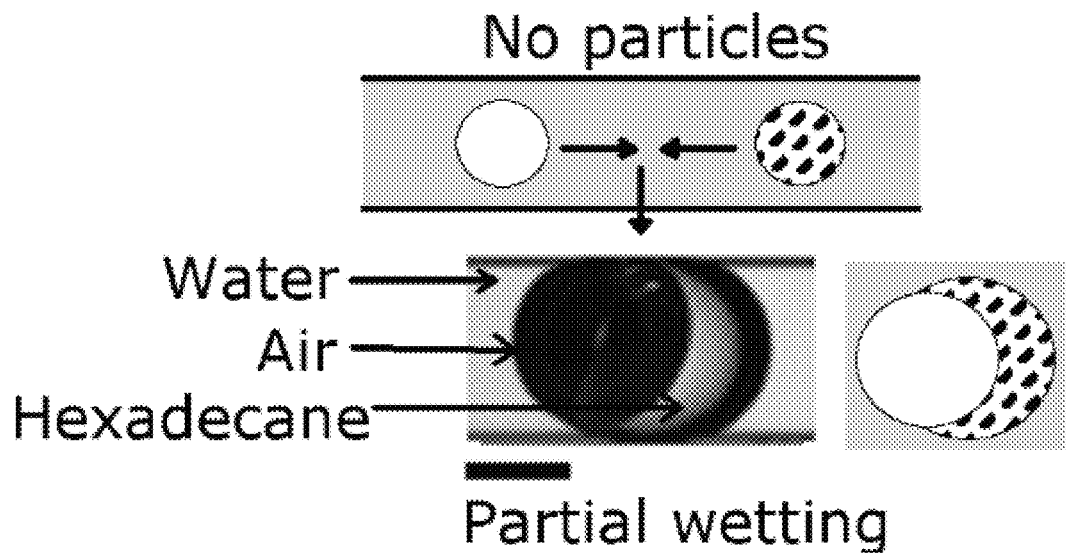
FIGS. 2A-2I show that Particles can promote bubble wetting. First row: experimental observations of an air bubble and a hexadecane droplet brought into contact in a water medium containing (FIG. 2A) no particles, (FIG. 2B) 0.2 wt % EC particles, and (FIG. 2C) 0.2 wt % HP 55 particles. Scale bars are 500 µm. The dynamic effective surface and interfacial tension of an air-hexadecane-water system in which the water phase contains (FIG. 2D) no particles, (FIG. 2E) 0.2 wt % EC particles, and (FIG. 2F) 0.2 wt % HP 55 particles. The dynamic effective spreading coefficient of an air-hexadecane-water system in which the water phase contains (FIG. 2G) no particles, (FIG. 2H) 0.2 wt % EC particles, and (FIG. 2I) 0.2 wt % HP55 particles. The upper white background indicates the complete wetting regime as predicted based on the positive effective spreading coefficient, the lower gray background indicates the partial wetting regime expected for a negative effective spreading coefficient.
Figure 2B:
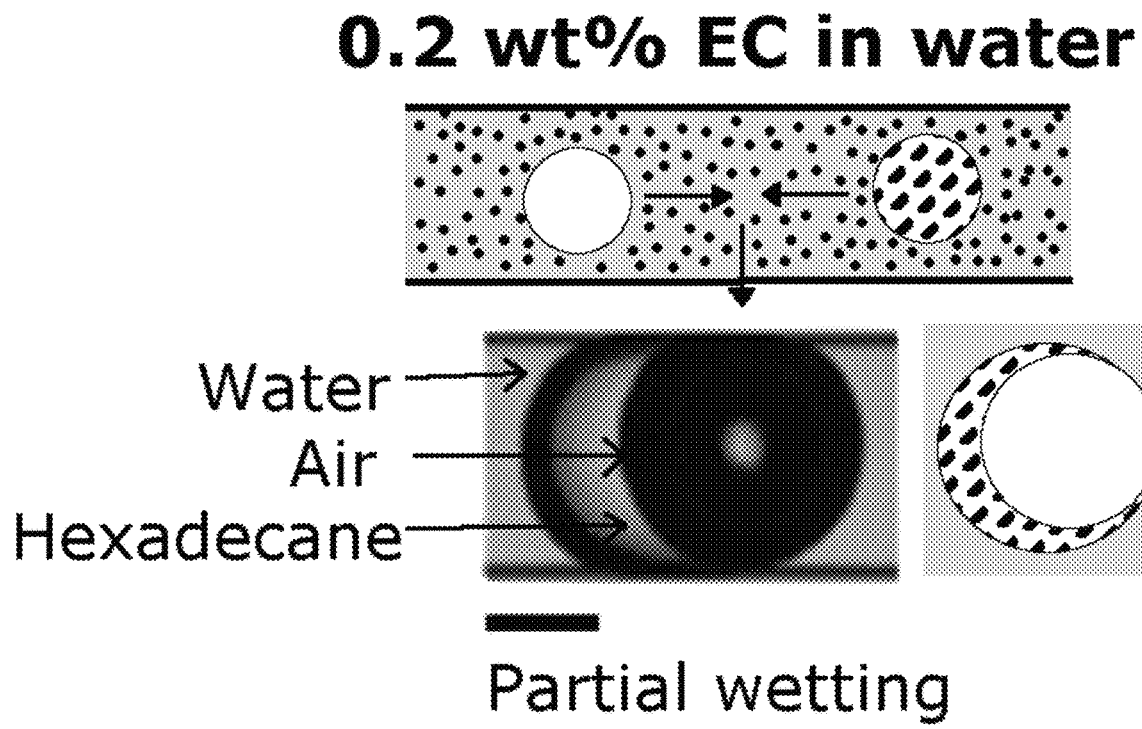
Figure 2C:
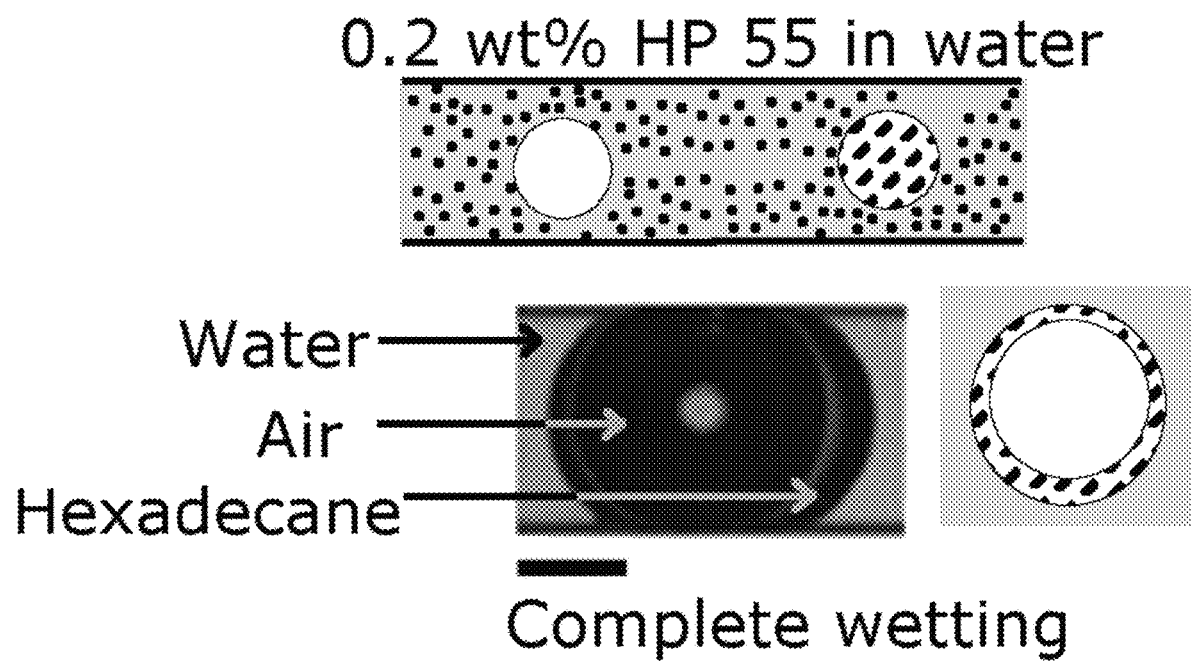

FIGS. 2A-2I show that the dispersions particle present in the aqueous medium determine the wetting configuration of the air-hexadecane-water system. In the absence of particles partial engulfment of the bubble by hexadecane was observed (FIG. 2A), and the presence of up to 0.2 wt % of EC particles did not change this qualitative behavior (FIG. 2B). By contrast, when the air bubble and hexadecane droplet were brought into contact in water containing 0.2 wt % of HP 55 particles, we observed complete bubble engulfment (FIG. 2C). We found that these wetting configurations do not change in the following 12 h. These results show that the wetting morphology of air-hexadecane-water system was changed from partial to complete wetting by using as little as 0.2 wt % HP 55 particles.

The Change in Wetting Morphology Can Be Attributed to an Interfacial Energy Change Caused by Particle Absorption Not wishing to be bound by any theory, it is believed that the dependence of the wetting configuration on the presence and type of particles can be attributed to the tuning of interfacial tensions caused by the adsorption of particles in the interfaces (Stocco, et al., *Soft Matter* 2009, 5, 2215; Du, et al., *Langmuir* 2010, 26, 12518; Garbin, *Phys. Today* 2013, 66, 68). We employed dynamic surface tension measurements, which have proven to be a straightforward and powerful method of quantifying the effective surface or interfacial tension of fluid interfaces containing adsorbed particles (Stocco, et al., *Soft Matter* 2009, 5, 2215; Du, et al., *Langmuir* 2010, 26, 12518; Garbin, *Phys. Today* 2013, 66, 68; Isa, et al., *Soft Matter* 2011, 7, 7663; Foster, et al., *Langmuir* 2014, 30, 10188; Nelson, et al., *Soft Matter* 2015, 11, 118). The measured effective surface and interfacial tension data yield an effective spreading coefficient of fluid i via $$S'_i = \gamma'_{jk} - (\gamma'_{ij} + \gamma'{ik}) \quad (1)$$

Figure 2D:
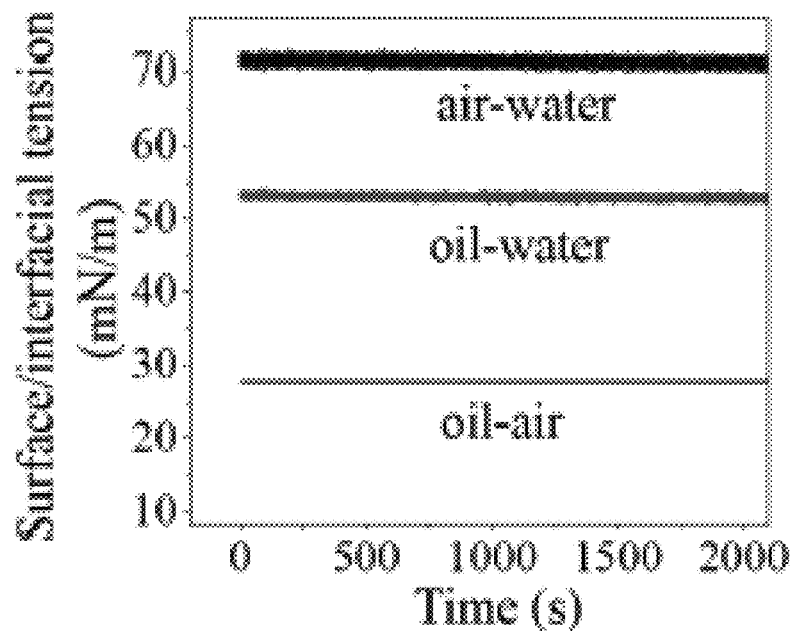
Figure 2E:
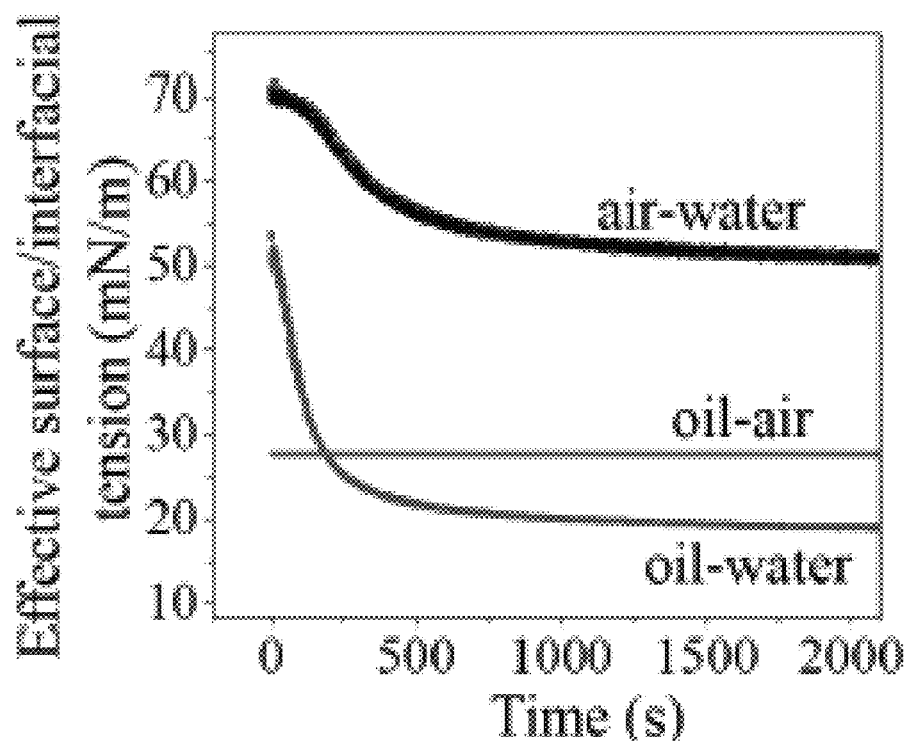
Figure 2F:
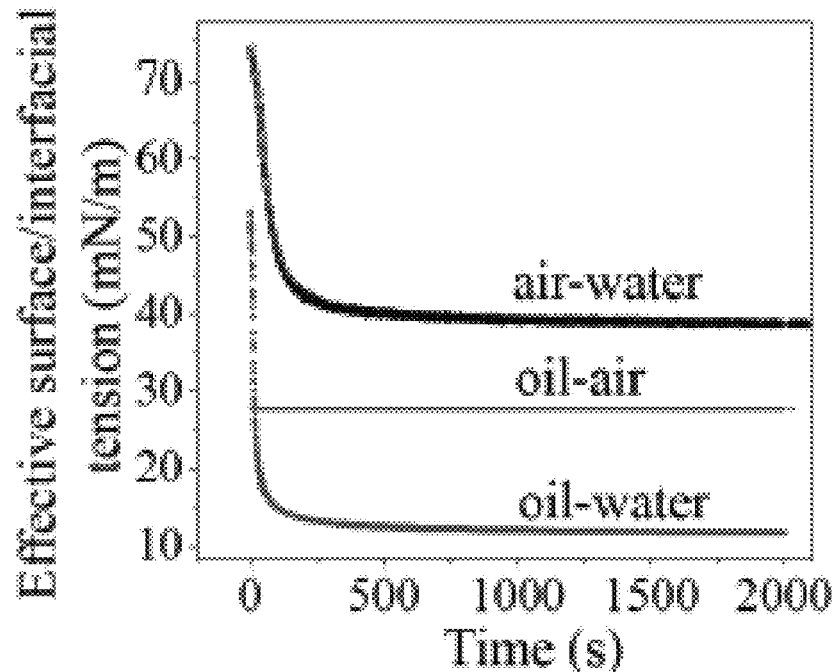
Figure 2G:
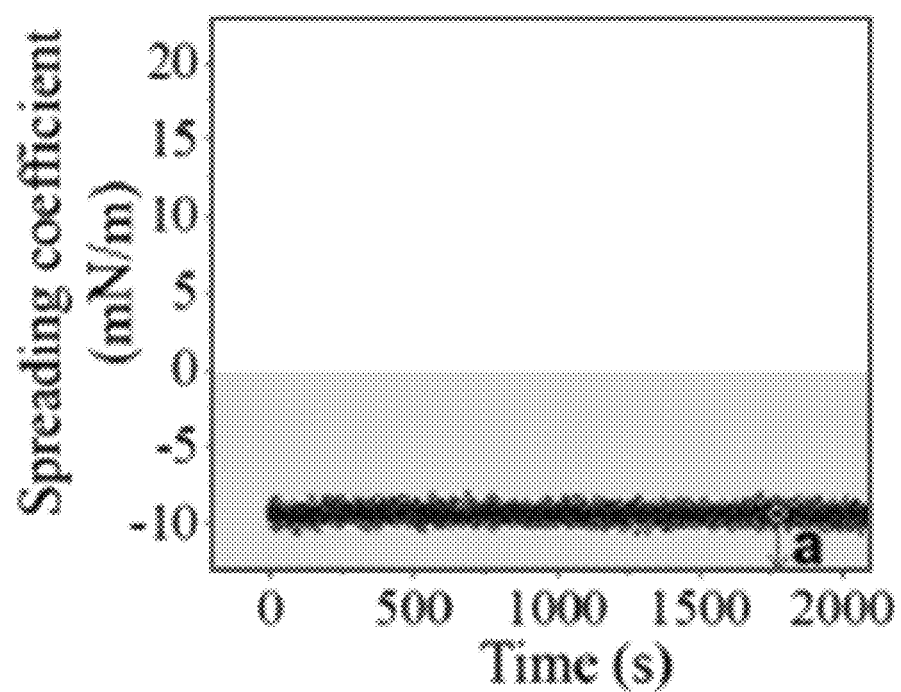
Figure 2H:
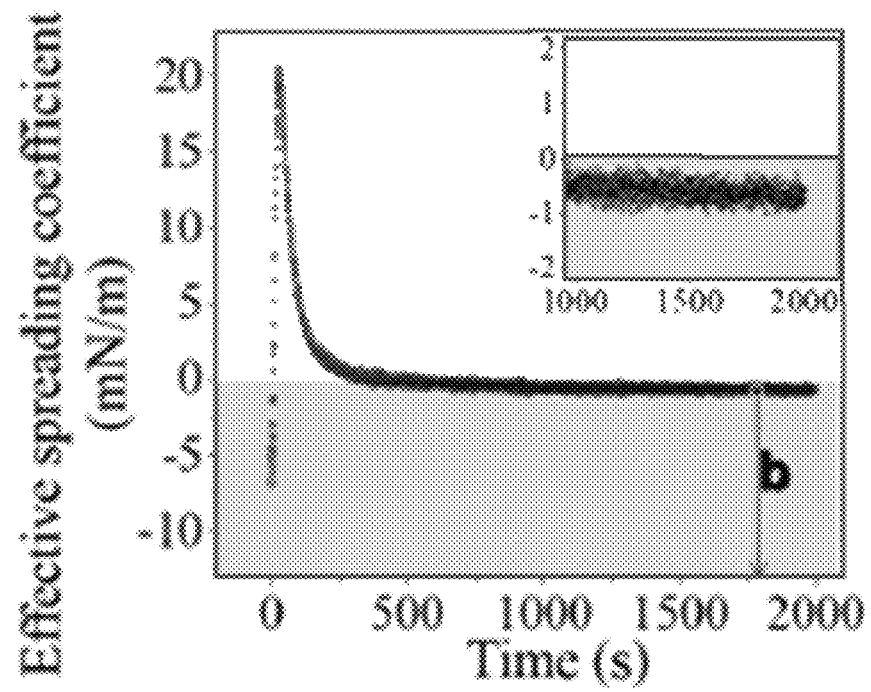
Figure 2I:
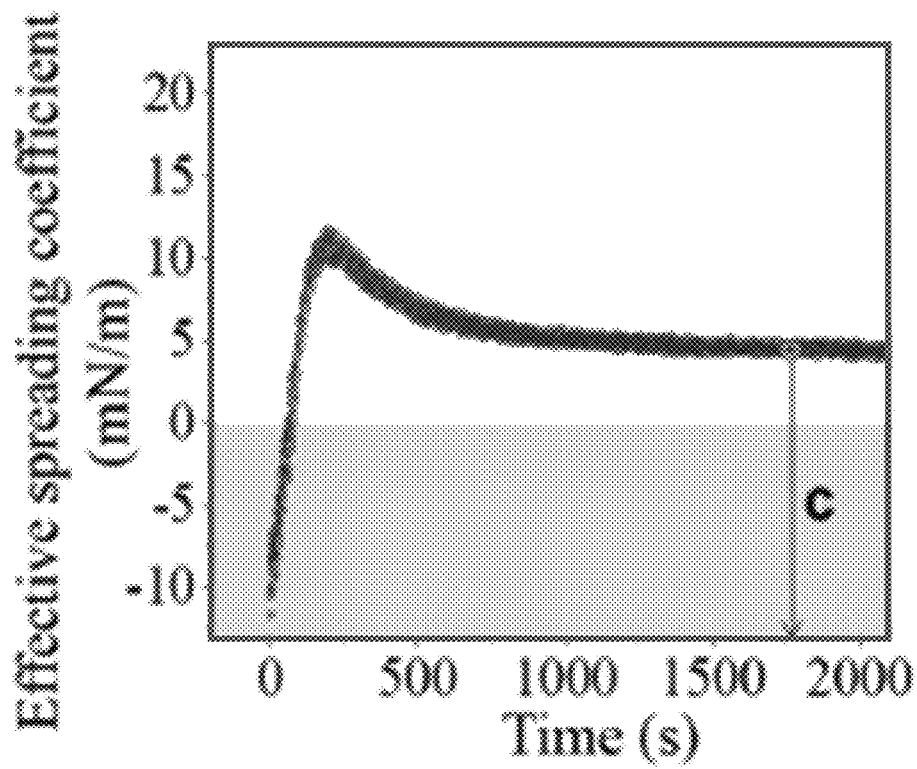

The interfacial tension was measured via analysis of a pendant drop shape, which was determined by a balance of gravitational and tension forces (Stocco, et al., *Soft Matter* 2009, 5, 2215; Du, et al., *Langmuir* 2010, 26, 12518; Garbin, *Phys. Today* 2013, 66, 68; Isa, et al., *Soft Matter* 2011, 7, 7663; Foster, et al., *Langmuir* 2014, 30, 10188; Nelson, et al., *Soft Matter* 2015, 11, 118). FIGS. 2D-2F show time-dependent drop shape tensiometry measurements for the air-water and hexadecane-water interfaces, in which the water phase contained no particles, 0.2 wt % EC particles, or 0.2 wt % HP 55 particles, respectively. When the water phase contained no particles, the tension of the air-water interface and of the hexadecane-water interface were time independent (FIG. 2D). On the other hand, when the water phase contained 0.2 wt % HP 55 or 0.2 wt % EC particles, the effective air-water tension $\gamma'_{aw}$ and effective hexadecane-water tension $\gamma'_{ow}$ first decreased with time and then reached steady state (FIG. 2E and FIG. 2F). The decrease in $\gamma'_{aw}$ and $\gamma'_{ow}$ is caused by the progressive adsorption of particles at the respective interface over the course of the measurement series (Stocco, et al., *Soft Matter* 2009, 5, 2215; Du, et al., *Langmuir* 2010, 26, 12518; Garbin, *Phys. Today* 2013, 66, 68; Isa, et al., *Soft Matter* 2011, 7, 7663; Foster, et al., *Langmuir* 2014, 30, 10188; Nelson, et al., *Soft Matter* 2015, 11, 118). As the interface reaches a plateau coverage by particles, the effective surface and interfacial tension also reached steady value (Stocco, et al., *Soft Matter* 2009, 5, 2215; Du, et al., *Langmuir* 2010, 26, 12518; Garbin, *Phys. Today* 2013, 66, 68; Isa, et al., *Soft Matter* 2011, 7, 7663; Foster, et al., *Langmuir* 2014, 30, 10188; Nelson, et al., *Soft Matter* 2015, 11, 118). The particles may also adsorb on the oil-air interface when an air bubble and an oil droplet are brought into contact. In principle the adsorption of particles at the oil-air interface can also influence the tension of the oil-air interface. Contact angle experiments however suggest that the particles have little influence on the effective oil-air surface tension. The simplifying assumption was made of a constant effective tension at the air-hexadecane interface. Using Equation (1), the effective dynamic spreading coefficient of hexadecane was obtained (shown in FIGS. 2G-2I). In this example, the air bubble and hexadecane droplet were retained in the water phase for around 30 min to allow particles to adsorb to the interfaces. Therefore, the values of the effective spreading coefficient at 30 min were used. FIG. 2G shows that the oil spreading coefficient in the absence of particles is negative in agreement with the observed partial bubble engulfment. The presence of 0.2 wt % EC particles in the water phase raises the effective spreading coefficient significantly by reducing the oil-water interfacial tension (FIG. 2E), but the effect on the spreading coefficient is partly offset by a significant simultaneous reduction of the air-water tension, which results in a negative value of $S'_o = -0.7$ mN m$^{-1}$ after 30 min (FIG. 2H). The presence of 0.2% HP 55 particles, by contrast, reduces the oil-water tension much more than it does the air-water tension (FIG. 2F), and therefore leads to positive values of the effective spreading coefficient $S'_o$ after 3 min (FIG. 2I). As mentioned before, a positive effective spreading coefficient is consistent with the complete bubble engulfment by the oil droplet, whereas a negative value indicates only partial engulfment. The predicted morphologies based on the effective spreading coefficient matched the directly observed wetting configurations in a water phase containing no particles, 0.2 wt % EC particles, and 0.2 wt % HP 55 particles, respectively. For the wetting of air-hexadecane-water in the presence of 0.2 wt % EC particles, the experimental value is very close to the threshold value of zero (within the estimated uncertainty of the tension measurements on the order of 1 mN m$^{-1}$). Visual observation and tensiometry, however, consistently suggest that partial wetting occurs. Additionally, we observed that a hexadecane droplet placed on the macroscopic surface of an aqueous 0.2 wt % EC particle dispersion formed a stable oil lens with a finite contact angle rather than a wetting film. We therefore concluded that in the particle dispersion the steady-state wetting configuration of an air bubble and a hexadecane droplet is indeed one of partial bubble engulfment.

Particles Can Promote Bubble Dewettinq

Figure 3A:
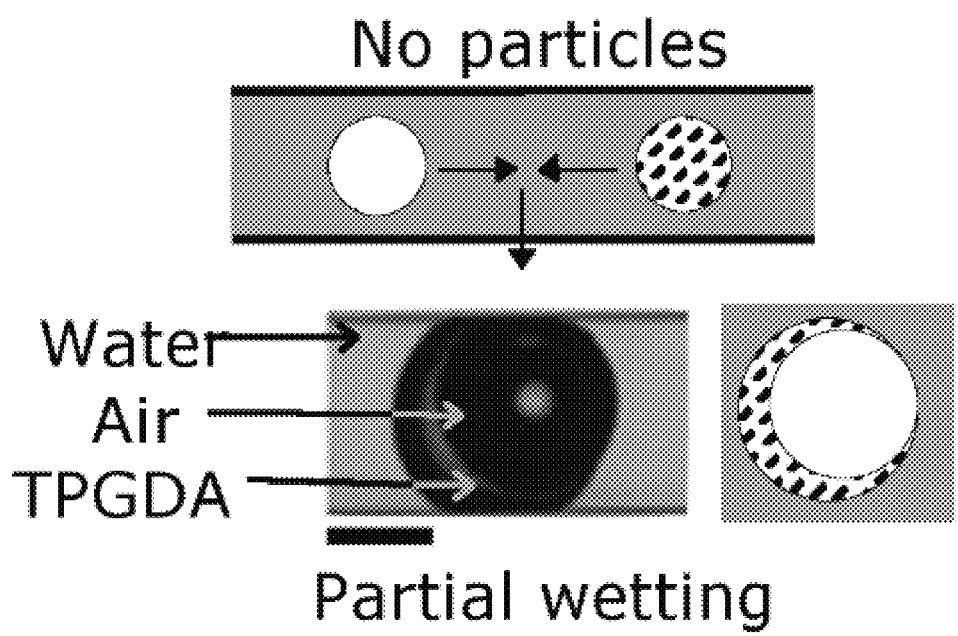
FIGS. 3A-3I show that particles can promote bubble dewetting. Experimental observations of an air bubble and a TEGDMA droplet brought into contact in a water phase containing (FIG. 3A) no particles, (FIG. 3B) 0.2 wt % EC particles, and (FIG. 3C) 0.2 wt % HP 55 particles. Scale bars are 500 µm. The dynamic effective surface and interfacial tension of an air-TEGDMA-water system in which the water phase contains (FIG. 3D) no particles, (FIG. 3E) 0.2 wt % EC particles, and (FIG. 3F) 0.2 wt % HP 55 particles. The dynamic effective spreading coefficient of an air-TPGDA-water system in which the water phase contains (FIG. 3G) no particles, (FIG. 3H) 0.2 wt % EC particles, and (FIG. 3I) 0.2 wt % HP55 particles. The yellow and gray background indicate the different wetting regimes as in FIGS. 2A-2I.
Figure 3B:
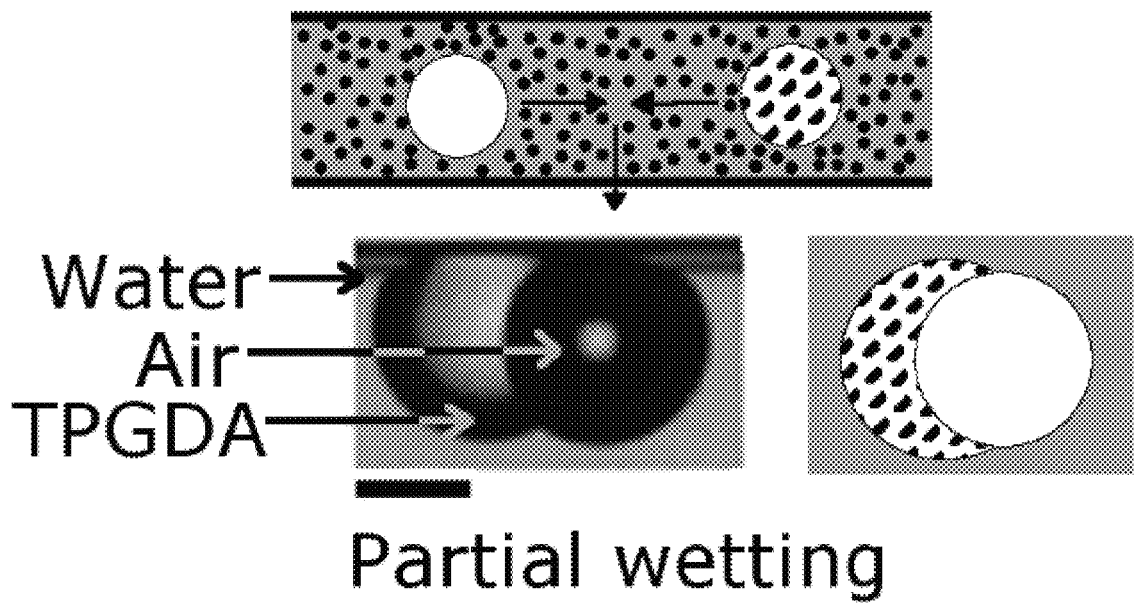
Figure 3C:
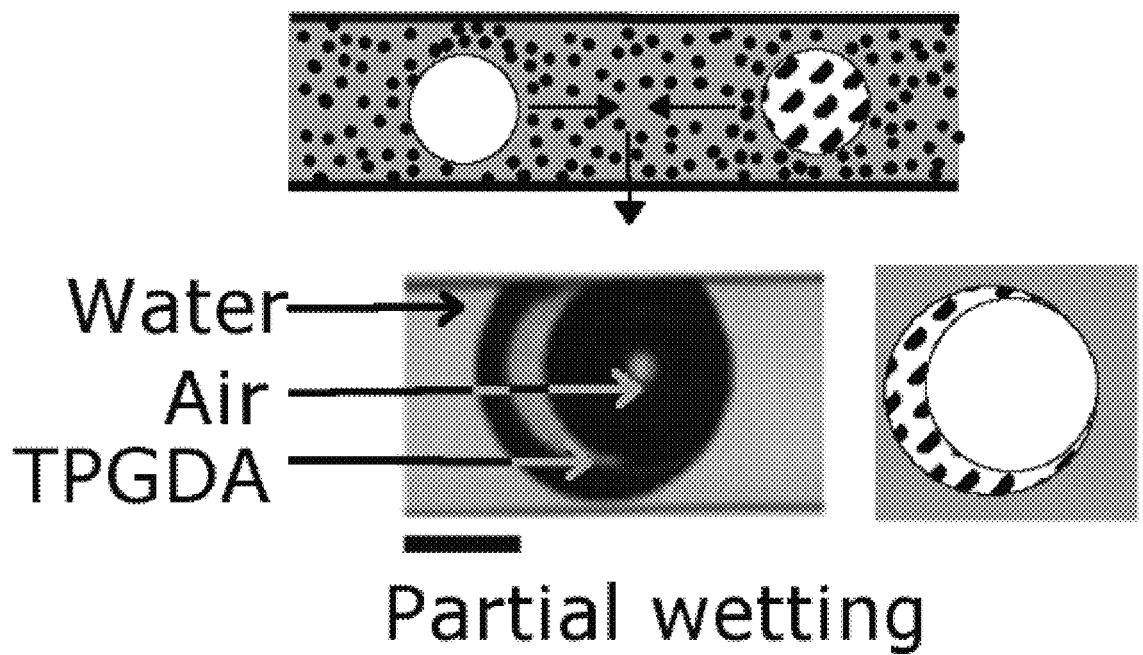
Figure 3D:
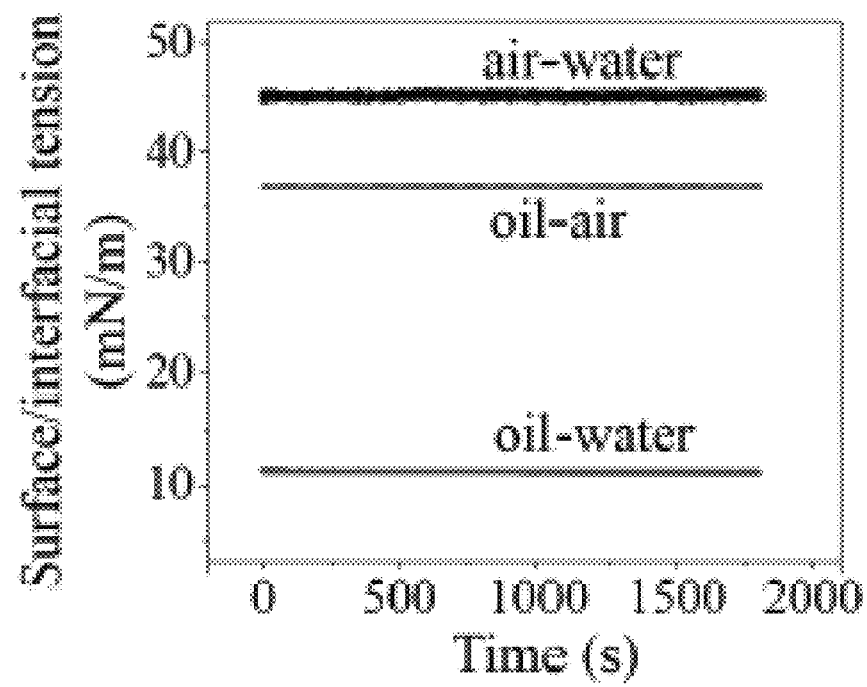
Figure 3E:
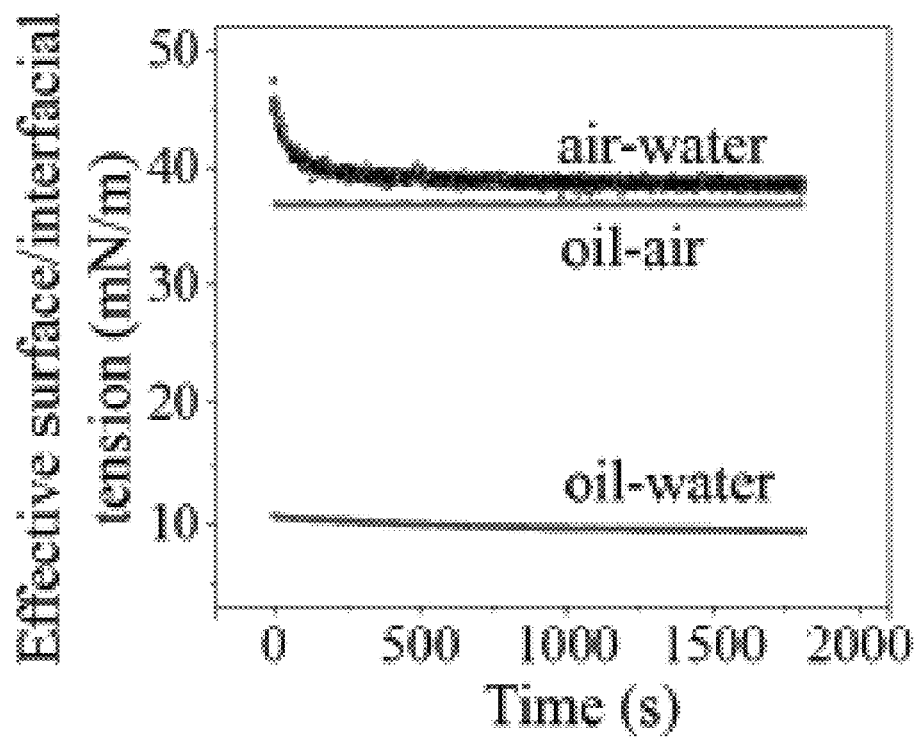
Figure 3F:
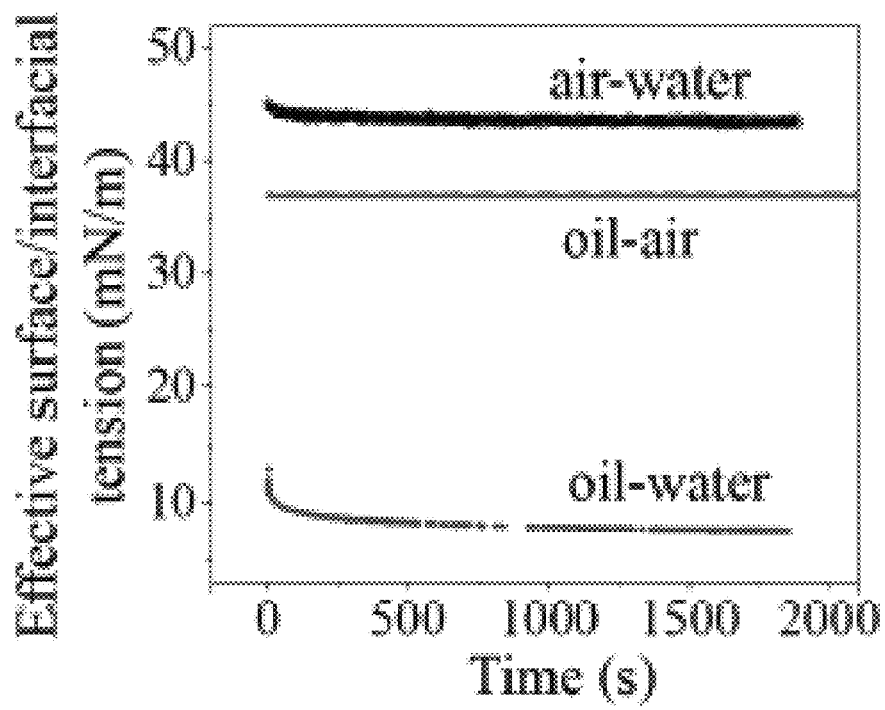
Figure 3G:
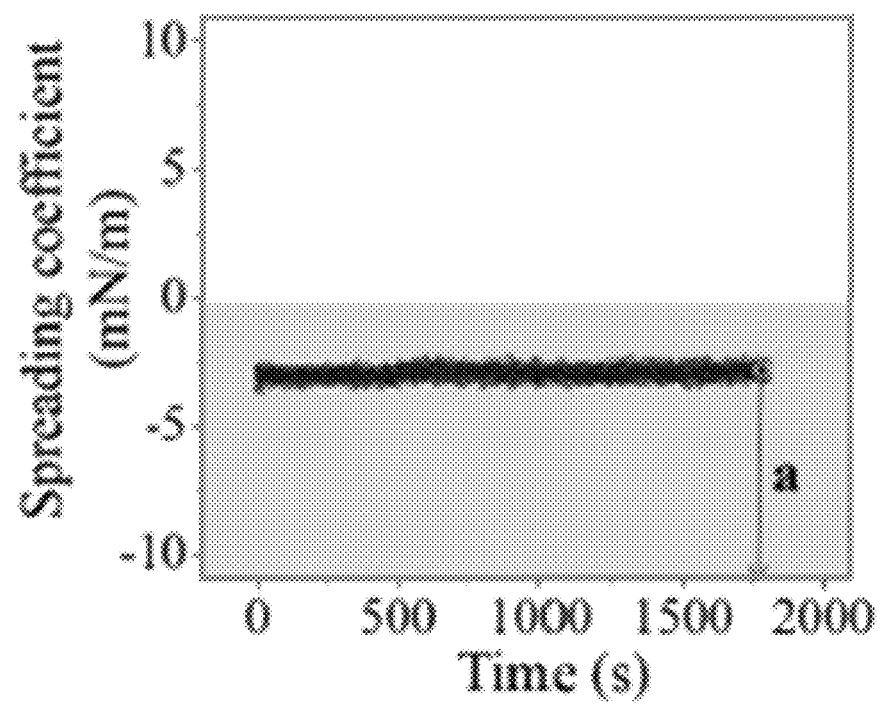

As the observations of FIGS. 2A-2I demonstrate, particles can promote bubble wetting and induce the complete bubble engulfment by hexadecane. Particles can also be used to promote bubble dewetting and reduce the wetting area between an oil droplet and a gas bubble. Here, a system was employed in which hexadecane was replaced by the more polar TEGDMA. Since TEGDMA has a non-negligible water solubility of 4 $gL^{-1}$, the TEGDMA and water phase were saturated before performing the experiments and interfacial measurements so that equilibrium was reached. In the absence of particles, this system experiences partial engulfment of the air bubble by the oil as seen in FIG. 3A. Although the systems maintain partial wetting in the presence of 0.2 wt % EC or HP 55 particles in the water phase (FIGS. 3B and 3C), the presence of 0.2 wt % EC particles in the water phase induces further dewetting and substantially reduces the oil-bubble contact (FIG. 3B). It can be quantified by the equilibrium contact angle at the three-phase contact line (FIG. 1) (Guzowski, et al., *Soft Matter* 2012, 8, 7269). For the contact angle θ, measured through oil phase, $$\cos\theta_o = \frac{\gamma'^2_{aw} - (\gamma'^2_{ow} + \gamma'^2_{ao})}{2\gamma'_{ow}\gamma'_{ao}} \quad (2)$$

Where γaw, $\gamma'_{ao}$, and $y'_{ow}$ are the respective interfacial tensions and a, w, o denotes air, water, oil phase, respectively. By analyzing the dynamic surface and interfacial tensions (shown in FIGS. 3D and 3E), it was found that the effective spreading coefficient of TEGDMA changes from −2.4 mN $m^{-1}$ without particles to −7.8 mN $m^{-1}$ in the presence of 0.2 wt % EC particles. The corresponding three-phase contact angle measured through the oil phase increased from 43.2° to 87.4°. These results demonstrate that particles can be used to promote "bubble dewetting" and substantially reduce the oil-bubble contact area. When the experiment were carried out with unsaturated TEGDMA and water phases, the initial oil spreading coefficient was positive and the bubble was fully engulfed by the oil. In the absence of particles, a slow transition to partial engulfment over several hours was then be observed as partial mixing of the liquids in the interfacial region proceeds and shifted the balance of interfacial tensions toward a negative oil spreading coefficient. In the presence of 0.2 wt % EC particles, by contrast, the transition from complete to partial engulfment happened in less than 10 min and eventually the system reached the same final state depicted in FIG. 3B.

Wetting Behavior as Function of Particle Concentration

Figure 3H:
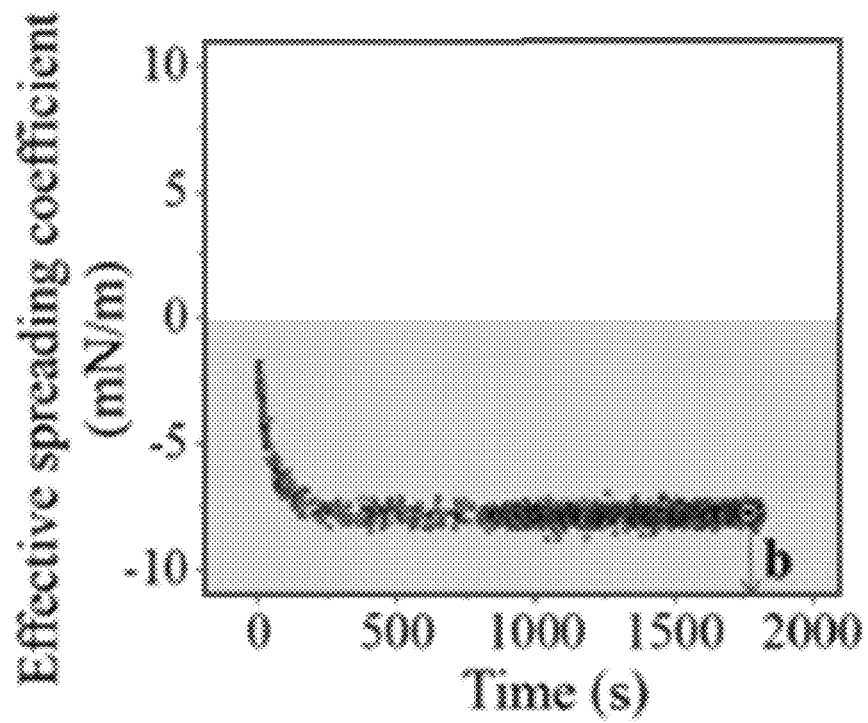
Figure 3I:
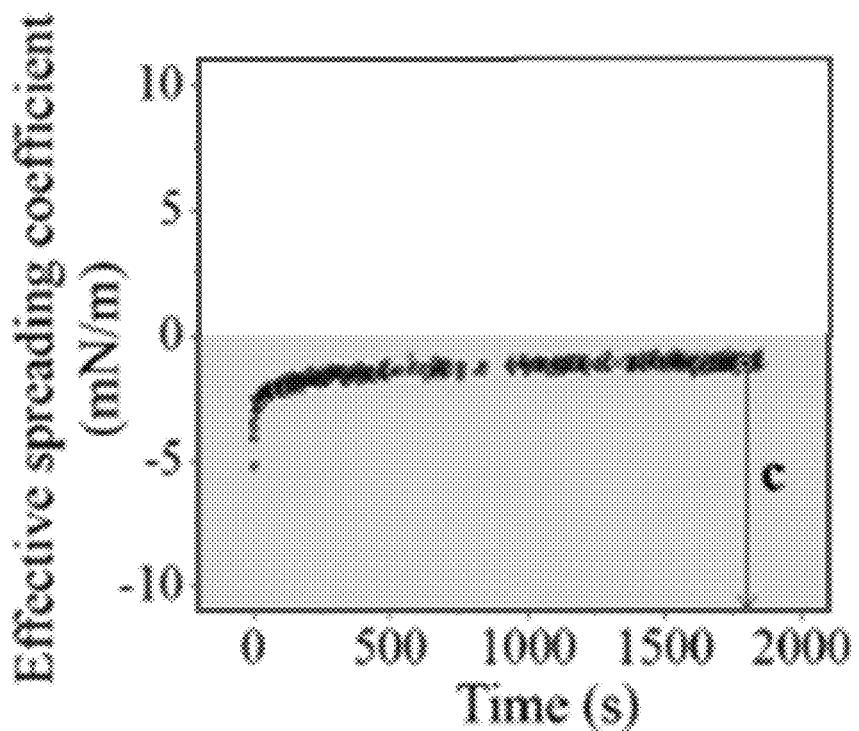
Figure 4A:
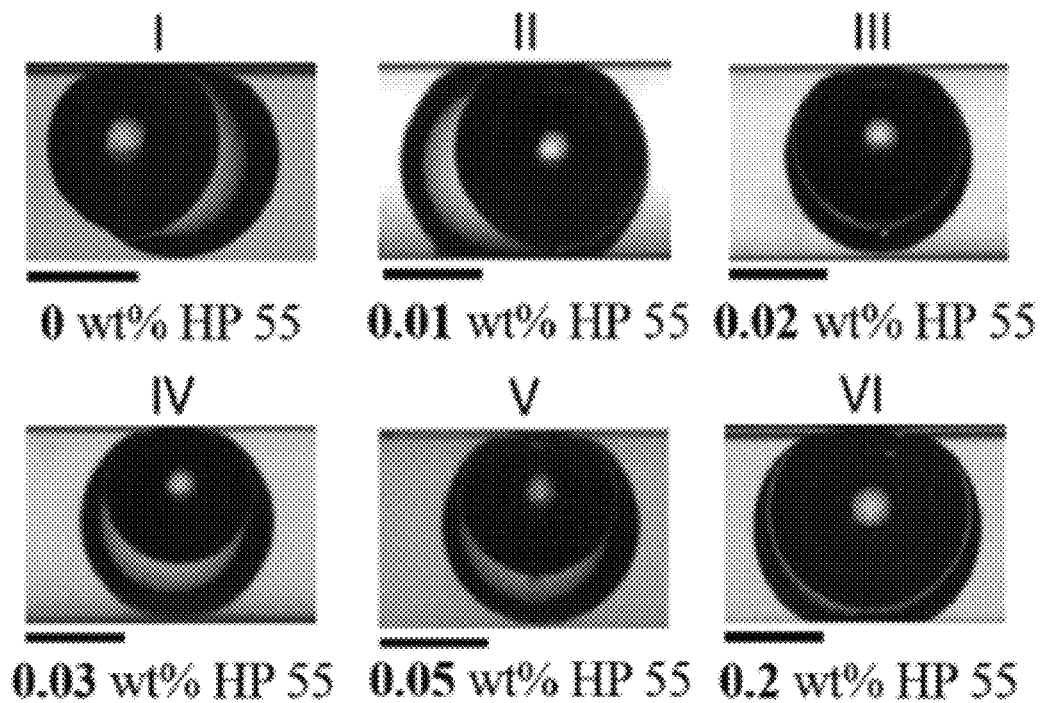
FIGS. 4A-4D show wetting behavior as a function of particle concentration.
Figure 4B:
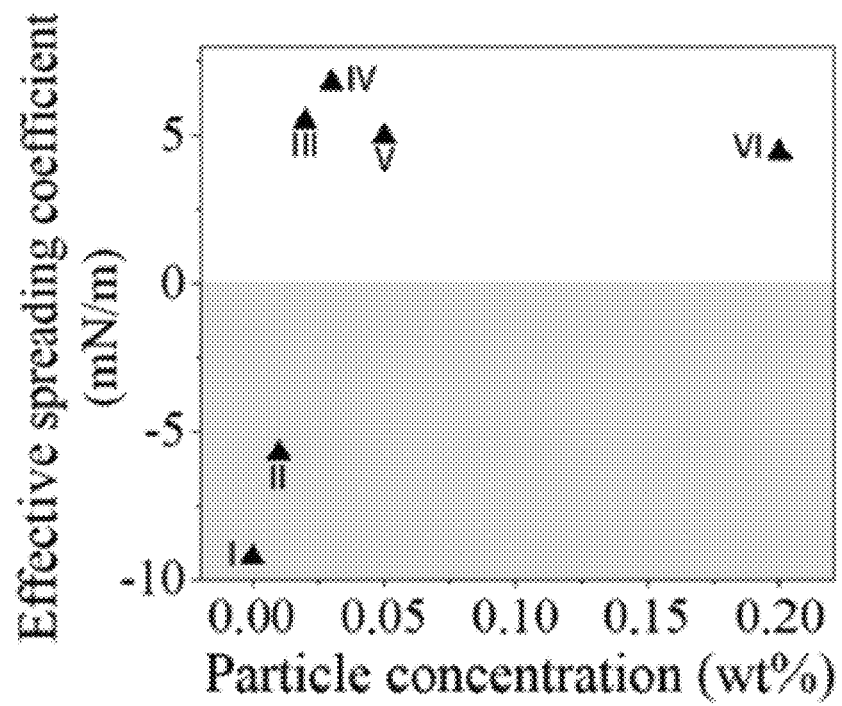
Figure 4C:
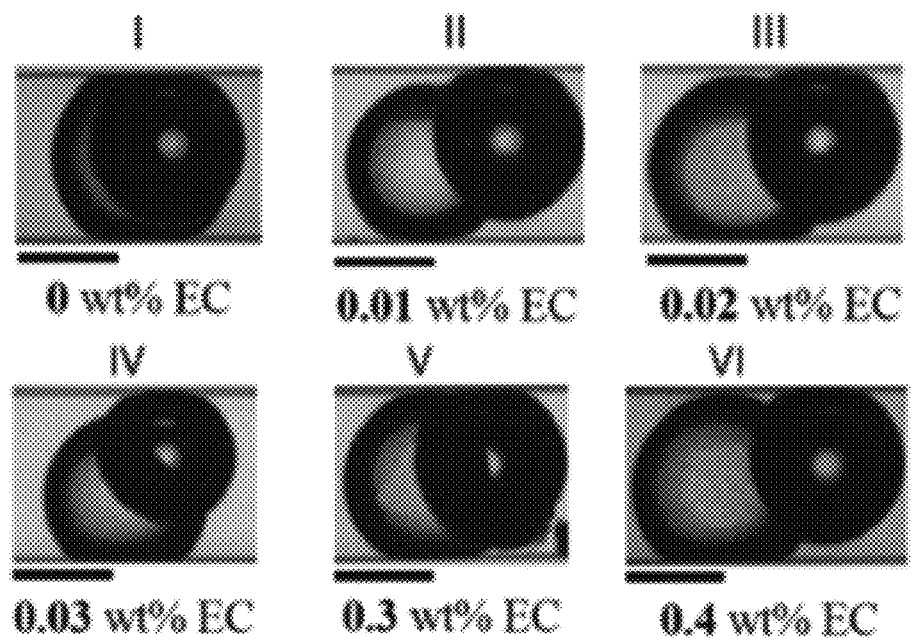
Figure 4D:
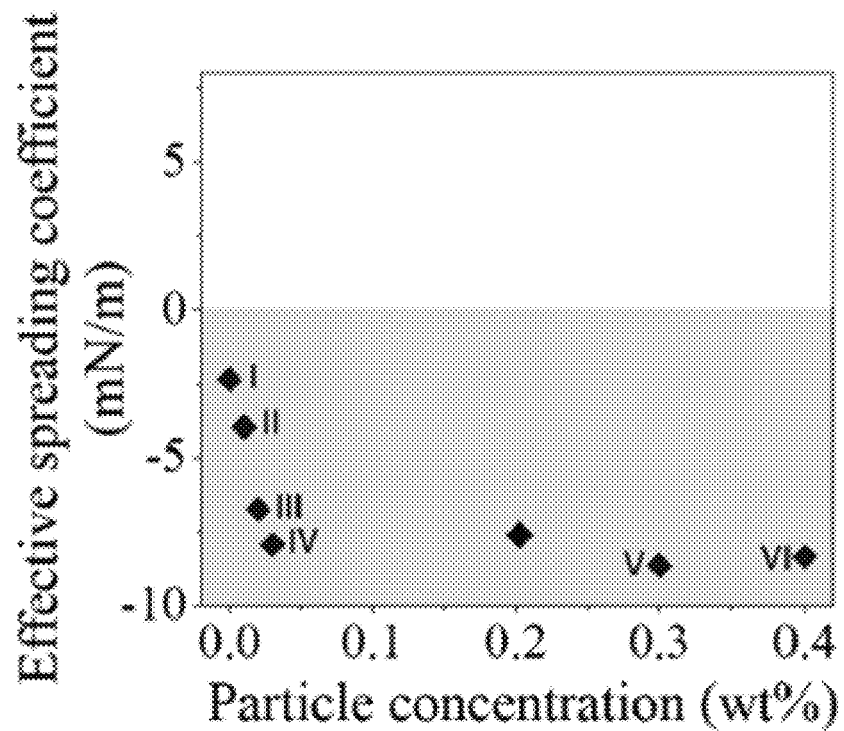

In FIGS. 2A-2I and FIGS. 3A-3I, only one specific particle concentration (0.2 wt %) was used to demonstrate that particles can be used to change the wetting configurations. The effect of particle concentration was further investigated (FIGS. 4A-4B). FIG. 4A shows the stable wetting morphologies and the corresponding effective spreading coefficients of the air-hexadecane-water system for different concentrations of the HP 55 particles (from experiments analogous to those shown in FIGS. 2C, 2F, and 2I). Both the visual observation of the bubble droplet pairs and measured effective spreading coefficient demonstrated that the wetting morphology changed from partial to complete wetting at the particle concentration around 0.02 wt %. FIG. 4B shows the corresponding wetting morphologies and effective spreading coefficients of the air-TEGDMA-water system in the presence of various concentrations of EC particles (experiments analogous to those shown in FIGS. 3B, 3E, and 3H). The observed wetting configuration demonstrates that the presence of only 0.01 wt % already gives rise to significant bubble dewetting, whereas the measured the effective spreading coefficient suggests that the effect plateaus at a somewhat higher concentration (around 0.03 wt %). This difference might be explained by the difficulty of comparing droplet images taken at slightly different viewing angles and the possibility that full equilibrium had not been reached within the experimental observation period at these very low particle concentrations.

Direct Observation of the Interfacially Absorbed Particles

Figure 5A:
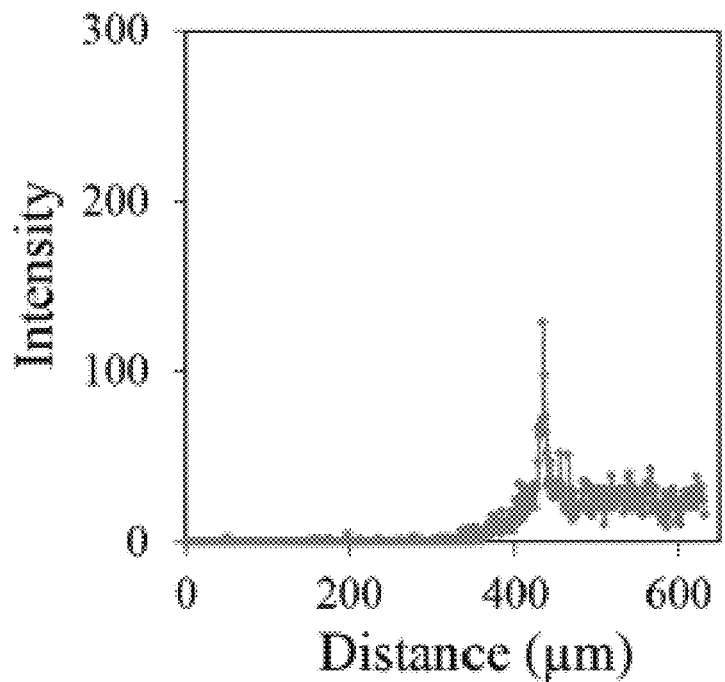
FIGS. 5A-5C show a fluorescence intensity profile across the interface for (FIG. 5A) the hexadecane-water interface when an air bubble and hexadecane droplet were brought into contact in an aqueous medium containing 0.2 wt % Nile red labeled HP 55 particles (FIG. 5B) the air-water interface when an air bubble and hexadecane droplet were brought into contact in an aqueous medium containing 0.4 wt % Nile red labeled EC particles, and (FIG. 5C) the hexadecane-water interface when an air bubble and hexadecane droplet were brought into contact in an aqueous medium containing 0.4 wt % Nile red labeled EC particles. The distance along the bottom axis indicates location along a line perpendicular to the interface, taken from confocal microscope images of each interface.
Figure 5B:
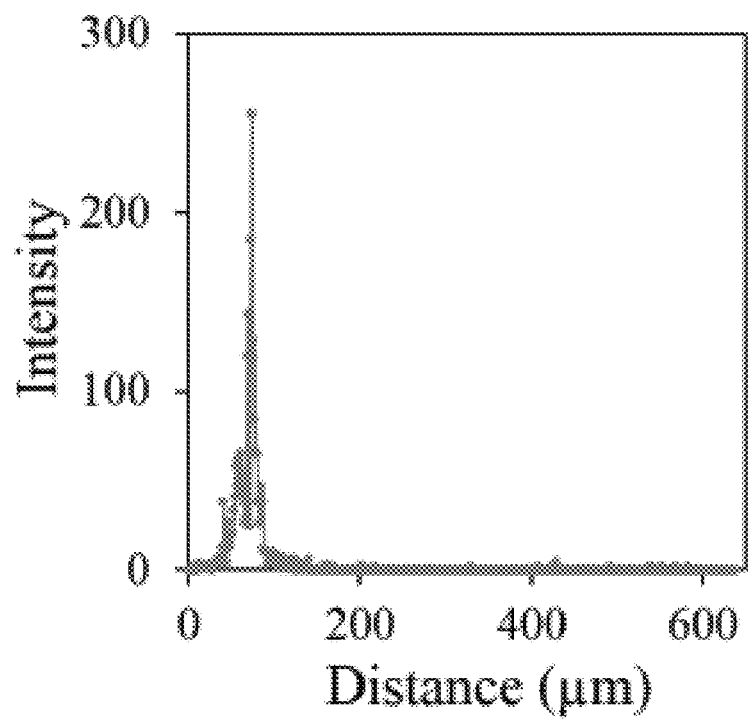
Figure 5C:
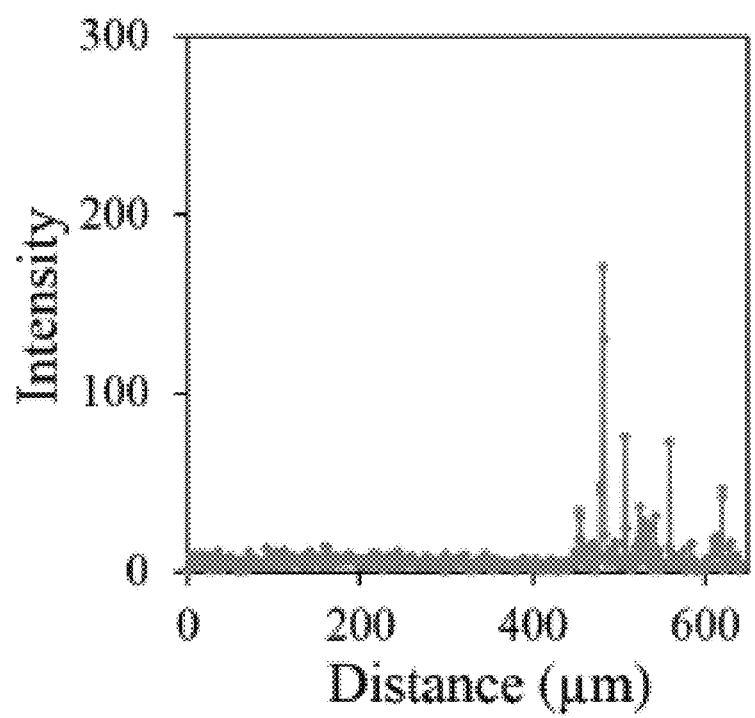

To demonstrate that particle adsorption at the fluid-fluid interfaces is indeed the cause for the observed modulation of the wetting configurations, The EC and HP 55 particles were labeled with Nile red and observed via confocal microscopy. When the air bubble and hexadecane droplet were brought into contact in water containing 0.2 wt % Nile red labeled-HP 55 particles, complete bubble engulfment was observed, the same wetting configuration found in the presence of label-free HP 55 particles. The confocal micrograph and the intensity profile (FIG. 5A) indicate an accumulation of the HP 55 particles at the hexadecane-water interface. This particle adsorption reduces the energetic penalty (tension) of the oil-water interface, thus promoting its expansion. When the air bubble and hexadecane droplet were brought into contact in water containing Nile red labeled EC particles, the system was observed to retain the partial bubble engulfment, even when the particle concentration was doubled to 0.4 wt %. Confocal images and the fluorescence intensity profiles suggested that EC particles accumulated at both the air-water and hexadecane-water interface (FIGS. 5B and 5C). Again, the particle adsorption in the hexadecane-water interface reduces the effective oil-water interfacial tension and raises the oil spreading coefficient, but in the case of EC particles the competing adsorption in the air-water interface (FIG. 5B) is also strong and mitigates the increase in the oil spreading coefficient, keeping its final value below zero (FIG. 2H). The fluorescence intensity from particles at the air-water interface (FIG. 5B) in fact exceeds the intensity recorded from the oil-water interface (FIG. 5C), for which the particle-induced reduction of interfacial tension is nonetheless more pronounced (FIGS. 2E and 2H). These observations are not inconsistent, the fluorescence intensity does not lend itself for direct comparison of the particle concentrations in the two interfaces, because it also depends on the fluid environment, while that the reduction in interfacial tension depends not only on the interfacial particle concentration, but also on the particle contact angle with the interface.

Figure 6A:
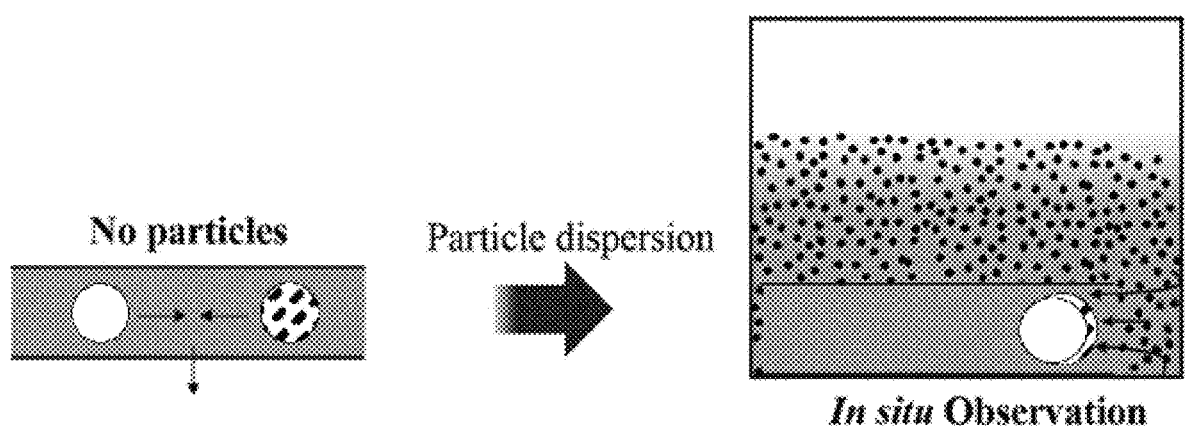
FIGS. 6A-6C show in situ transition of the wetting morphology as particles diffuse to the interfaces.
Figure 6B:
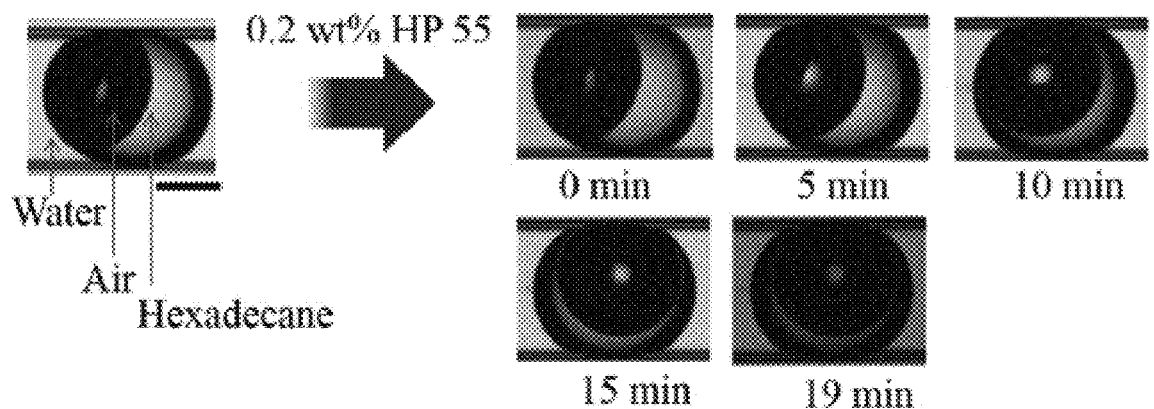
Figure 6C:
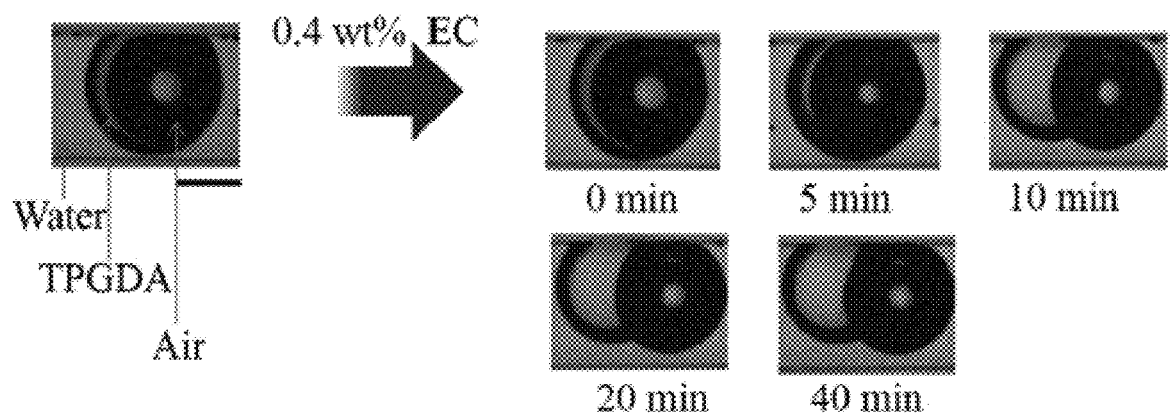

In addition to tuning the wetting configuration through the selection of particles, the dynamic, in situ change of pre-formed wetting morphologies upon addition of particles to the system was also observed. An air bubble and an oil droplet, both suspended in the water phase, were brought into contact in a glass tube open at both ends. This tube was then placed into a particle dispersion containing either 0.4 wt % EC or 0.2 wt % HP 55 particles (FIG. 6A). As HP 55 particles diffused into the tube, it was observed that the wetting morphology changed from partial to complete wetting for the air-hexadecane-water three-phase system over the course of 15 min (FIGS. 6A-6B). A substantial reduction of oil-bubble contact area was seen when exposing the air-TEGDMA-water three-phase system to the EC particle dispersion (FIG. 6C). The final configurations observed here match the ones seen when the particles are present before the bubble and oil droplet are brought into contact (FIGS. 2A-2I and 3A-3I). The experiments of FIGS. 6A-6C show that the particles can be used to reconfigure an already established wetting state in situ.

Particle-Induced Reentrant Wetting Behavior

Figure 7:
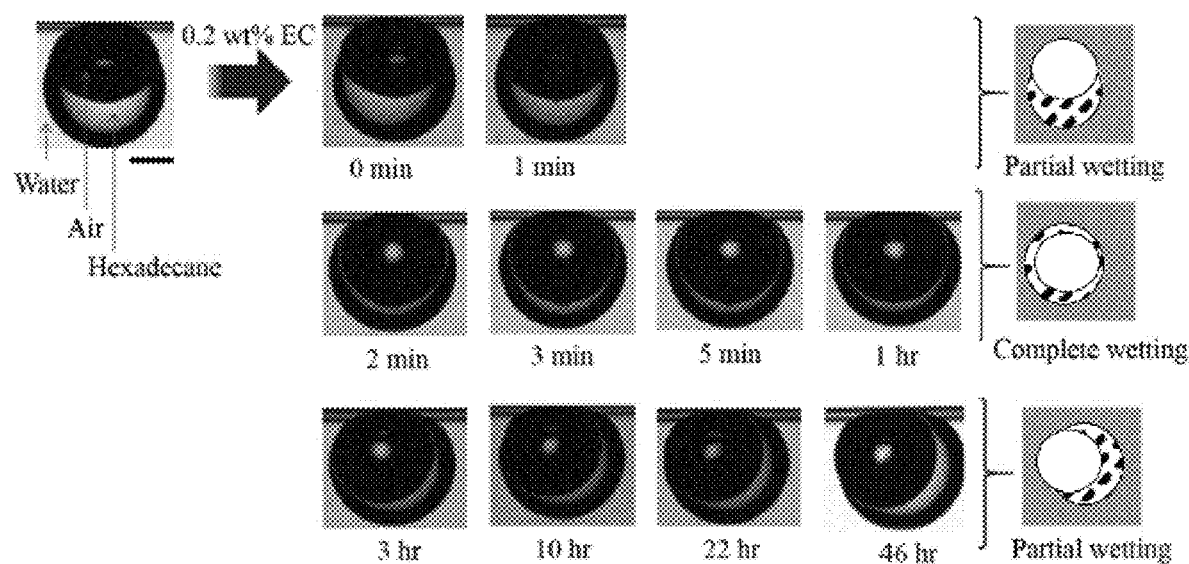
FIG. 7 shows reentrant wetting transition observed for the air-hexadecane-water system upon exposure to 0.2 wt % EC particles. Particles were introduced as sketched in FIG. 6A, the scale bar is 500 μm.
Figures 8A, 8B, 8C, 8D, 8E, 8F:
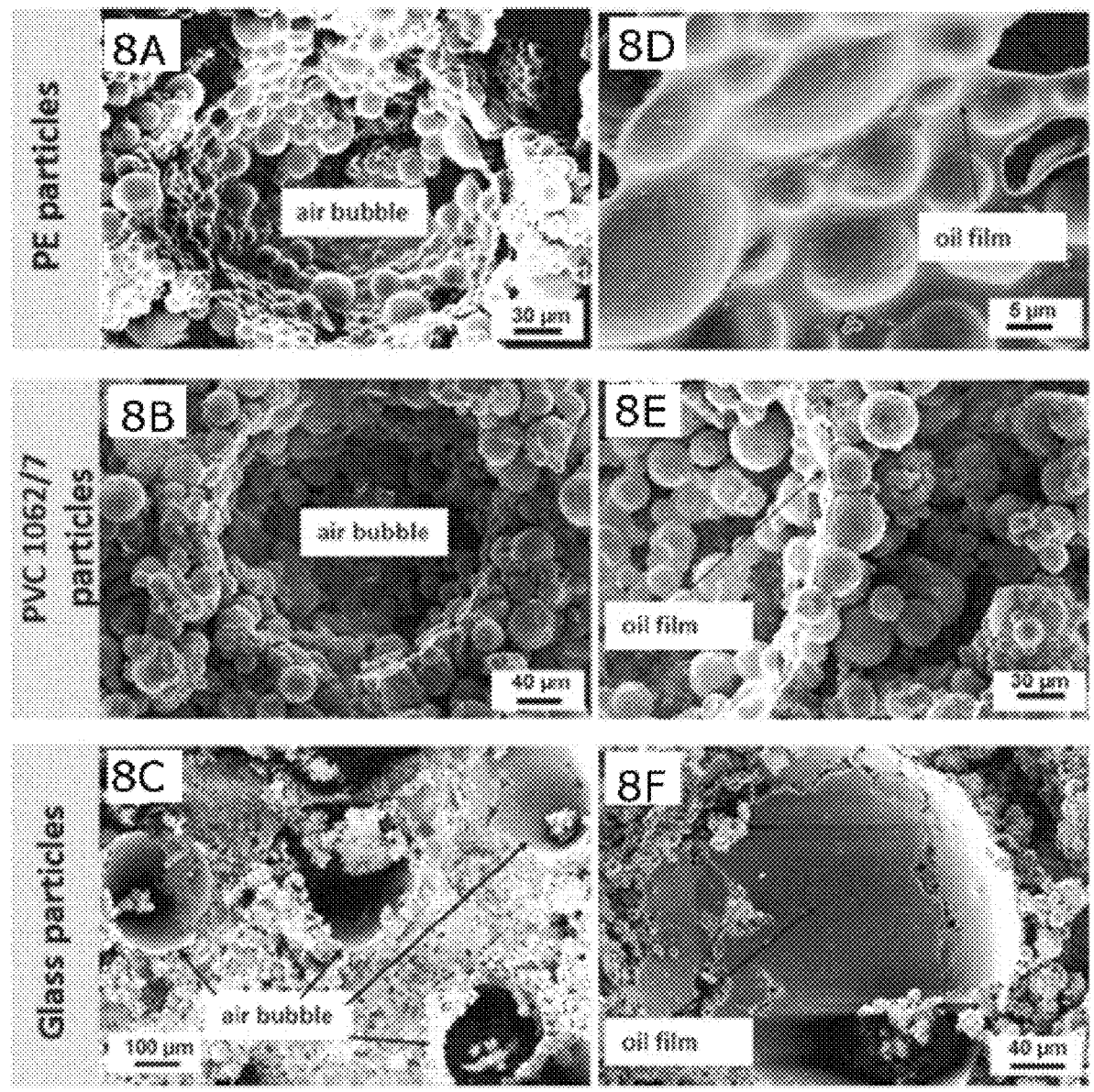
FIGS. 8A-8L show combined adsorption of particles and secondary liquid at bubble surfaces of a capillary foam.
Figures 8G, 8H, 8I, 8J, 8K, 8L:
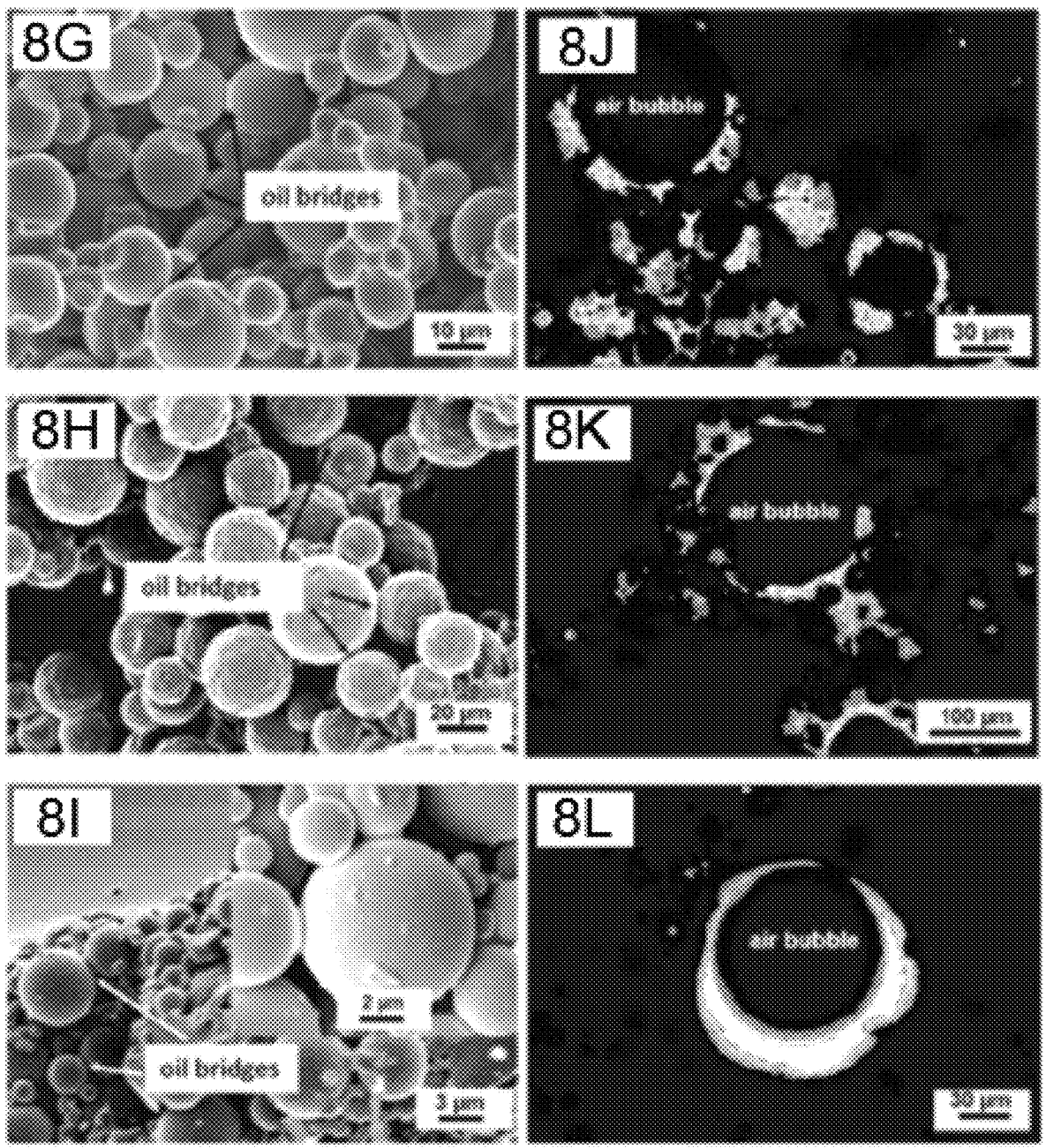

It was demonstrated that particles can be used as wetting modifiers (FIGS. 2A-2I, 3A-3I, 4A-4B, and 6A-6C). FIG. 2B indicated that the presence of 0.2 wt % of EC particles did not qualitatively change the equilibrium wetting behavior of air-hexadecane-water system, but dynamic interfacial tensiometry (FIG. 2E) suggested an effective spreading coefficient (FIG. 2H) that transiently assumes positive values before dropping back below zero. This demonstrated that particles can induce a reentrant wetting behavior, with a transition from partial to complete and back to partial bubble engulfment by the oil, and such behavior was indeed observed. To test whether this reentrant wetting can also be observed upon exposure of a pre-established, partially engulfed bubble to the particles, a dynamic reconfiguration experiment analogous to those described by FIGS. 6A-6C was carried out: An open glass tube, filled with an air bubble partially engulfed by hexadecane in particle-free water and held horizontally, was placed into a particle dispersion containing 0.2 wt % EC particles. As the particles diffused into the tube, it was observed that the wetting morphology changed from partial to complete bubble engulfment within the first 2 min (FIG. 7), and then back to partial engulfment over the course of 3 h. Such slow and reentrant bubble or droplet wetting does not appear to have ever been observed in particle-free systems (with surfactants as wetting modifiers).

Both the tension of the air-water interface and of the hexadecane-water interface decreased with time as a result of interfacial particle adsorption (FIG. 2E). As the figure shows, the rate of tension reduction was larger for the oil-water interface than for the air-water interface, which can be attributed to the faster rate of particle adsorption to the oil-water interface. Both bare oil-water and air-water interfaces tend to carry negative electric surface charge, most likely due to the adsorption of hydroxylions (Graciaa, et al., *J. Colloid Interface Sci.* 1995, 172, 131; Marinova, et al., *Langmuir* 1996, 12, 2045; Stachurski, et al., *J. Colloid Interface Sci.* 1996, 184, 433; Yang, et al., *J. Colloid Interface Sci.* 2001, 243, 128; Elmallidy, et al., *Int. J. Miner. Process.* 2008, 89, 40; Oliveira, et al., *Int. J. Miner. Process.* 2011, 98, 118; Jia, et al., *Int. J. Electrochem. Sci* 2013, 8, 5828). EC particles in water are also negatively charged (with zeta potential of ~50 mV at pH 6). Electric double-layer interaction and image charge repulsion can result in an electrostatic barrier to particle adsorption to the interface, and one may expect the barrier to be higher at the interface with the larger jump in the dielectric permittivity, i.e., the air-water interface (Wang, et al., *J. Phys. Chem. Lett.* 2012, 3, 2986). The faster particle adsorption to the oil-water interface may result from a weaker adsorption barrier in the oil-water interface. Similar dynamic tension effects were also found for negatively charged silica particles (with a zeta potential of ~46.3 mV) adsorbing to air-water and hexadecane-water interfaces. In the reentrant wetting shown in FIG. 7, the fast reduction of the effective interfacial tension at the hexadecane-water interface initially caused the effective oil spreading coefficient to become positive and triggered the complete bubble engulfment by the oil (FIG. 2H). Once the air-water interface had been completely replaced by the oil film, a new air-water interface (i.e., a hole in the engulfing oil film) first had to nucleate before that new interface could grow and be stabilized by adsorbing particles.

Discussion

In this example, it was demonstrated that particles can be used both to promote "bubble wetting" and to trigger "bubble dewetting." Commercially available EC or HP 55 particles could contain impurities, which tend to be surface-active and may affect the wetting configuration. For the particle suspension used in this example, the EC and HP 55 particle suspensions were passed three times through a C18-silica chromatographic column (Phenomenex) that had been preactivated with an acetonitrile-water (80:20) mixture and flushed several times with hot DI water (Cayre, et al., *Langmuir* 2004, 20, 9594). In addition, the dynamic surface tensions of supernatants of EC and HP 55 particles were studied after centrifuging their particle dispersions. These surface tension measurements showed close agreement with the surface tension of ultrapure DI water and suggests that there are no significant surface-active contamination or impurities in the EC and HP 55 particle suspension used in this example.

This example demonstrates that the adsorption of particles at fluid-fluid interfaces provides a surfactant-free method of tuning and reconfiguring wetting morphologies in colloidal multiphase systems. The adsorbed particles can act as not only wetting modifiers but also as efficient stabilizers. Although surfactants can be used to tune interfacial wetting configurations in these systems, there are a number of reasons why particle-based wetting adjustments are interesting. Surfactants are prone to chemical degradation under harsh application conditions and their tendency to fluctuate into and out of the interface can reduce the stability of a wetting configuration (Worthen, et al., *J. Colloid Interface Sci.* 2013, 391, 142; Tarek, *Master Degree Thesis*, The University of Texas at Austin, December 2012). Furthermore, the potential toxicity and environmental accumulation of certain surfactants is problematic for some applications (Rosen, et al., *Surfactants and Interfacial Phenomena*, Wiley-VCH, Weinheim, Germany 2012). Finally, surfactants can be difficult to recover from the final product, which is a significant concern in products requiring high purity or surfactant reuse (Crossley, et al., *Angew. Chem. Int. Ed.* 2012, 51, 10746). Colloidal particles do not share most of these problems, although their comparatively slow diffusion can sometimes be a disadvantage, and their size makes it harder to stabilize submicron-sized droplets or bubbles. Hazardous organic surfactants could be avoided and replaced by environmentally friendly, biorenewable, or even food-grade particles in cosmetic, pharmaceutical, or food applications (Dickinson, *Curr. Opin. Colloid Interface Sci.* 2010, 15, 40; Frelichowska, et al., *Colloids Surf., A* 2009, 343, 70). Furthermore, particles offer convenient options for separation and recovery by filtration or centrifugation. As in the case of most particle-coated emulsion droplets or air bubbles (in Pickering emulsions and foams), the adsorption of particulate wetting modifiers should be practically irreversible because of the high adsorption energy typical for colloidal particles, and lead to the formation of very stable wetting states in the colloidal multiphase system (Alargova, et al., *Langmuir* 2004, 20, 10371; Binks, et al., *Angew. Chem. Int. Ed.* 2005, 44, 3722; Gonzenbach, *Angew Chem. Int. Ed.* 2006, 45, 3526; Zhang, et al., *Angew. Chem. Int. Ed.*

2014, 126, 13603; Li, et al., *Angew. Chem. Int. Ed.* 2009, 48, 8490; Destribats, et al., *Langmuir* 2014, 30, 9313).

Conclusion

A strategy for tuning the wetting configuration of colloidal multiphase systems is demonstrated. Through the adsorption of cellulosic particles at fluid-fluid interfaces, a change of surface and interfacial tensions was achieved, as determined by dynamic pendant drop tensiometry. The wetting morphology predicted by the effective spreading coefficient, calculated from dynamic tensiometry data, agreed with the directly observed wetting configurations. In addition, particles were show to induce slow, reentrant wetting behavior. This example provided a strategy for controlling and predicting the wetting configuration of an air bubble and an oil droplet in a water medium, which is relevant to a wide variety of materials research problems, industrial processes, and commercial products. The tuning method presented here can be general and can be applicable also to other types of particles and colloidal multiphase systems, such as complex emulsions of three or four immiscible liquids (Pannacci, et al., *Phys. Rev. Lett.* 2008, 101, 164502.1; Zarzar, et al., *Nature* 2015, 518, 520). Furthermore, the tenability of interfacial tensions via particle absorption demonstrates that particles can also be useful as wetting modifiers in liquid-liquid-solid and liquid-vapor-solid systems.

Example 2: Stabilization of Liquid Foams Through the Synergistic Action of Particles and an Immiscible Liquid In this example, a class of foams is reported, obtained by frothing a suspension of colloidal particles in the presence of a small amount of an immiscible secondary liquid. An aspect of these foams, termed capillary foams, is the particle-mediated spreading of the minority liquid around the gas bubbles. The resulting mixed particle/liquid coating can stabilize bubbles against coalescence even when the particles alone cannot. The coated bubbles are further immobilized by entrapment in a network of excess particles connected by bridges of the minority liquid. Capillary foams were prepared with a diverse set of particle/liquid combinations to demonstrate the generality of the phenomenon. The observed foam stability correlates with the particle affinity for the liquid interface formed by spreading the minority liquid at the bubble surface.

The foam materials demonstrated in these examples ("capillary foams") dramatically expands the range of viable particles for foam stabilization, and in which gas bubbles are stabilized by the combined action of particles and a small amount of an immiscible secondary liquid. This example focused on water-based foams with different oils as the secondary liquid. The presence of a small amount of oil led to stable foams, even when the particles could not stabilize foam bubbles by themselves. In the absence of oil, mechanical frothing of an aqueous suspension of polyvinyl chloride particles produced only a very small foam head, and this foam disintegrated within 24 h. However, if as little as 0.5 wt % (with respect to the water bulk) of photopolymerizable oil trimethylolpropane trimethacrylate (TMPTMA), paraffin oil, or diisononyl phthalate (DINP) was added to the particle suspension prior to frothing, a large amount of foam was formed, which showed no significant degradation over several weeks. Similar behavior was observed for other types of particles (modified cellulose, modified silica, and glass). This synergy of oil and particulate foam stabilizers is remarkable because oils are usually considered detrimental for foam stability, and are commonly used as defoaming agents.

Experimental Section

A suspension of particles in water as the primary liquid was obtained by initially dispersing the particles through sonication; then a small amount (0.5-3.0%) of immiscible secondary liquid was added. The resulting suspension was frothed using a rotor-stator homogenizer (IKA UltraTurrax T10, stator diameter of 8 mm and rotor diameter of 6.1 mm) at 30000 rpm for 1 min (3×20 s with 20 s rest periods). The wet foam was characterized with respect to foam stability. The foam stability was assessed by monitoring foam height over time at ambient temperature. Confocal laser scanning microscopy (CLSM) was performed using a Zeiss LSM 510 VIS confocal microscope. Nile red (0.01 wt %) was used as a staining agent for the oil phase using excitation at 543 nm and emission above 560 nm. The wet foam containing TMPTMA was settled by exposure to UV light (Spectro-Line Longlife Filter, wavelength 365 nm) for 2 h and then dried in the oven at 70° C. for 16 h. SEM images of gold-coated surfaces were taken using a Zeiss Ultra60 field emission scanning electron microscope (FE-SEM; Carl Zeiss Microscopy, LLC North America, Peabody, Mass.) operated at an accelerating voltage of 5 kV.

Materials

Polyvinyl chloride particles with different size and wettability (Vinnolit SA I 062/7 and Vinnolit P70F) were obtained from Vinnolit, Germany. Polyethylene (PE) particles were purchased from Polysciences, Inc., USA. The silica samples (Aerosil 200) were obtained from Evonik, USA and then treated with trimethoxymethylsilane as provided by Sigma-Aldrich. Cellulose powder was purchased from Sigma-Aldrich and then modified with poly(maleic anyhydride-1-octadecene) obtained from Polysciences, Inc., USA. The glass samples were obtained from Potters Industries LLC as Spheriglass 5000 solid glass microspheres. The glass was cleaned with acetone. The aluminum oxide particles were purchased from Sigma-Aldrich. Monodisperse silica spheres (SS03N, 0.96 μm) were obtained from Bangs Laboratories, Inc. Scanning electron micrographs of particles used in this study and particles size distribution are shown in FIGS. 13A-13H and FIGS. 14A-14G respectively. The secondary fluids used in this study were trimethylolpropane trimethacrylate (TMPTMA, Sigma-Aldrich), paraffin (Sigma-Aldrich), and diisononyl phthalate (DINP, Sigma-Aldrich). Polyvinyl chloride particles (Vinnol it SA I 062/7) were washed with deionized water several times before use. The gelling agent for the water phase used in the gel trapping method was gellan gum (Kelcogel, CPKelco). The hot gelling solution was purified by passing it twice through a C 18-silica chromatographic column (Phenomenex) preactivated with an acetonitrile (Sigma-Aldrich)-water (80:20) mixture (Paunov, *Langmuir* 19, 7970-7976). Sulfuric acid and hydrogen peroxide were purchased from VWR international and EMD Millipore respectively. All the chemicals were used as received, unless otherwise noted. Ultrapure water with a resistivity of 18.2 MΩ·cm (Barnstead) was used.

Contact Angle Measurements

Figure 15A:
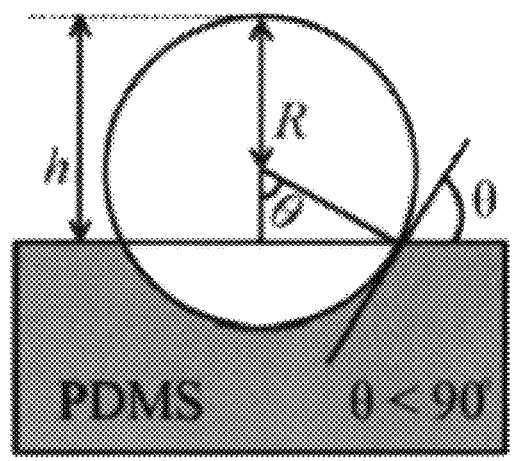
FIGS. 15A-15B show a schematic representation of a PDMS replica with trapped particle.
Figure 15B:
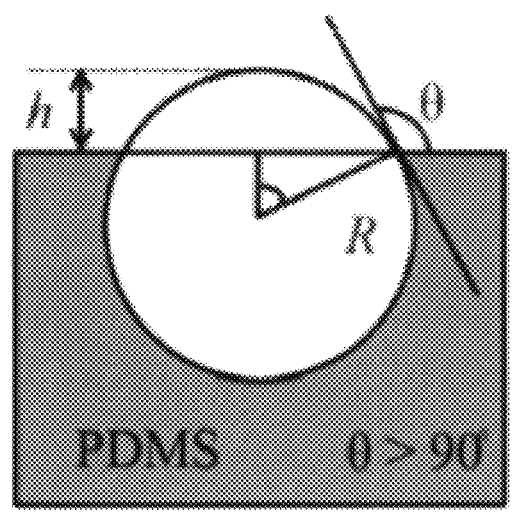

The recently developed gel-trapping technique (GTT) has proven to be a powerful method for determining particle contact angles at a fluid-fluid interface and was used in this work (Paunov, *Langmuir* 19, 7970-7976, 2003; Cayre, et al., *Langmuir* 20, 9594-9599). The GTT involves spreading colloidal particles at a water-oil or water-air interface and subsequent gelling of the aqueous phase with a non-surfaceactive gelling agent (Paunov, *Langmuir* 19, 7970-7976, 2003). The top phase is removed and replaced with curable polydimethylsiloxane (PDMS), which is then cured and peeled off the gel. The PDMS replica of the interface with entrapped particles was imaged by Scanning Electron Microscope (SEM). The height of protrusion, h, and the equatorial radius, R, of particles at the interface were obtained from the SEM images (FIGS. 15A-15B). The particle contact angle is given by (Arnaudov, et al., *Phys. Chem. Chem. Phys.* 12, 328-331, 2010):

$$S'_i = \gamma'_{jk} - (\gamma'_{ij} + \gamma_{ik}) \tag{3}$$

The value of the particle contact angle was determined by averaging over a large number of particles.

The GTT protocol reported in the literature typically starts with the introduction of particles to interface using a spreading solvent such as isopropanol (IPA) (Paunov, *Langmuir* 19, 7970-7976, 2003; Cayre, et al., *Langmuir* 20, 9594-9599). Here, the particles were delivered to the interface using mechanical force instead of a spreading solvent, because spreading solvents have been demonstrated to affect the particle wetting properties, IPA for instance making particles appear more hydrophobic (Maestro, et al., *Phys. Chem. Chem. Phys.* 12, 14115-14120, 2010). Our sample preparation protocol for GTI proceeded as follows: in the case of the air-water interface, 0.001 wt % particles were dispersed in water by sonication (VWR Model 82500A-MT ultrasonic cleaner) for 30 minutes and then delivered to the air-water interface by homogenization (IKA UltraTurrax T10, stator diameter of 8 mm and rotor diameter of 6.1 mm) in a Petri dish. Air bubbles were removed with a mild vacuum (100 mbar), and the sample temperature was raised to 50-55° C. An aqueous 3 wt % solution of gel solution was added to the hot aqueous phase. The system was then cooled quickly to 25° C. to set the gel and immobilize the particles at the interface. PDMS was spread on the top of the aqueous gel and cured to generate a PDMS replica with trapped particles. For the case of oil-water interface, the same procedure was used to prepare the aqueous dispersion, deliver the particles to the interface, and remove air bubbles. Then the oil was carefully added at the air-water interface. The sample was moved to the oven at 50-55° C. An aqueous 3 wt % solution of gel solution was added to the hot aqueous phase. The system was cooled quickly to 25° C. to set the gel. Then, the oil phase was carefully removed and immediately replaced with PDMS.

After curing the PDMS layer at room temperature for 48 h, it was peeled off the aqueous gel (along with the entrapped particles at the interface) and washed with pure hot water to remove any gel residues from the PDMS surface. The PDMS replica with trapped particles were prepared for imaging with SEM by coating with a gold nanolayer in a Hummer 5 Gold/Palladium Sputter and the contact angle was calculated from the geometric parameters obtained by SEM for at least 3 and up to 13 particles trapped in the interface.

The hydrophilic silica particles (SS03N) used in this study could not be trapped in the PDMS replica of the oil-water interface because of their low affinity for the interface. In this case the contact angle water was estimated using macroscopic contact angle measurements with a RameHart goniometer on a glass slide pretreated with "piranha solution" (a 7:3 mixture of concentrated sulfuric acid and 30% hydrogen peroxide) to mimic the surface wettability of bare silica particle. For the contact angle of oil/water interface, the glass substrate was submerged in a quartz cell filled with water and contact angle measurements were carried out on inverted sessile oil drops. The contact angle for the air/water interface was determined from observation of sessile water drops in air. Reported contact angle values are averages of data for 5 different drops.

Surface Tension and Interfacial Tension Measurements

To measure the equilibrium surface and interfacial tensions, equal volumes of water and oil were vigorously stirred overnight to achieve mutual saturation, and separated by centrifuge prior to the experiment. The surface tension of oil against air was measured with a Lauda TVT-2 drop volume tensiometer. Interfacial tensions of water against air and oil were measured via shape analysis of pendant drops with a Ramé-hart model 250 goniometer. The surface and interfacial tensions are reported in Table 1. Reported surface and interfacial tensions are averages over five independent measurements, the experimental uncertainty is on the order of I mN/m.

TABLE 1

Surface and interfacial tensions of fluids used in this study

|  | Equilibrium surface and interfacial tensions | | | Surface and interfacial tensions of pure liquids | | |
| --- | --- | --- | --- | --- | --- | --- |
|  | $\gamma_{ao}$ (mN/m) | $\gamma_{aw}$ (mN/m) | $\gamma_{ow}$ (mN/m) | $\gamma'_{ao}$ (mN/m) | $\gamma'_{aw}$ (mN/m) | $\gamma'_{ow}$ (mN/m) |
| TMPTMA | 32.9 | 51.74 | 19.0 | 32.6 | 72.8 | 18.5 |
| DINP | 32.1 | 57.43 | 19.6 | 30.7 | 72.8 | 22.3 |
| Paraffin oil | 32.9 | 72.00 | 49.2 | 31.3 | 72.8 | 49.4 |

Equilibrium surface and interfacial tensions were used to calculate the interfacial fee energy and effective oil spreading coefficient. Interfacial tension data of TMPTMA were obtained from Ding & Goedel (Experimental investigation of particle-assisted wetting, *J. Am. Chem. Soc.* 128, 4930-4931, 2006). Here, γ is the equilibrium surface/interfacial tension, and for comparison we also list the surface/interfacial tension γ' of the pure liquids (a, o, w denote the air, oil, and water phase).

Evidence that Secondary Liquid Alone Cannot Stabilize Foams

We report that the addition of a secondary liquid can lead to stable foams even when the particles do not have the required wetting behavior to stabilize air bubbles by themselves and find that stabilization of bubbles requires both particles and a secondary liquid. In order to further support the synergistic action of particles and a secondary fluid on the stabilization of capillary foams, here we investigate whether the foam bubbles can be stabilized in the presence of only a secondary fluid.

The Interfacial Free Energy of Capillary Foams and the Effective Oil Spreading Coefficient Ordinary liquid foams are two phase systems in which a large volume of gas is dispersed as bubbles in a continuous liquid phase. We consider the case of air as the gas phase and water as the continuous liquid. Aqueous foams are thermodynamically unstable due to the large interfacial free energy cost associated with the bubble surfaces. If the continuous water phase contains suspended colloidal particles of appropriate wettability, these particles can adsorb strongly to the air-water interface and hinder the coalescence of foam bubbles kinetically; such particle-stabilized foams are often referred to as Pickering foams in analogy to the particle-stabilized Pickering emulsions.

In the capillary foams investigated in our study, the air-water interface is replaced (at least to a large extent, if not entirely) by a film of oil (the secondary liquid), where particles now adsorb to the oil film interface with the air bubble or with the continuous water phase. The adsorption state (oil-water interface or the air-oil interface) yielding the lower interfacial energy was considered the preferred (predicted) state of the bubble surface in the capillary foams. Here we estimate the total interfacial energy change (inverse of effective spreading coefficient) for capillary foams from different particles and secondary fluid combinations. To this end the following simplifying assumptions and notations are adopted:

1. The internal energy, pressure, and temperature are assumed constant, and the small entropy changes due to particle adsorption are neglected.
2. Particles are considered spherical and effects of particle surface charge and size polydispersity are neglected.
3. Gravitational force and particle-particle interactions are neglected against surface and interfacial tension forces.
4. Particles are initially dispersed in the water phase.
5. Effects of bubble curvature are neglected.
6. The interfacial tensions of the oil/water, air/oil, air/water, air/particle, water/particle and oil/particle interfaces are denoted as $\gamma_{ow}$, $\gamma_{oa}$, $\gamma_{aw}$, $\gamma{ap}$, $\gamma_{wp}$, and $\gamma_{op}$. In systems containing both water and oil, mutual saturation of the two liquid phases is assumed.
7. $\theta_{wop}$ and $\theta_{aop}$ denote the particle contact angle at the water/oil and air/oil interfaces measured through the oil phase as is customary in the literature on particle-assisted wetting. $\theta_{awp}$ is the particle contact angle at the air/water interface measured through the water phase as customary in the literature on Pickering emulsions.

The interfacial energy per unit bubble area in a Pickering foam is the adsorption energy of particles attaching to the bubble surfaces, $$\frac{G^{intf}_{Pickering}}{A} = \gamma_{aw} + \frac{n_p}{A}\Delta G_{Pickering^*} \tag{4}$$

Where $n_p$ is the number of particles attached onto the air-water interface, and $\Delta G_{pickering}$ is the adsorption energy per particle, given by (Binks & Lumsdon, Influence of particle wettability on the type of stability of surfactant-free emulsions. *Langmuir* 16, 8622-8631, 2000):

$$\Delta G_{Pickering} = -\pi R^2 \gamma_{aw}(1-\cos\theta awp)^2 \tag{5}$$

Combining Eqs. 1 and 2 and normalizing by the bubble surface area yields for the interfacial energy per unit bubble area of the Pickering foam $$\frac{G^{intf}_{Pickering}}{A} = \gamma_{aw}[1 - \phi(1 - \cos\theta_{awp})^2] \tag{6}$$

where $\phi = n_p \pi R^2/A$ is the packing density (area fraction) of the particles absorbed in the interface. Similar considerations can be applied to capillary foams. The interfacial energy change per unit bubble area in capillary foam is the sum of the free energy required for spreading an oil film at that interface with the assistance of absorbed particles.

$$\frac{G^{intf}_{capillary}}{A} = \gamma_{aw} - S_{eff} = \gamma_{aw} - S_o + \frac{n_p}{A}\Delta G \tag{7}$$

where $S_{eff}$ is the effective spreading coefficient accounting for particles adsorption at one of the oil interfaces, $S_o = \gamma_{aw} - (\gamma_{oa}+\gamma_{ow})$ is the standard spreading coefficient of the oil, and $\Delta G$ is again an particle's energy change upon transfer from the water bulk to an interface.

Spreading of the oil around the air bubbles requires that particles absorb at the oil-water interface (case i), or the oil-air interface (case ii), or at both interfaces; and the particle wettability dictates which, if any, of these scenarios are realized. For the case i of particles adsorbing at the oil-water interface, the particle adsorption energy $\Delta G_i$, is given by (Goedel, *Europhys. Lett.* 62, 607-613, 2003):

$$\Delta G_i = -\pi R^2 \gamma_{ow}(1+\cos\theta_{wop})^2 \tag{8}$$

Therefore, the interfacial energy of the capillary foam with particles adsorbed at the oil-water interface is given by $$\frac{G^{intf}_{capillary,i}}{A} = \gamma_{aw} - S_{eff,i} = \gamma_{aw} - S_o - \phi\gamma_{ow}(1+\cos\theta_{wop})^2 \tag{9}$$

in the oil-water interface. For the case ii of particles adsorbed at the air-oil interface, the energy change upon bringing particles form the water bulk to the air-oil interface, $\Delta G_{ii}$, is given by $$-\frac{\Delta G_{ii}}{\pi R^2} = \gamma_{oa}\sin^2\theta_{aop} + 2[\cos\theta_{aop}(\gamma_{ap} - \gamma_{op}) + (\gamma_{wp} - \gamma_{ap}) + (\gamma_{wp} - \gamma_{op})] \tag{10}$$

The interfacial tensions involving the particle surface are not directly accessible experimentally, but can be eliminated using Young's equations $$\gamma_{ap} - \gamma_{op} = \gamma_{oa}\cos\theta_{aop} \tag{11}$$

$$\gamma_{wp} - \gamma_{op} = \gamma_{aw}\cos\theta_{awp} \tag{12}$$

$$\gamma_{wp} - \gamma_{op} = \gamma_{ow}\cos\theta_{wop} \tag{13}$$

Equation 10 then takes the form $$-\frac{\Delta G_{ii}}{\pi R^2} = \gamma_{oa}(1 + \cos^2\theta_{aop}) + 2(\gamma_{ow}\cos\theta_{wop} - \gamma_{ow}\cos\theta_{awp}) \tag{14}$$

Hence, the interfacial energy per unit bubble area for a capillary foam with particles adsorbed at the air-oil interface is $$\frac{G^{intf}_{capillary,ii}}{A} = \gamma_{aw} - S_{eff,ii} = \gamma_{aw} - S_o - \phi[\gamma_{oa}(1 + \cos^2\theta_{aop}) + 2(\gamma_{ow}\cos\theta_{wop} - \gamma_{aw}\cos\theta_{awp})] \tag{15}$$

The particle contact angles $\theta_{wop}$ and $\theta_{awp}$ were measured by GTT, and the contact angle $\theta_{aop}$ was inferred from the measured contact angles ($\theta_{wop}$, $\theta_{aop}$) and the measured interfacial tensions ($\gamma_{aw}$, $\gamma_{oa}$, $\gamma$aw) via Young's relation:

$$\gamma_{oa}\cos\theta_{aop} = \gamma_{aw}\cos\theta_{awp} + \gamma_{ow}\cos\theta_{wop} \tag{16}$$

Equations (9) and (15) were used to calculate the interfacial free energy per unit bubble surface area and effective spreading coefficient for scenarios i (particles adsorb at the oil-water interface) and ii (particles adsorb at the air-oil interface), assuming for both cases an interfacial particle packing density (area fraction) ϕ of 70% based on a crude estimate from microscopic observations. A positive effective spreading coefficient ($S_{eff}$>0) means that the spreading of secondary fluid around gas bubbles with the help of particles is thermodynamically favorable. The thermodynamically "preferred interface" for interfacial adsorption of particles used in this study and the corresponding calculated spreading coefficients are indicated in Table 2 below.

TABLE 2

Comparison between experimental observations and theoretical estimates for foams from a variety of particle and fluids combinations.

| Particles | Secondary fluid (oil) | θawp(o) | θowp(o) | Seff (mN/m) | Experimental observation |
|---|---|---|---|---|---|
| Silica(SS03N) | None | 22.32 | | | Unstable |
| | TMPTMA | 22.83 | 132.80 | 1.26 | Unstable |
| | DINP | 27.00 | 155.00 | 5.86 | Unstable |
| | Paraffin | 22.32 | 144.90 | −9.02 | Unstable |
| Glass | None | 42.65 | | | Unstable |
| | TMPTMA | 32.63 | 124.21 | 2.45 | Semi-stable* |
| | DINP | 32.76 | 124.53 | 8.32 | Semi-stable* |
| | Paraffin | 42.65 | 128.78 | −5.34 | Semi-stable* |
| Modified silica (aerosol 200) | None | 38.30 | | | Unstable |
| | TMPTMA | 31.88 | 98.84 | 9.43 | Stable |
| | DINP | 41.88 | 118.50 | 9.50 | Stable |
| | Paraffin | 38.30 | 109.52 | 5.15 | Stable |
| PVC (SA 1062/7) | None | 27.35 | | | Unstable |
| | TMPTMA | 21.84 | 94.84 | 11.05 | Stable |
| | DINP | 20.51 | 83.45 | 22.76 | Stable |
| | Paraffin | 27.35 | 105.32 | 8.53 | Stable |
| PE | None | 101.20 | | | Stable |
| | TMPTMA | 98.16 | 77.87 | 38.95 | Stable |
| | DINP | 120.05 | 102.64 | 86.12 | Stable |
| | Paraffin | 101.20 | 73.05 | 52.52 | Stable |
| PVC P70F | None | 98.76 | | | Stable |
| | TMPTMA | 91.94 | 106.91 | 18.69 | Stable |
| | DINP | 88.81 | 112.10 | 17.03 | Stable |
| | Paraffin | 98.76 | 75.42 | 45.60 | Stable |

$θ_{awp}$ and $θ_{owp}$ are particle contract angles at air-water interface and oil-water interface respectively. $S_{eff}$ is the effective spreading coefficient. The cellulose and aluminum oxide particles are not included here because it is challenging to measure contact angles for these irregularly shaped particles.

For some of the larger particles used in this study, SEM images suggest that particles may simultaneously penetrate both interfaces of the oil film around the droplets. A thermodynamic model for this scenario, which would have to take into account the film thickness and thus the fraction of oil not spread at the droplet surfaces, is beyond the scope of the present publication.

Comparison Between the Experimentally Observed Particle Location at the Interface and Theoretical Expectations For PVC (Vinnolit SA 1062/7) particles in water with added TMPTMA and air bubbles, the model predicts a free energy change per unit area of $S_{eff,i}$=11.05 mJ/m2 for spreading of an oil film around them if the particles adsorb to the oil-water interface at an assumed area coverage of 70%; by contrast, if the particles instead adsorbed to the oil-air interface, the predicted energy change would be $S_{eff,ii}$=+4.55 mJ/m2. From this, one would expect the particles to adsorb preferentially at the oil-water interface. Experimentally, a layer of TMPTMA, spread at a macroscopic air-water interface with the help of the same PVC particles, was solidified by photo-polymerization.

Preparation Details for the Mixed Layer of Secondary Fluid and Particles at a Macroscopic Air-Water Interface 0.01 wt % particles were dispersed in water by sonication for 30 minutes and then delivered to the air/water interface by homogenization with an IKA UltraTurrax T10 homogenizer in a Petri dish. Air bubbles were removed by exposure to a mild vacuum (100 mbar). Next, TMPTMA (with 5 wt % photoinitiator benzoinisobutylether) was added to the air-water interface slowly and carefully. A mixed wetting layer of oil and particles formed and was solidified by photo-polymerization (after 48 hours, using irradiation with UV light of 365 nm wavelength for 5 hours) and transferred to solid substrates such as gold electron microscope grids for subsequent imaging analysis.

Capillary foams were prepared with water as the bulk liquid (primary liquid) and air as the bubble phase, varying the "oil" (secondary liquid) and the particle type in a study covering a variety of particle sizes, shapes, and wettabilities (see FIGS. 13A-13H and Table 2). Oils that were explored included TMPTMA, paraffin, and DINP, and the particles that were studied included polyvinyl chloride (PVC) of different size and wettability (Vinnolit SA 1062/7 and Vinnolit P70F), polyethylene (PE), modified silica (aerosol 200), monodisperse silica spheres (SS03N), glass, aluminium oxide, and modified cellulose.

FIGS. 8A-8I show SEM images of a dried capillary foam with TMPTMA as the oil (Sigma-Aldrich, treated with $Al_2O_3$ to remove inhibitor, and enriched with 5 wt % of the photoinitiator benzoin isobutyl ether) and either PE particles, PVC 1062/7 particles, or glass particles. FIGS. 8J-8L shows the location of the (dye-labelled) oil in the corresponding wet foams, as seen by confocal microscopy.

Figures 9A, 9B:
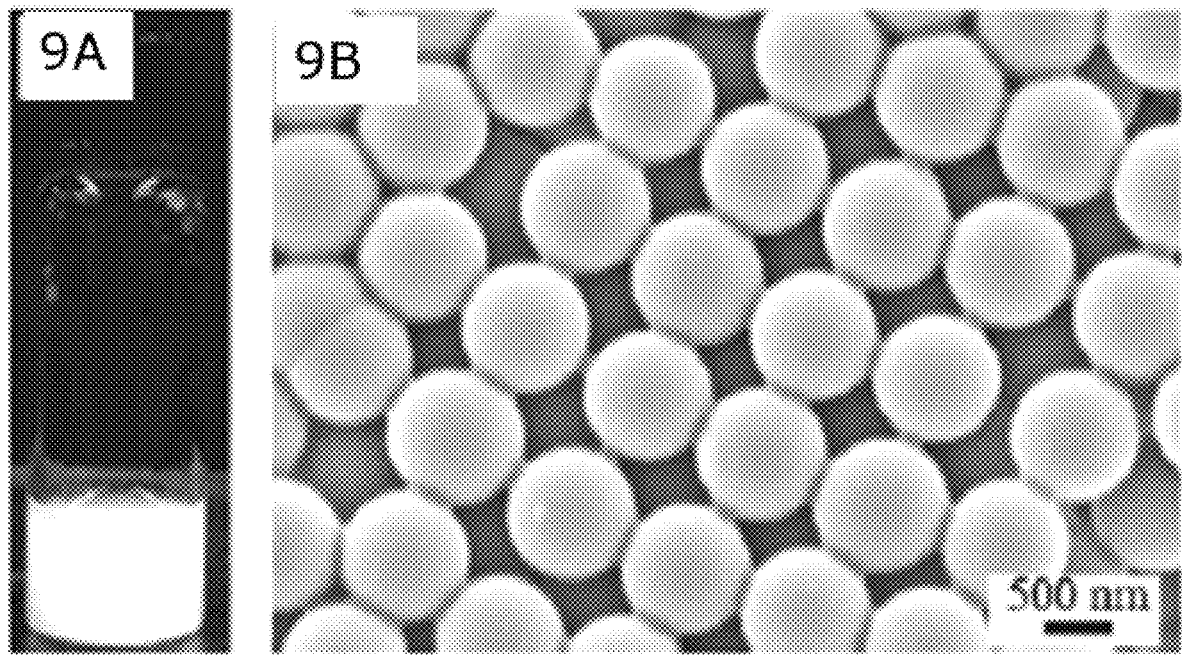
FIGS. 9A-9C show network formation without foam stabilization.
Figure 9C:
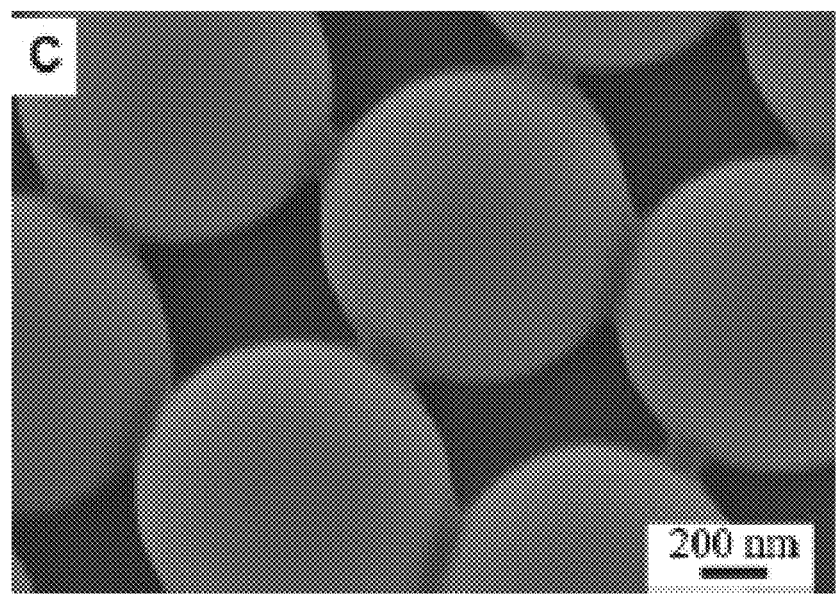

FIGS. 8D-8F and 8J-8L demonstrate an accumulation of oil around the bubble surfaces. On the other hand, small oil bridges also connect the particles in the bulk suspension between the bubbles (FIGS. 8G-8I) to form a particle network. Such networks of particles connected by oil bridges are held together by capillary forces, much like the water-bridged grains of sand in a sand castle, and were already reported in 2011 for bubble-free particle suspensions that form a gel when mixed with a small amount of an immiscible liquid (Koos, et al., Science 2011, 221, 897-900; Butt, Science 2011, 331, 868-879) In capillary foams, the particle network appears to provide a matrix that connects and immobilizes the (particle- and oildecorated) bubbles. We surmise that this particle network also contributes to foam stability against bubble coalescence by hindering liquid drainage. Nonetheless, the formation of particle networks in the liquid bulk does not by itself guarantee effective bubble stabilization. FIG. 9A shows a failed attempt at producing a stable capillary foam using hydrophilic silica particles and TMPTMA, a particle/oil combination that leads to networks of oil-bridged particles (FIG. 9B-9C). Frothing of this suspension in the presence of oil produced no significant foam head.

Figure 10:
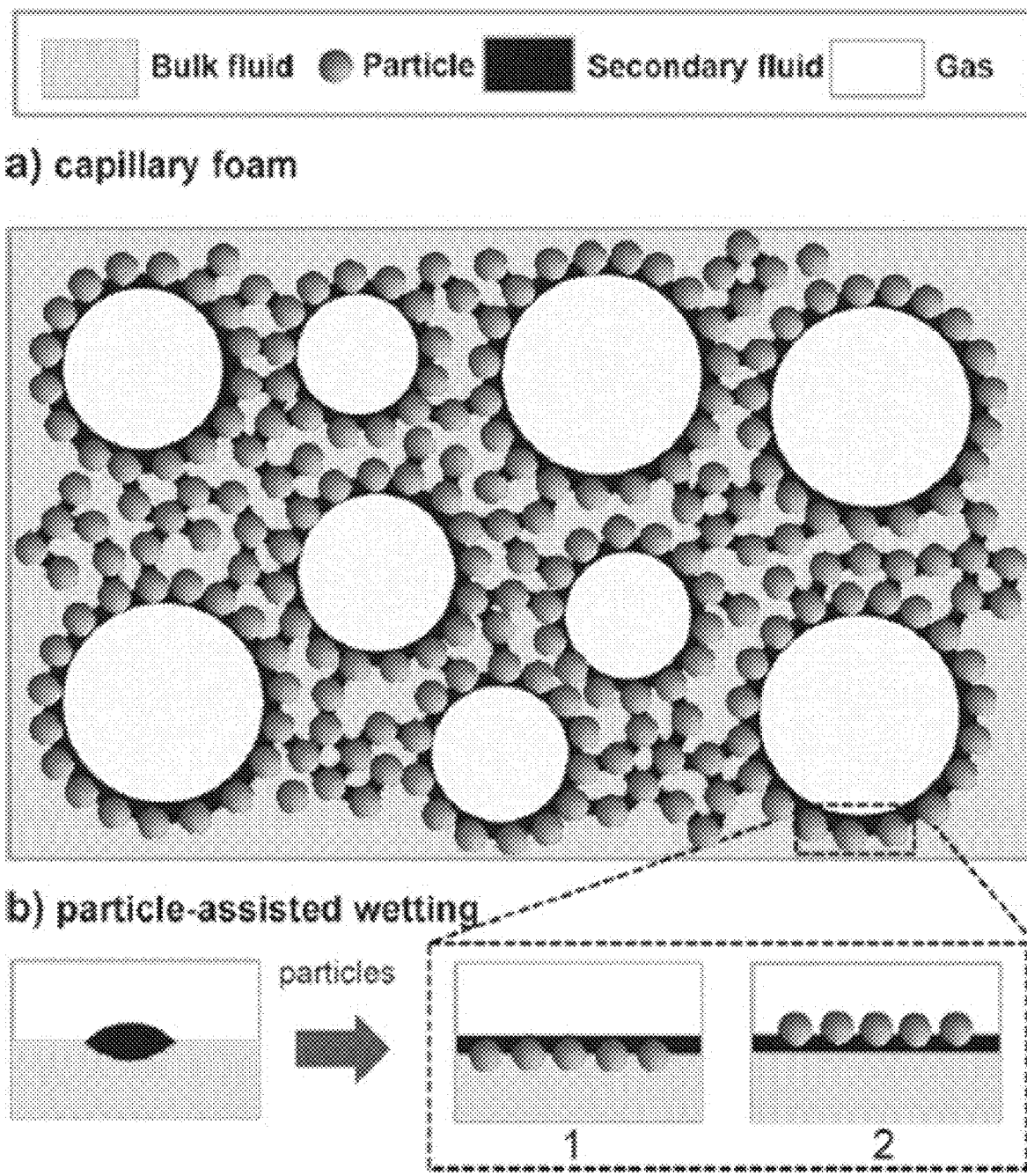
FIG. 10 shows a schematic illustration of capillary foams. (a) In capillary foams, suspension particles and the secondary liquid jointly adsorb at the interface of gas bubbles. The decorated bubbles are further entrapped in a network of excess particles in the primary liquid bridged by a secondary liquid. (b) Particles adsorbing preferentially at an interface of the secondary liquid can mediate the spreading of a secondary liquid film around the gas bubbles, in direct analogy to the "particle-assisted wetting" of a macroscopic air-water interface by a drop of oil. Depending on their wetting properties, the particles can adsorb at 1) the oil-water interface, or 2) the oil-air interface (or both).

Not wishing to be bound by any theory, it appears that the synergistic adsorption of particles and oil around the gas bubbles bears strong resemblance to the phenomenon of "particle-assisted wetting" of a macroscopic air-water interface by a drop of oil that would be nonwetting in the absence of particles (Xu, et al., Angew. Chem. Int. Ed. 2003, 42, 4694-4696; Angew Chem. 2003, 115, 4842-4844; Ding, et al., J. Am. Chem. Soc. 2006, 128, 4930-4931). This requires that particles adsorb at the oil-water interface (FIG. 10, case 1) or the oil-air interface (FIG. 10, case 2), or both, rather than at the air-water interface as in a classical Pickering foam.

Which of these interfaces experiences particle adsorption depends on the particle wettability. The effect can be explained by the net reduction in interfacial free energy arising from the adsorption of particles at the newly formed oil-water or oil-air interface: spreading of the oil in the presence of particles becomes thermodynamically favorable for positive values of an "effective spreading coefficient" given by:

$$S_{\mathit{eff}} = S_o - \frac{n_p}{A} - \Delta G \qquad (1)$$

Here $S_o = \gamma_{aw} - (\gamma_{ow} + \gamma_{ao})$ is the spreading coefficient of the oil (as commonly defined), accounting for the energy change upon replacing the air-water interface by an oil-water and air-oil interface with respective tensions $\gamma_{ow}$ and $\gamma_{oa}$, A is the total surface area of the bubbles, $n_p$ is the number of particles absorbed at the oil-water interface (FIG. 10, case 1) or the air-oil interface (FIG. 10, case 2) and $\Delta G$ is the average free energy change associated with a particle adsorption event, given by (Binks, et al., *Langmuir* 2000, 16, 8622-8631):

$$\Delta G_1 = -\pi R^2 \gamma_{ow}(1 + \cos\theta_{wop})^2 \qquad (2)$$

For adsorption at the oil-water interface and by:

$$\Delta G_2 = -\pi R^2 [\gamma_{oa}(1 + \cos^2\theta_{aop}) + 2(\gamma_{ow}\cos\theta_{wop} - \gamma_{aw}\cos\theta_{awp})] \qquad (3)$$

For adsorption at the air-oil interface, where R denotes the average particle radius, $\theta_{wop}$, $\theta_{aop}$ are the equilibrium contact angles of the particle with the oil-water and air-oil interface as measured through the oil phase, and $\theta_{awp}$ is the contact angle at the air-water interface, measured through the water phase. The description neglects effects of bubble curvature and accounts for particle interaction only indirectly through the bubble coverage.

Figure 11A:
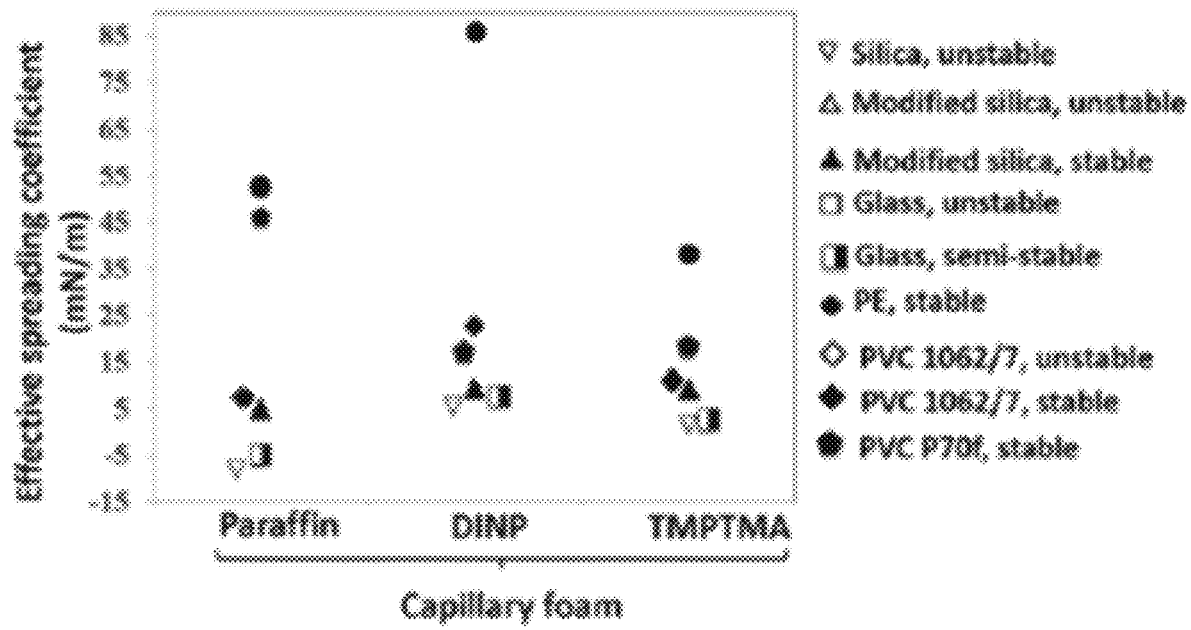
FIGS. 11A-11B show the effective oil spreading coefficient $S_{eff}$ (FIG. 11A) and the equilibrium particle contact angle (FIG. 11B) at the air-water interface for Pickering foams and at the oil-water interface for capillary foams form a variety of particle/oil combinations. Full markers are used for systems that produce stable foam heads upon frothing, open markers denote patently unstable systems, and the half-open marker ("semi-stable") is used for systems developing only a very small, albeit durable, foam head and a large sediment of particles not participating in bubble stabilization. The standard spreading coefficients $S_o$ of paraffin oil, DINP, and TMPTMA are $-10.17$ mNm$^{-1}$, $5.74$ mNm$^{-1}$, and $-0.11$ mNm$^{-1}$, respectively. The markers in FIG. 11B correspond to those from FIG. 11A.

Estimates for the effective oil spreading coefficient in capillary foams were obtained from Equations (1)-(3) with measured values for the surface and interfacial tensions $\gamma_{ij}$ and for the particle contact angles $\theta_{ijp}$, assuming an interfacial particle packing density (area fraction) $\phi = \pi R^2 n_p/A$ of 70% based on a crude estimate from microscopic observations. Results for the oil/particle combinations of our study are shown in FIG. 11A, which also indicates the experimentally achieved foam stability. All studied systems that produced stable capillary foams upon frothing have a positive effective spreading coefficient and are thus expected to experience oil spreading around the air bubbles. Conversely, however, the successful spreading of the oil, either by itself ($S_o > 0$) or with the help of particles ($S_{\mathit{eff}} > 0$), does not guarantee good foam stability (FIG. 11A). Just like oil droplets in a Pickering emulsion, the oil-coated bubbles in a capillary foam need to be stabilized by particles with a strong tendency to absorb at the oil-water interface (the outer interface for capillary foams), where they can serve as a mechanical barrier to coalescence. The particle affinity to this interface is characterized by the contact angle $\theta_{wop}$; it is maximal for angles close to 90° (Xu, et al., *J. Phys. Condens. Matter* 2005, 17, S465-S476).

Figure 11B:
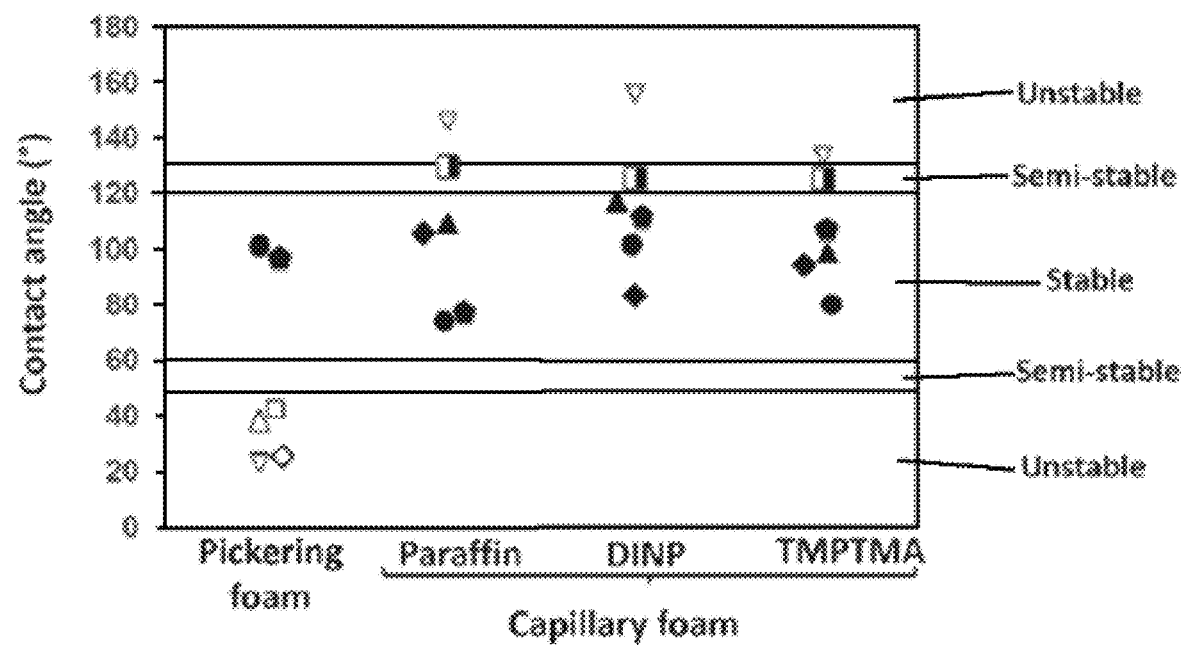
Figures 12A, 12B, 12C, 12D:
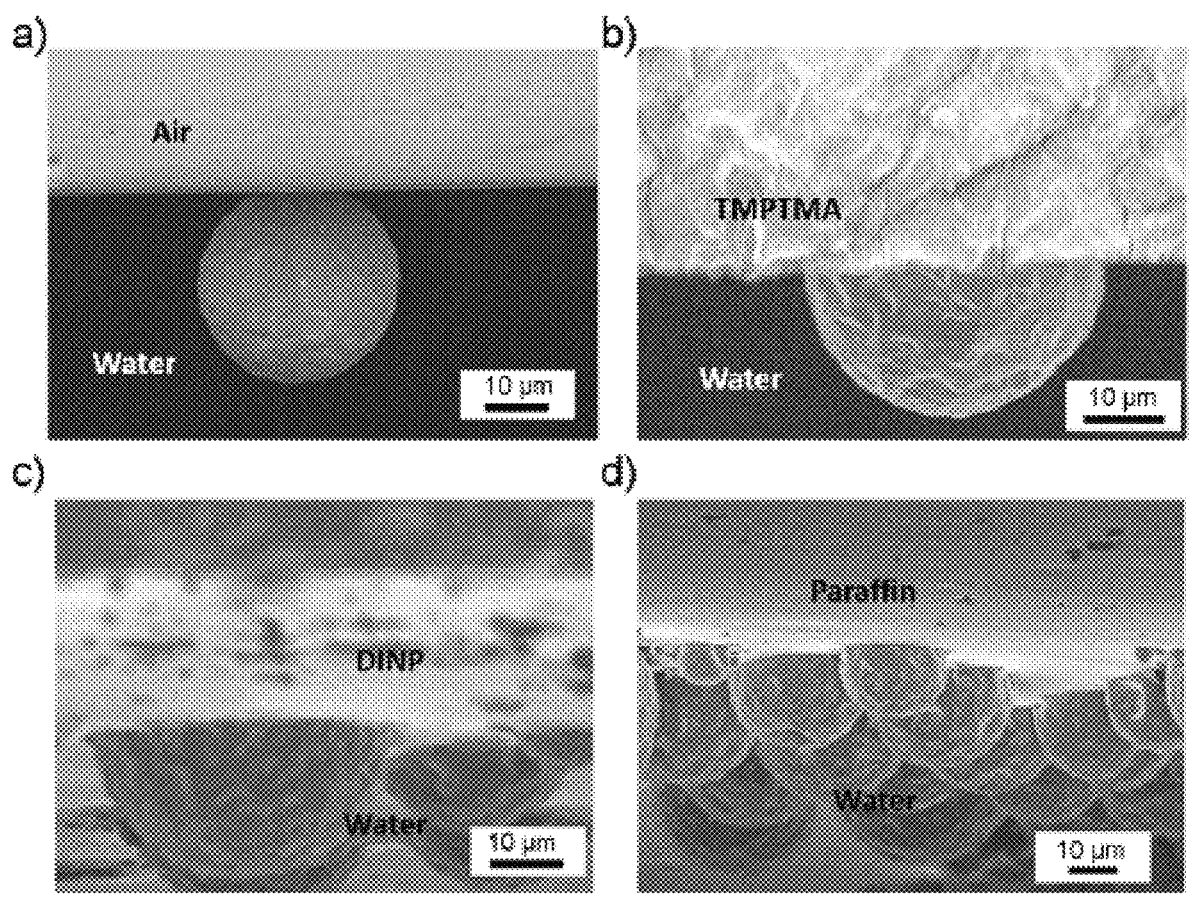
FIGS. 12A-12D show SEM images of PVC particles trapped in the PDMS replica of a macroscopic air-water interface (FIG. 12A) and of several oil-water interfaces (FIGS. 12B-12D) using the gel trapping technique. The visible part of the particle originally resided in the water phase.
Figures 13A, 13B, 13C, 13D, 13E, 13F, 13G, 13H:
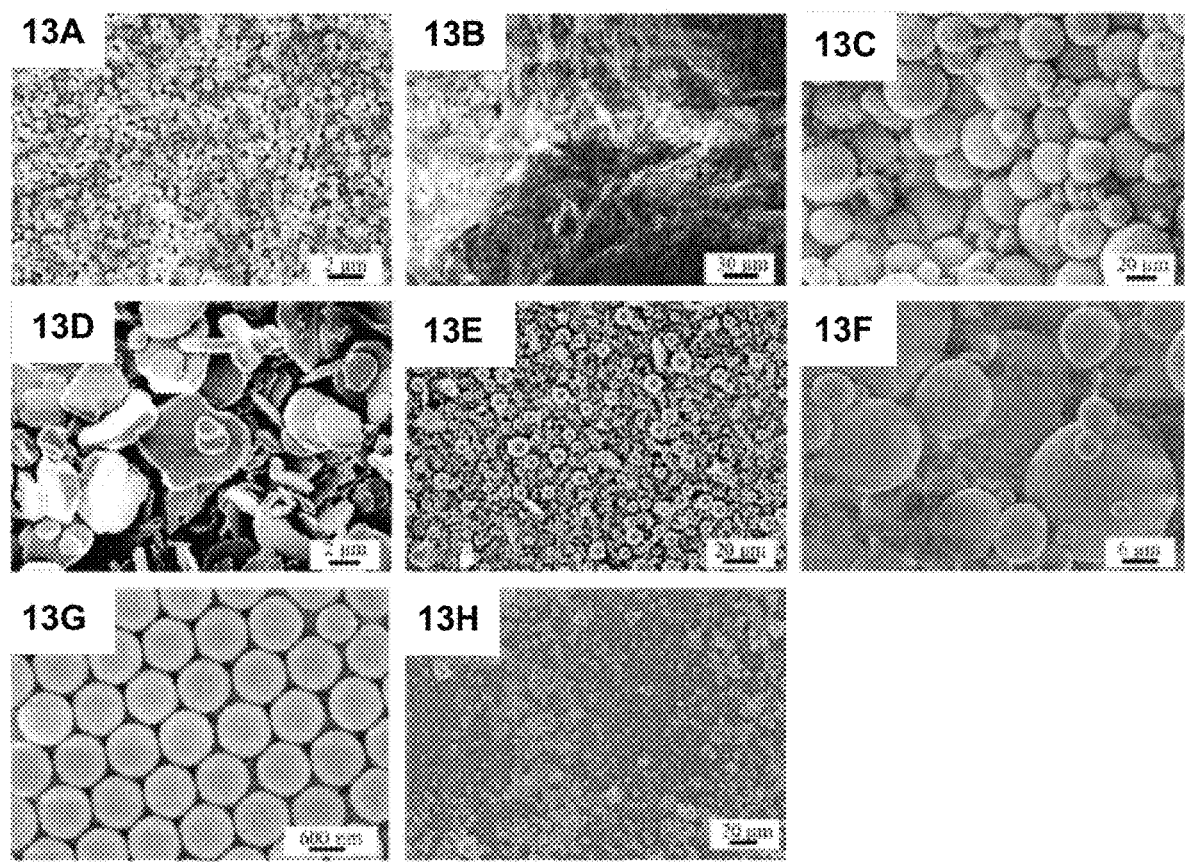
FIGS. 13A-13H show SEM images of the particles used in this study.
Figure 14A:
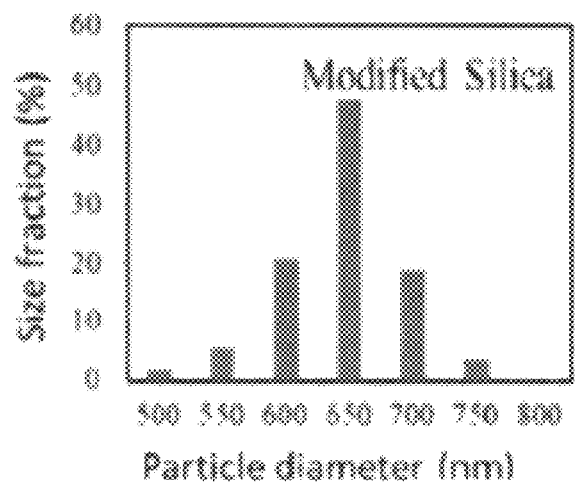
FIGS. 14A-14G show particle size distributions of the particles used in this study.
Figure 14B:
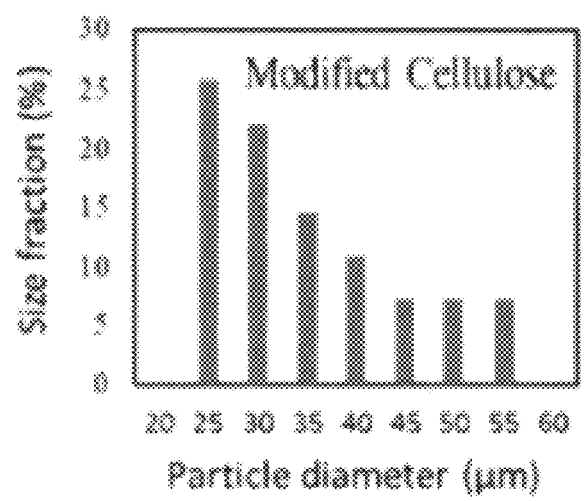
Figure 14C:
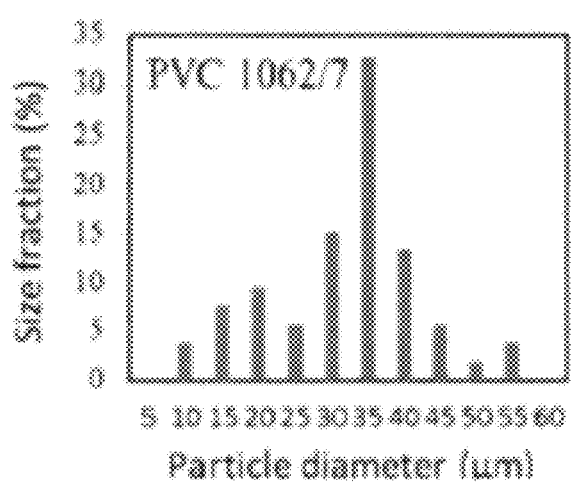
Figure 14D:
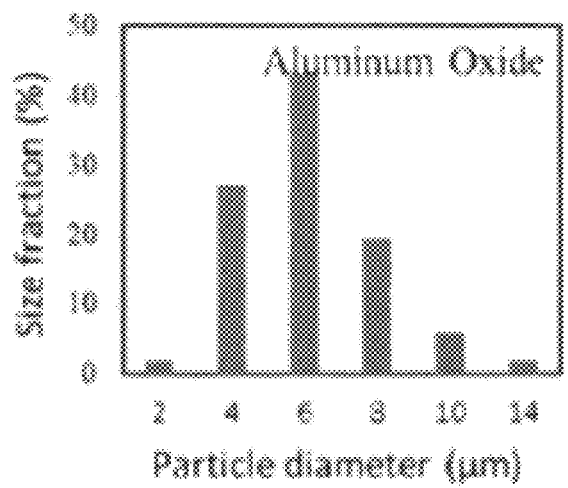
Figure 14E:
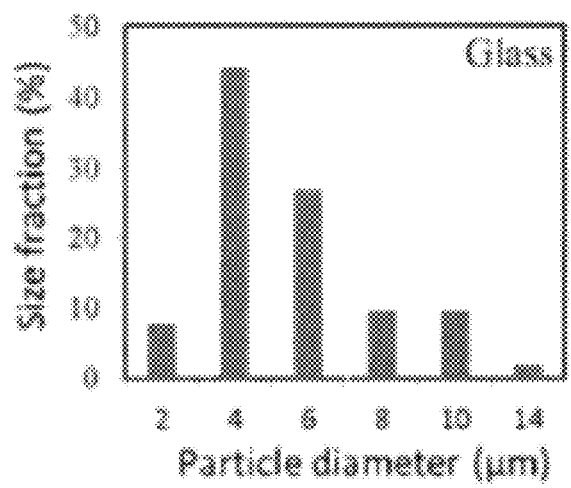
Figure 14F:
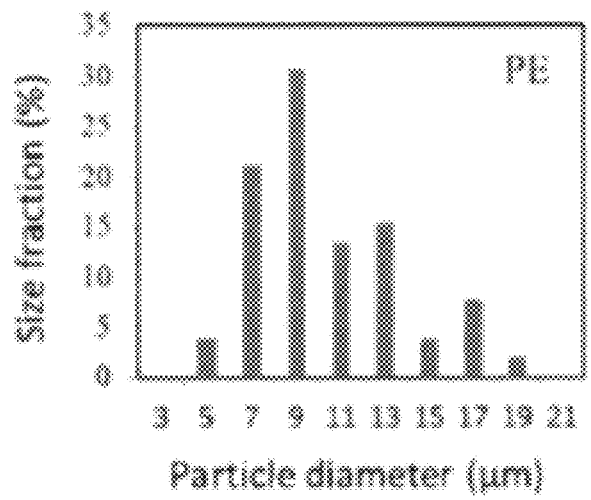
Figure 14G:
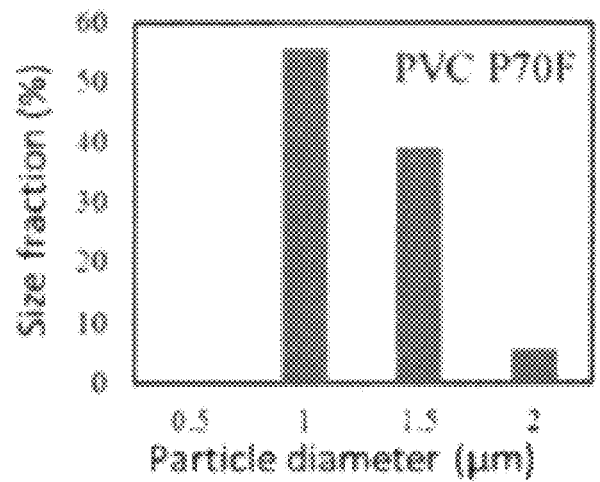

The data shown in FIG. 11B illustrate the importance of the contact angle for foam stability. In these examples, particles with a strong affinity to the outer interface (contact angle in the range from 60° to 120°) all yielded foams that remain intact for weeks or months. Particles with intermediate contact angles from 120° to 130° stabilized only a small amount of foam, and most of these particles formed a sediment instead of participating in foam stabilization. Particles with a weak affinity to the outer interface (contact angle below 50° or above 130°) led to unstable foams that disintegrated within one or two days.

Figures 17A, 17B, 17C, 17D, 17E, 17F:
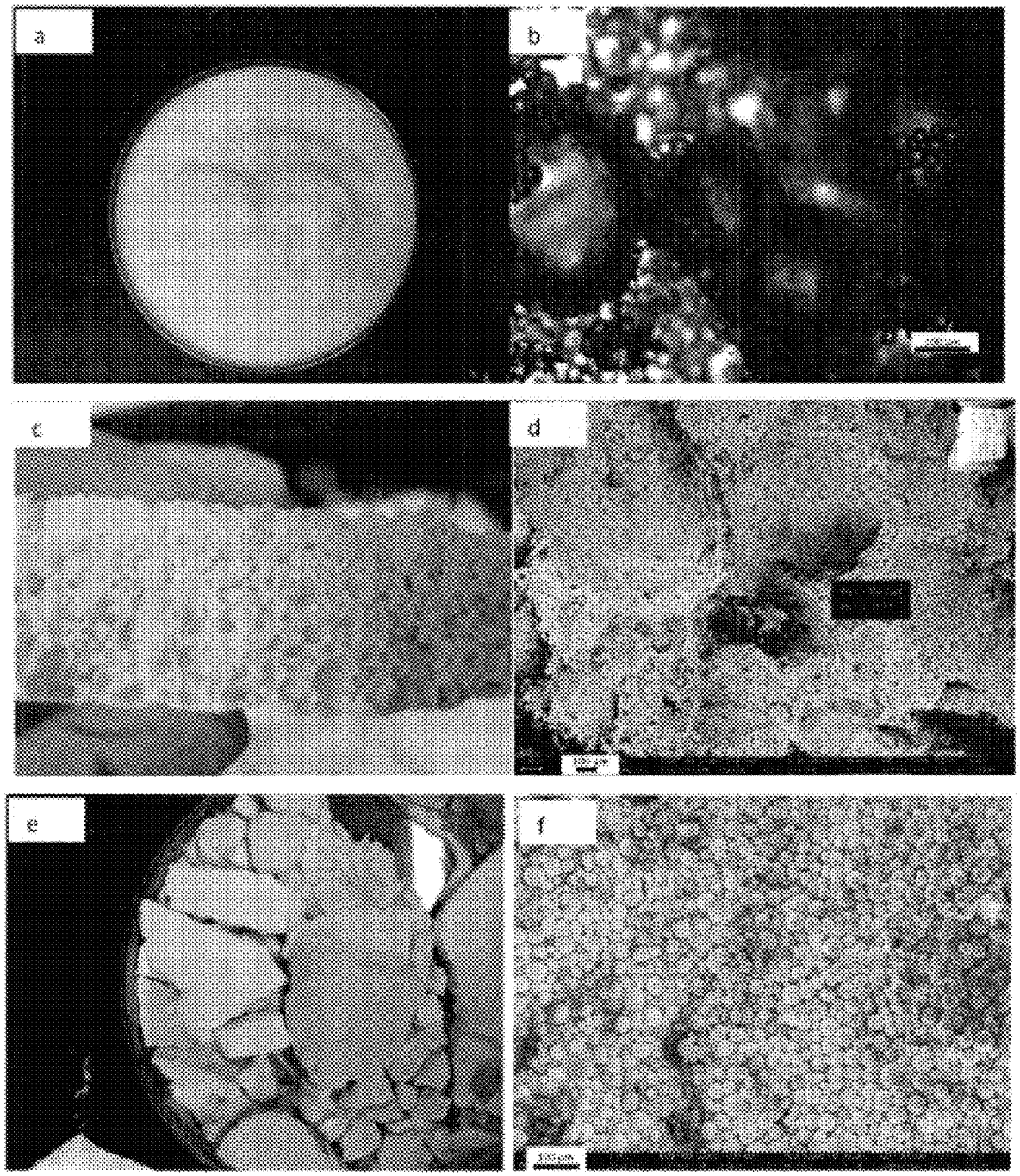
FIGS. 17A-17F show (FIG. 17A) a wet "capillary foam".

Example 3: Lighweight Polyvinyl Chloride Particles (PVC) Foam from Capillary Suspension Polyvinyl chloride particles (Vinnolit SA1062/7, average particle size 14.9 μm, particle density 1.44 g/cm³) were dispersed in DI water at a solid content of 21 vol. %. The suspension was frothed by a hand mixer (Rival 5-Speed Hand Mixer) for 10 minutes at the maximum speed. This was followed by addition of 0.5 wt. % of the photopolymerizable oil trimethylolpropane trimethacrylate (TMPTMA, Sigma-Aldrich, treated with $Al_2O_3$ to remove inhibitor, and enriched with 5 wt. % of the photo-initiator benzoinisobutylether) during mechanical frothing. The wet foam was exposed to UV light for 10 minutes and then dried in the oven at 70° C. for 16 hours. The porosity of this foam was 89.2% and the density 0.156 g/cm³. FIG. 17A shows the wet foam; FIG. 17B is an optical micrograph of particle-decorated gas bubbles in such a foam. Drying if such a foam resulted in the porous solid material seen in FIG. 17C and FIGS. 17D, 17E, and 17F show the less porous solid formed by frothing and drying a PVC suspension without any secondary fluid and FIG. 17F is an SEM image. FIGS. 17C and 17E illustrate that gas pockets are more readily trapped in a so-called capillary suspension than in an ordinary suspension of the same particles.

Example 4: Polyethylene (PE) Foam from Capillary Suspension

Figures 18A, 18B, 18C, 18D:
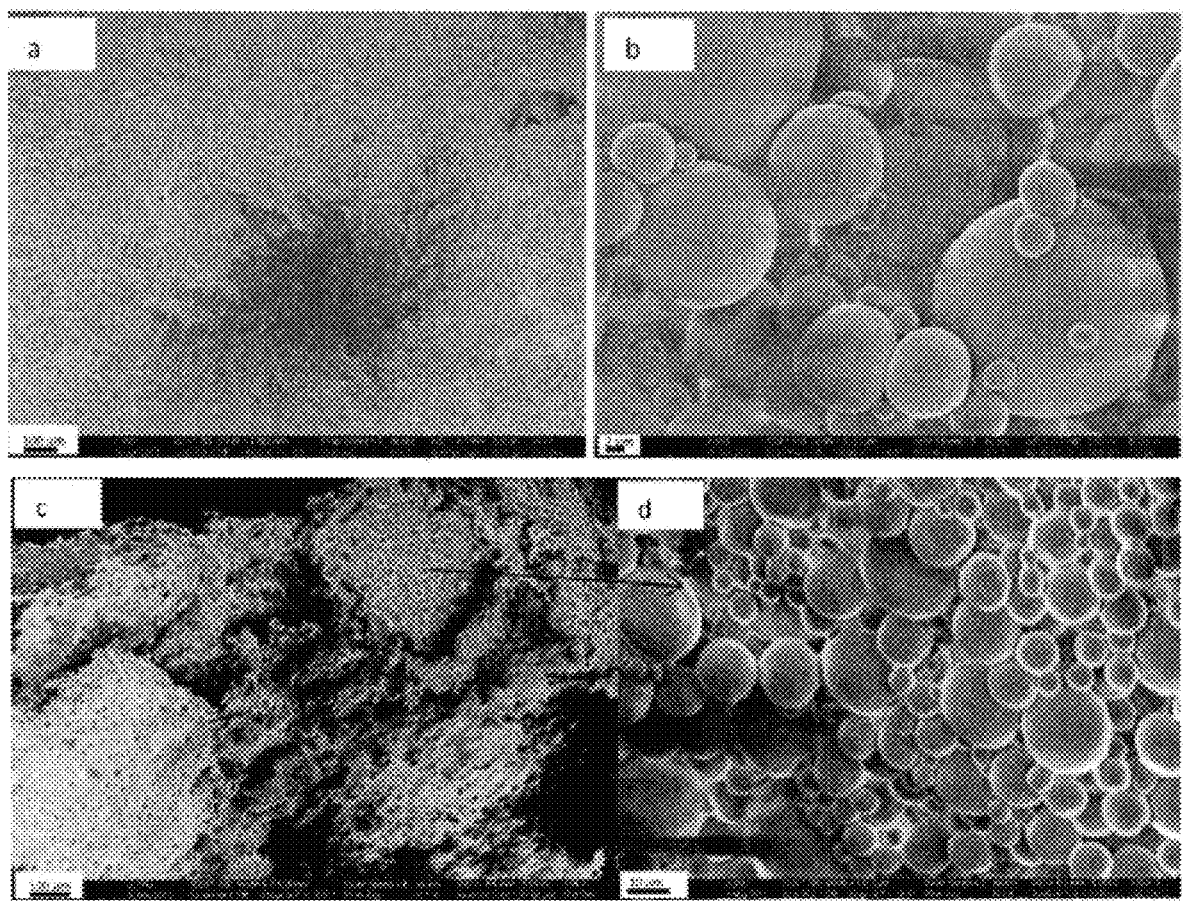
FIGS. 18A-18D show (FIG. 18A) cross-sectional SEM image of dry foam without secondary fluid, (FIG. 18B) PE particles at air/water interface, (FIG. 18C) cross-sectional SEM image of dry foam with secondary fluid, and (FIG. 18D) PE particles at air/water/TMPTMA interface.

PE particles (product no. 15184-500, Polysciences, Inc., USA; mp 140° C., density 0.915 g/cm³, average particle size 8.4±6.7 μm) were mixed with water at a solids loading of 8.4 vol. %. The suspension was frothed by a hand mixer (Rival 5-Speed Hand Mixer) for 10 minutes at the maximum speed to obtain a PE particle-stabilized foam. This was followed by addition of 0.83 wt. % of the photopolymerizable oil trimethylolpropane trimethacrylate (TMPTMA, SigmaAldrich, treated with $Alz0_3$ to remove inhibitor, and enriched with 5 wt. % of the photo-initiator benzoinisobutylether) under mechanical frothing. The wet foam was exposed to UV light for 10 minutes and then dried in the oven at 70° C. for 16 hours. The density of the resulting dry foam was 0.18 g/cm³. FIG. 18A shows a SEM image of the dried particle-stabilized foam prepared without secondary fluid and the FIG. 18B shows individual particles at the wall of a gas bubble. FIG. 18C is a SEM image of the dried capillary foam (prepared with the secondary fluid), and FIG. 18D shows individual particles, connected by TMPTMA bridges, in the wall of a gas bubble. These images illustrate that the addition of small amount of secondary fluid TMPTMA leads to higher porosity. FIG. 18D also supports the proposed idea that a layer of particles bridged by the secondary fluid assembles at the bubble surface.

Figures 19A, 19B, 19C, 19D:
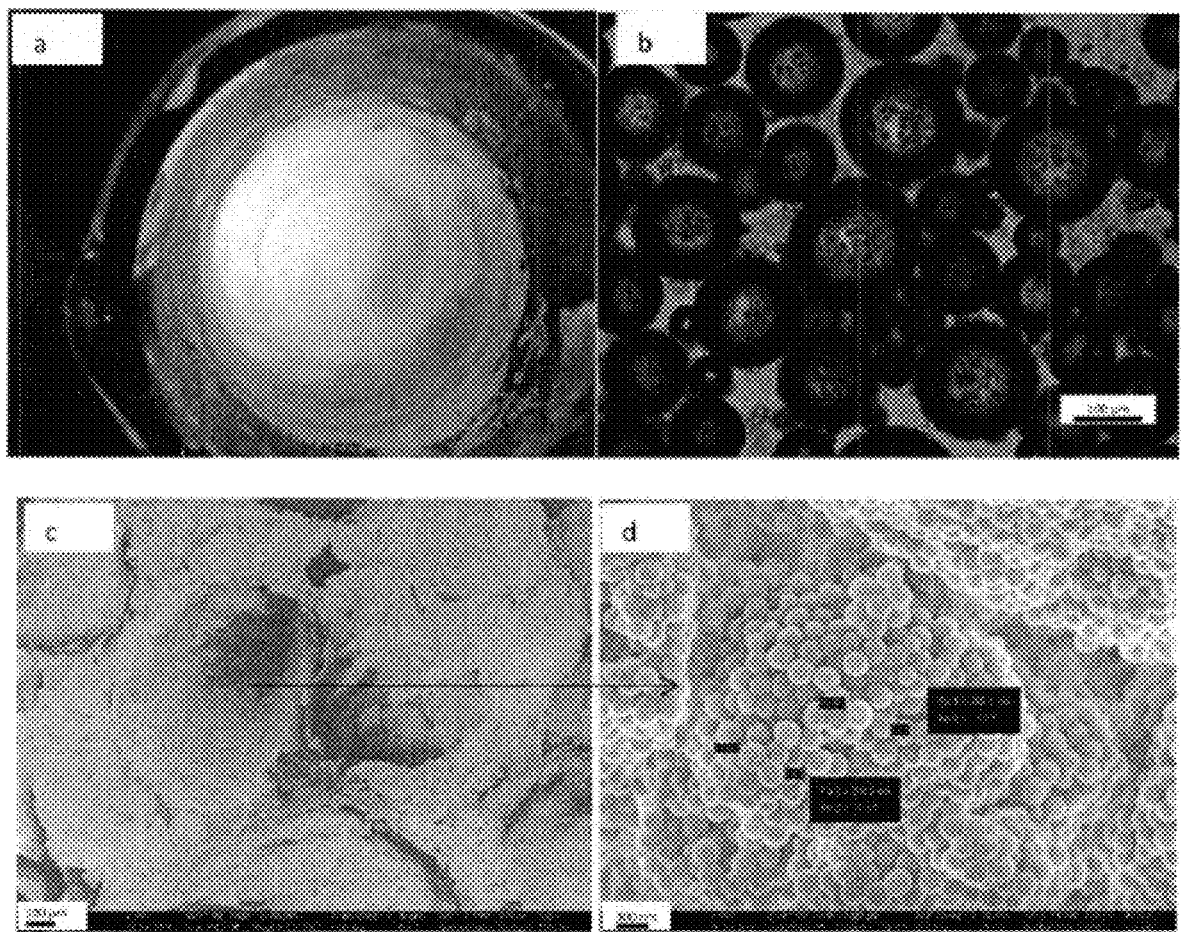
FIGS. 19A-19D show (FIG. 19A) a wet capillary foam, (FIG. 19B) microscopy image of air bubbles in wet capillary foam, (FIG. 19C) cross-sectional SEM image of dry capillary foam, and (FIG. 19D) particles at bubble surfaces.

Example 5: Lightweight Polyvinylidene Fluoride (PVDF) Foam from Capillary Suspension PVDF particles (product No. 8734-100, Polysciences, Inc., USA; density 1.76 g/cm³, average particle size 250 nm) were mixed with water containing 6.53 wt. % ethanol. The suspension was solvent exchange to DI water. A solids loading of 3.95 vol. % was achieved. The suspension was then frothed by a hand mixer (Rival 5-Speed Hand Mixer)

for 10 minutes at the maximum speed to obtain a PVDF particle-stabilized foam. This was followed by addition of 1.66 wt. % of the photopolymerizable trimethylolpropane trimethacrylate (TMPTMA, SigmaAldrich, treated with Al20 3 to remove inhibitor, and enriched with 5 wt. % of the photo-initiator benzoinisobutylether) under mechanical frothing. The wet foam was exposed to UV light for 10 minutes and then dried in the oven at 70 C for 16 hours. The resulting porosity was 92.4% and the density 0.133 g/cm$^3$. FIG. 19A shows the wet foam from capillary suspension and FIG. 19B is an optical image of foam in the liquid state, in which the air bubbles were stabilized by the PVDF particles. FIG. 19C is an SEM image of dry foam from capillary suspension. FIG. 19D is an SEM image of particles at gas bubble walls in which the particle is connected by the capillary bridge due to the addition of secondary fluid. This reinforces the proposed idea that a strong capillary monolayer is formed at the gas-water interface due to the addition of secondary fluid.

Example 6: Lightweight Cellulosic Foam from Capillary Suspension

Figures 20A, 20B:
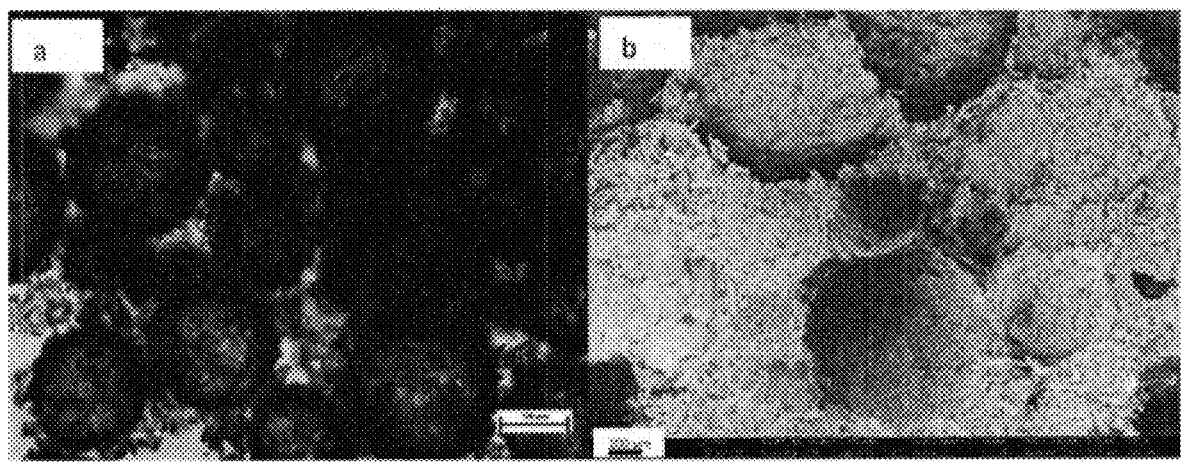
FIGS. 20A-20B show (FIG. 20A) an optical image of wet capillary foam.

Microcrystalline cellulose powder (product No. 310697-1 kg, Sigma-Aldrich, Inc., USA; average particle size 20 IJm) were hydrophobized with poly(maleic anhydride 1-octadecene) (product No. 25266-02-8, Polysciences, Inc., USA): 6.2 g poly(maleic anhydride 1-octadecene) was dissolved in 30 ml tetrahydrofuran (product No. 401757, Sigma-Aldrich, Inc., USA) in a 125 ml Erlenmeyer flask, and 23 g cellulose powder was added. After 12 hours of magnetic stirring at a speed of 600 rpm, the tetrahydrofuran was evaporated by heating at 60° C. in a fume hood. The reaction of the copolymer with the cellulose was carried out at 110° C. for 16 hours in the oven. The modified cellulose was recovered after the removal of unreacted poly(maleic anhydride 1-octadecene) in tetrahydrofuran using solubilization and centrifugation. The contact angle of water on the modified cellulose plate was 108°. The modified cellulose particles were first dispersed in water containing 40 wt. % ethanol. Then the particles were transferred to DI water by solvent exchange. A solids loading of 13.33 wt. % was achieved. The suspension was then frothed by a hand mixer (Rival 5-Speed Hand Mixer) for 10 minutes at the maximum speed to obtain a particle stabilized foam. This was followed by addition of 0.82 wt. % of the photopolymerizable oil trimethylolpropane trimethacrylate (TMPTMA, Sigma-Aldrich, treated with Al$_2$O$_3$ to remove inhibitor, and enriched with 5 wt. % of the photo-initiator benzoinisobutylether) under mechanical frothing. The wet foam was exposed to UV light for 10 minutes and then dried in the oven at 60° C. for 16 hours. FIG. 20A is an optical image of the liquid capillary foam, in which the gas bubbles were stabilized by the network of modified cellulose particles. Drying this liquid foam resulted in the porous material seen in the FIG. 20B. This dried foam had a density of only 0.067 g/cm$^3$.

Example 7: Colored Foam from Capillary Suspension

Figures 21A, 21B:
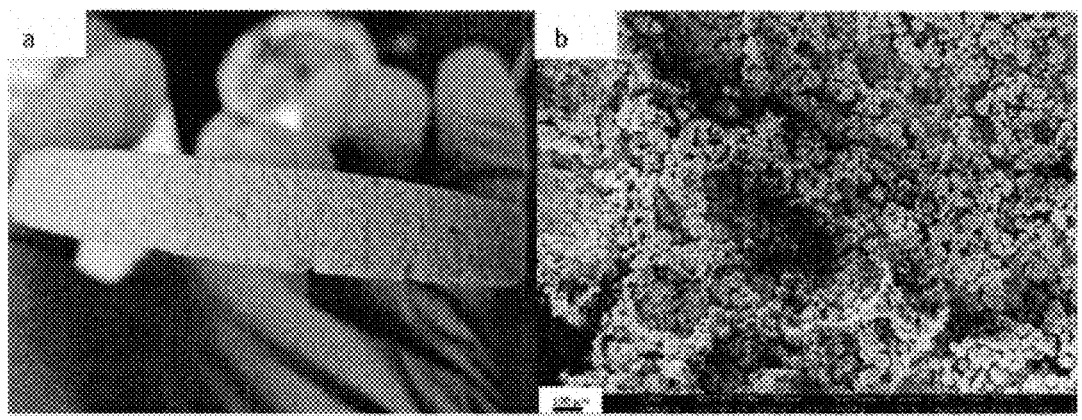
FIGS. 21A-21B show (FIG. 21A) dry foam from capillary suspension and (FIG. 21B) a cross-sectional SEM image of dry foam.

Adding air bubbles and a small amount of secondary fluid containing a dissolved dye to a particle suspension is a method to produce a colored foam. Polyvinyl chloride particles (Vinnolit SA1062n, average particle size 14.9 μm, particle density 1.44 g/cm$^3$) were mixed with DI water at a solids loading of 21 vol. %. The suspension was frothed by a hand mixer (Rival 5-Speed Hand Mixer) for 10 minutes at the maximum speed. This was followed by addition of 0.82 wt. % of the photopolymerizable oil trimethylolpropane trimethacrylate (TMPTMA, SigmaAldrich, treated with Al$_2$O$_3$ to remove inhibitor, and enriched with 5 wt. % of the photo-initiator benzoinisobutylether) under mechanical frothing. The wet foam was exposed to UV light for 10 minutes and then dried in the oven at 70 C for 16 hours. Images of the resulting dry foam are shown in FIGS. 21A-21B.

Example 8: Preparation of Load Bearing and Colored Capillary Foams

Liquid foams are two-phase systems in which a large volume of gas is dispersed as bubbles in a continuous liquid phase. These foams are ubiquitous in nature. In addition, they are found in industrial applications, such as pharmaceutical formulation, food processing, wastewater treatment, construction, and cosmetics. Recently, we reported a new type of foam material, capillary foam, which is stabilized by the synergistic action of particles and a small amount of an immiscible secondary liquid. In this study, we explore in more detail the foam preparation routes. To illustrate some of the potential applications, we create vividly colored wet and dried foams, which are difficult to prepare using traditional methods, and load-bearing porous solids. The combined action of particles and immiscible secondary fluid confers exceptional stability to capillary foams and many options for functionalization, suggesting a wide range of possible applications.

Materials

Polyvinyl chloride particles (Vinnolit SA1062/7, average particle size 14.8 μm, particle density 1.41 g/cm$_3$) were obtained from Vinnolit, Germany. The polyethylene (PE) particles were purchased from Polysciences, Inc. Trimethylolpropane trimethacrylate (TMPTMA) and sodium dodecyl sulfate (SDS) were purchased from Sigma-Aldrich, and benzoin isobutyl ether was purchased from TCI America. Nile Red, Allura Red, Oil Blue N, and FD&C Blue No. 1 dye were purchased from Sigma-Aldrich. Ultrapure water with a resistivity of 18.2 MΩ·cm (Barnstead) was used as the bulk phases of the foams in this study.

Figure 22:
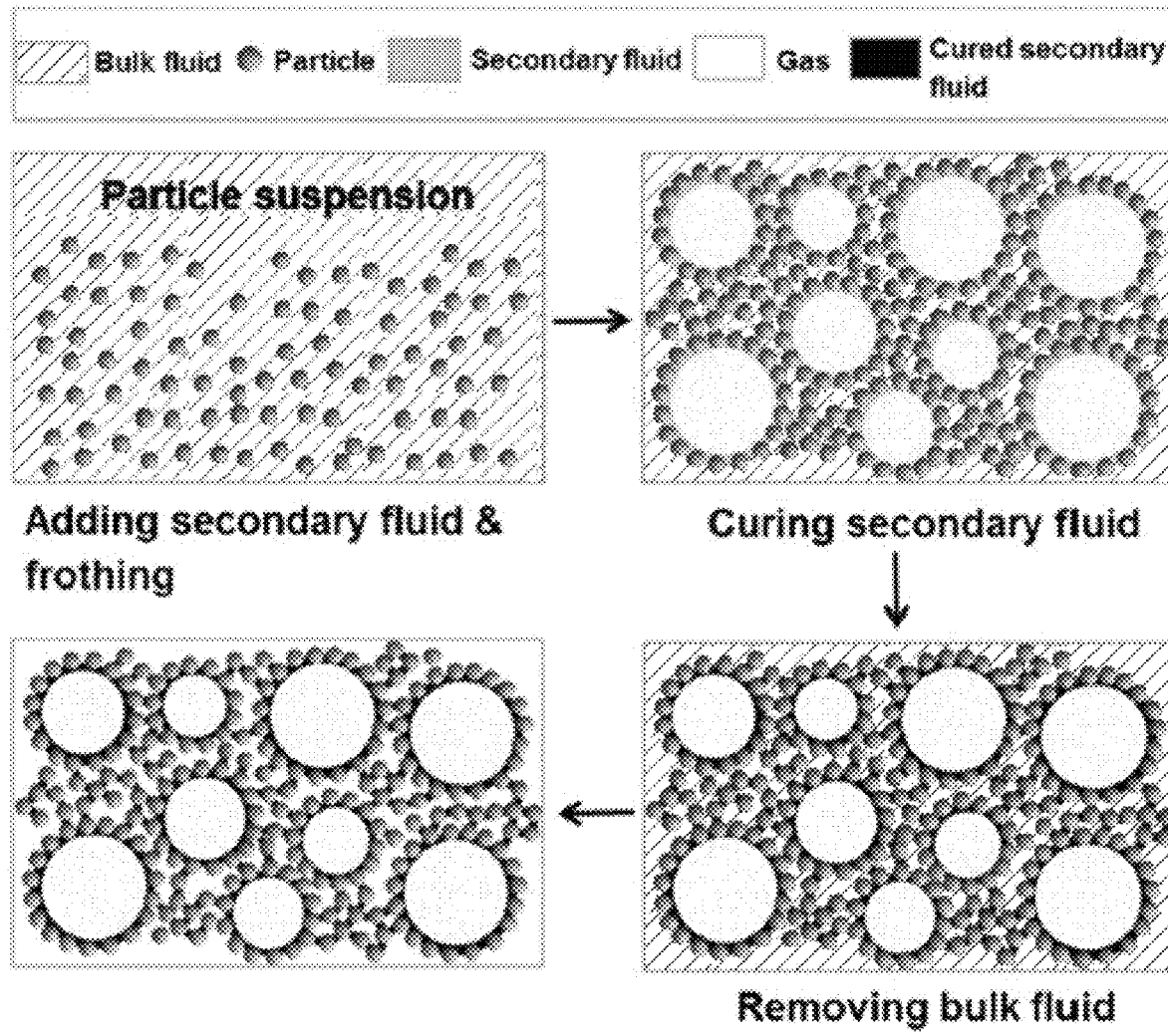
FIG. 22 shows processing steps for an exemplary method for the preparation of load-bearing, lightweight, porous solids.

Preparation and Characterization of Load-Bearing, Light-Weight, Porous Materials The main processing steps can be summarized as the dispersion of particles, the introduction of secondary fluid and gas bubbles, and the solidification and drying of foams (as shown in FIG. 22 (1) A suspension of particles in water as the primary liquid was obtained by dispersing the initially dried particles with the help of sonication. (2) A small amount (0.14-6%) of immiscible secondary fluid (the mass percentage of secondary fluid is with respect to water bulk in this study, unless otherwise noted) was added to the resulting particle suspension and frothed using a rotor-stator homogenizer (IKA UltraTurrax T10, stator diameter of 8 mm and rotor diameter of 6.1 mm) at 30 000 rpm or a hand mixer (Rival 5-Speed Hand Mixer) at the maximum speed. The TMPTMA was treated with Al$_2$O$_3$ to remove inhibitor and enriched with 6 wt % of the photoinitiator benzoin isobutyl ether. (3) The wet foam containing TMPTMA was cured by exposure to UV light (SpectroLine Longlife Filter, wavelength 365 nm) and then dried in an atmospheric oven (Fisher Scientific Co.) at 70° C.

The porosity (e) of dried foam was calculated by using ε=1−($ρ_b$/$ρ_p$), where $ρ_b$ is the bulk density of the foams and $ρ_p$ is the particle density. The $ρ_b$ of foam was calculated by measuring sample mass and volume.

Preparation and Characterization of Colored Foams

Colored foams stabilized by SDS surfactant were formed by hand-shaking the water dispersion of surfactant and dye 20 times. Colored particle-stabilized foams (Pickering foam) were prepared by frothing a suspension of particles and dissolved dye using a rotor-stator homogenizer (IKA Ultra-Turrax T10, stator diameter of 8 mm and rotor diameter of 6.1 mm, 30 000 rpm). For the preparation of colored capillary foams, a suspension of particles in water was obtained by dispersing the particles via sonication, and then the dye solution, consisting of dye dissolved in the oil phase, was added. The resulting suspension was frothed using a rotor-stator homogenizer (IKA UltraTurrax T10, with a stator diameter of 8 mm, and a rotor diameter of 6.1 mm) at 30 000 rpm. The wet foam was characterized using a Zeiss LSM 510 VIS confocal microscope (excitation at 543 nm and emission above 560 nm).

Spectral Acquisition of Foam Area Using Hyperspectral Technology.

The foams were collected from each sample using a small, clean metal spatula and placed on a microscope slide, covering about a 0.5×0.5 mm$^2$ area (with no coverslip). Using a PARISS hyperspectral imaging system (LightForm, Inc., Asheville, N.C.), the color (in specular reflectance mode) of each foam was acquired under a Nikon 80i microscope outfitted with a monochrome Retiga 2000DC CCD camera (QImaging). Wavelength calibration was performed with a MIDL Hg$^+$Ar$^+$ emission lamp (LightForm, Inc.), and accuracy was recorded and verified to be better than 2 nm using a 50 μm slit. To avoid heterogeneity of data due to complex surface geometry, a lack of plane focus, and sometimes movement of the foam, only one snapshot of spectral acquisition was done (taking less than 30 ms), covering a 5×0.005 mm2 line across the foam surface, with a 10× objective. All spectra (ranging from 400 to 900 nm) from one individual sample (line) showing >99% closeness of fit were identified by one or two single representative spectra. Percent reflectance was calculated by dividing the sample spectra by that of a silver mirror reference standard with optimal reflectance in the range of visible wavelengths (Thorlabs, Newton, N.J.).

Optical Density Acquisition of Bulk Liquid of Foam

Bulk liquid aliquots (200 μL) from each sample were placed in wells of a UV transparent 96-well plate (Corning Costar). Each well was scanned for optical density (percent transmittance) using a Spectramax 13 (Molecular Devices, Sunnyvale, Calif.), with a 1 nm incremental step from 230 to 930 nm.

Results and Discussion

Water-Based Capillary Foams can be Prepared by Introducing Air and Oil Simultaneously or by Either Frothing a Capillary Suspension or Mixing Oil into a Pickering Foam.

Starting with 10 wt % PE particle suspension, mechanical frothing produced PE particle-stabilized foam. To study the possible routes of preparing capillary foams, we prepared foams by (1) introducing air bubbles and TMPTMA simultaneously into the PE particle suspension in which 2 wt % TMPTMA was initially added to the container of the suspension and then introduced to the whole suspension simultaneously with air bubbles by mechanical frothing, (2) mechanically frothing a capillary suspension, and (3) introducing TMPTMA to a PE particle-stabilized foam in which 2 wt % TMPTMA was added and the mixture was frothed again. For the dried capillary suspension and foams, the secondary fluid was first solidified by photopolymerization, and then the water was removed by drying. It is known that photopolymerization of TMPTMA films already yields a solidlike gel at a conversion degree of only 3-4% (Ding, Ph.D. Dissertation, Chemnitz University of Technology, Chemnitz, Germany, 2007). As a conversion of only a few percent does not substantially change the polarity of the organic liquid, it is assumed that its contact angles and three-dimensional structure are retained at this point and remain unchanged as conversion proceeds further in the now solidified oil. Solidified TMPTMA spreads around gas bubbles and connects the particles in the bulk water phase and are taken to reflect the structure in the liquid state prior to TMPTMA polymerization. Both particles and a thin oil film adsorb on the bubble surface, and therefore, capillary foams were formed. We can conclude that capillary foams can be prepared through multiple routes.

Figure 23:
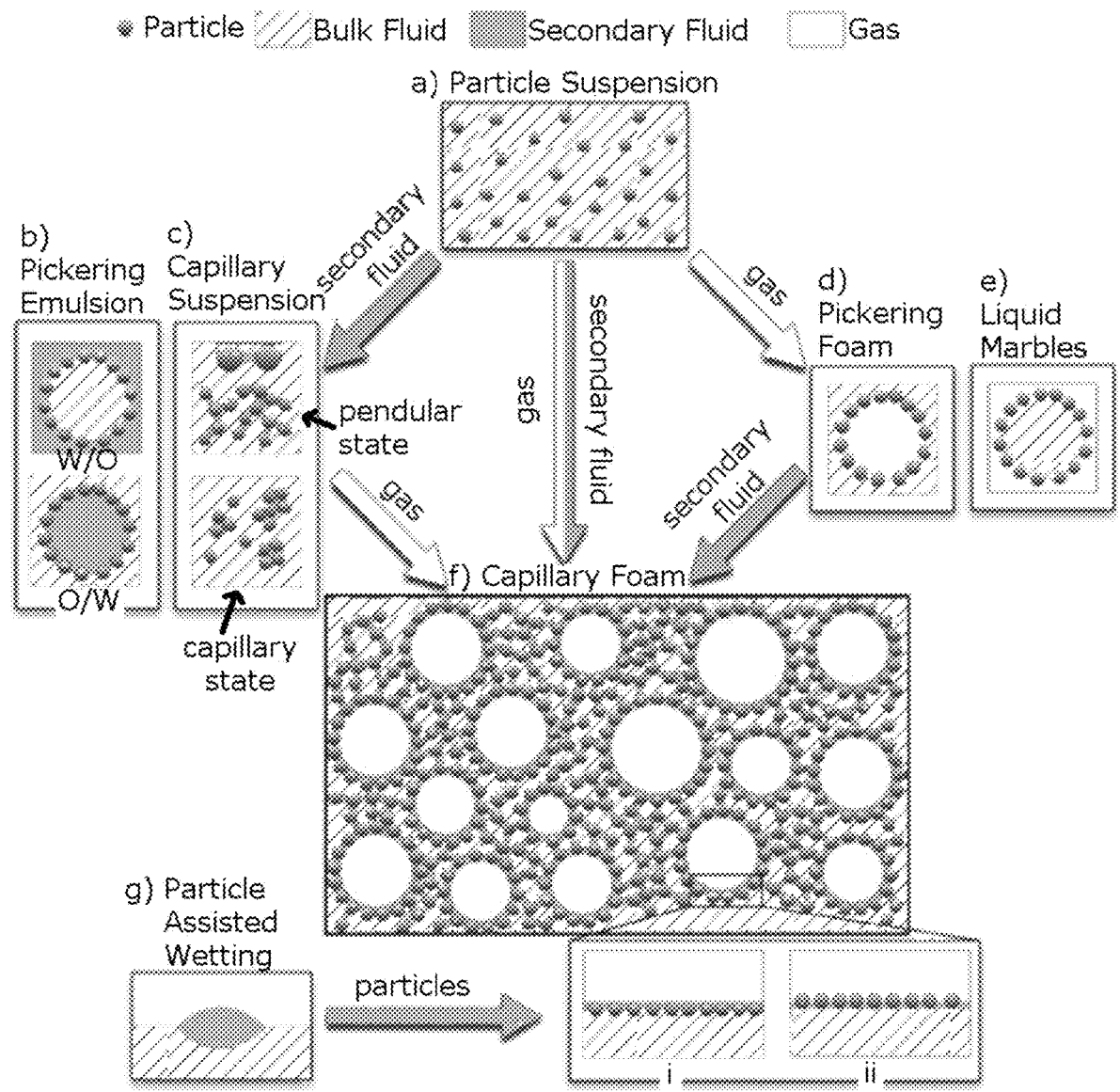
FIG. 23 shows an exemplary method of how multiphase colloidal systems are prepared from particle dispersions. Particle suspensions (a) are the starting point. Suspension mixing with a large amount of secondary liquid can result in "Pickering emulsion" drops of oil-in-water or water-in-oil stabilized with hydrophilic or hydrophobic particles, respectively (b). Mixing with a small amount of secondary liquid can result in the formation of a capillary suspension, in which particles are connected by bridges of secondary liquid (forming either "pendular" menisci between particle pairs or the center of "capillary" agglomerates, depending on which liquid wets the particles preferentially) (c). Suspension mixing with a gas phase can lead to "armored bubbles" (particle-stabilized bubbles that connect, at high concentration, forming a "Pickering foam") (d) or to "liquid marbles" (particle stabilized droplets in air) (e), depending on the particle wettability. In capillary foams, suspension particles and the secondary liquid jointly adsorb at the interface of the gas bubbles with the primary liquid (f). The decorated bubbles are further entrapped in a network of excess particles in the primary liquid bridged by a secondary liquid. Particles adsorbing preferentially at the interface of the secondary liquid can mediate the spread of the secondary liquid film around the gas bubbles, which is directly analogous to the "particle-assisted wetting" of a macroscopic air-water interface by a drop of oil (g). Depending on their wetting properties, the particles can adsorb at the oil-water interface (i) or the oil-air interface (ii).

FIG. 23 illustrates the connection between capillary foams and other colloidal multiphase systems, such as capillary suspensions or Pickering foams, and that the latter can be intermediates in the preparation of capillary foams. It would nonetheless be wrong to think of capillary foams simply as a Pickering foam with some added oil or as a capillary dispersion with some added gas bubbles: some particles suitable for capillary foams simply do stabilize an intermediate Pickering foam, and the ones that do require a major rearrangement, as oil adsorbs at the previously particle stabilized air-water interface. Similarly, the bubbles added to a capillary dispersion do not simply become entrapped in the existing particle network but also get "coated" via joint adsorption of oil and particles, and as shown previously, the formation of a capillary network is not sufficient to stabilize capillary foams (Zhang, et al., Angew. Chem. Int. Ed. 2014, 126, 13603-13607).

Load-Bearing, Lightweight, Moldable, Porous, Solid Foams

Mold-casting, which is widely used in fabrication processes, is inexpensive and easy to control. To show that capillary foams are in principle amenable to this technique, we prepared wet capillary foams as described before and transferred them into different simple molds by hand, cured them under UV light, and then dried them in an oven at 70° C. overnight. Capillary foams can be molded into various shapes, and the moldability supports the application of these foams as materials for various applications.

In capillary foams, particles and an oil film jointly adsorb on the bubble surface, and the resulting mixed particle/oil coated bubbles are entrapped in a network of excess particles connected by bridges of oil (Zhang, et al., Angew. Chem. Int. Ed. 2014, 126, 13603-13607). Dried capillary foam consists of pores originating from the original gas bubbles and the interparticle spaces in the initially liquid part of the foam. Because the walls of such dry foams consist of a porous (particle) network, these foams can achieve high overall porosity and low mass density. Moreover, the secondary liquid originally connecting the particles reinforces the particle network, enhancing its mechanical strength. For example, it is possible to solidify the secondary liquid prior to the removal of the primary liquid, thereby avoiding the need to apply high-temperature thermal sintering that is often used to enhance the mechanical properties of porous solids prepared from particles (Gonzenbach, et al., J. Am. Chem. Soc. 2007, 90, 16-22; Studart, et al., J. Mater. Chem. 2007, 17, 3283-3289). Dried capillary foams, show promise as lightweight, load-bearing, functional materials. In this case, the secondary liquid TMPTMA was solidified by UV-initiated polymerization prior to removal of the bulk water (Xu, et al., Langmuir 2003, 19, 4950-4952; Ding, et al., J. Am. Chem. Soc. 2006, 128, 4930-4931) We expect that the optimization of foam mechanical properties can be attained through the adjustment of preparation and drying conditions, as well as through alternative methods of solidifying the secondary fluid. Similarly, it is conceivable that properties can be tuned for use in thermal and acoustic insulation, packaging, transportation, shock absorption, and tissue scaffolding. Although the adaptation of capillary foams for a particular use is beyond the scope of this study, we anticipate that this new type of foam material will be a robust subject for future application-oriented research.

Figure 24:
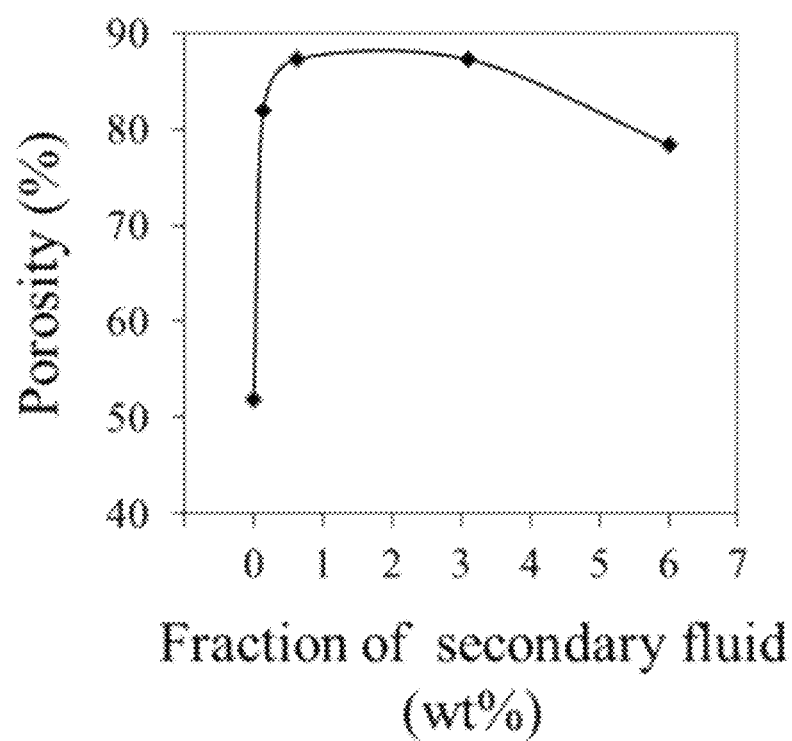
FIG. 24 is a graph of the variation in porosity with the amount of secondary fluid phase for prepared porous solids from capillary foam.

We investigated the effect of the amount of secondary fluid on the porosity of dried capillary foams and found a dramatic dependence of porosity on the concentration of added secondary liquid. FIG. 24 shows the porosity of materials with an initial PVC 1062/7 particle loading of 10 vol % and various amounts of TMPTMA. As the fraction of secondary fluid increased, porosity first increased rapidly and then reached a plateau of 87.3%. (The corresponding mass density of foams initially decreased from 0.68 g/cm$^3$ and then reached a plateau of 0.18 g/cm$^3$.) However, porosity began to decrease to 78.37% (mass density 0.30 g/cm$^3$) at 3.09 wt % oil concentration. The increase of porosity at low oil concentration is caused by the incorporation of (oil- and particle-coated) gas bubbles into a tenuous network of particles stabilized by oil bridges. The decrease of porosity at high oil concentration may be attributed to the reduction of the volume of particle networks caused by the formation of larger number of attractive capillary bridges, resulting in a denser particle network in the suspension. In all cases, the porosity is higher than both that of the corresponding Pickering foam without secondary fluid and that of capillary suspensions without introduction of gas bubbles (Dittman, et al., *J. Am. Chem. Soc.* 2013, 96, 391-397; Dittman, et al., *J. Am. Chem. Soc.* 2014, 97, 3787-3792).

Intensely Colored Capillary Foam

Figures 25A, 25B, 25C, 25D:
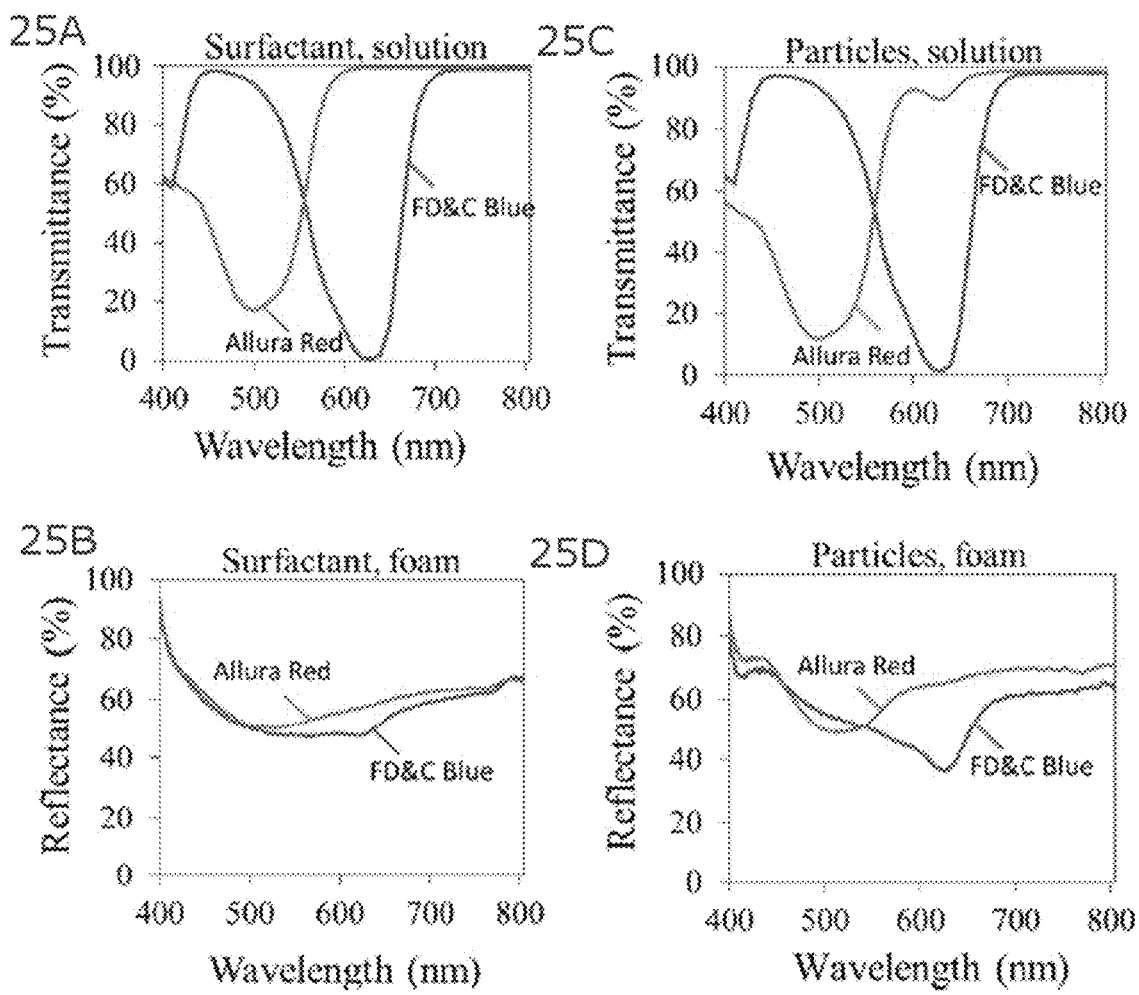
FIGS. 25A-25D show transmittance (FIGS. 25A-25B) and reflectance (FIGS. 25C-25D) spectra of colored foams formed by traditional foaming methods. The foams include 0.05 wt % SDS surfactant colored by 0.003 wt % Allura red or FD&C Blue No. 1 (FIG. 25A and FIG. 25C) and foams stabilized by 7.41 wt % PE particles and colored by 0.0028 wt % Allura red or FD&C Blue No. 1 (FIG. 25B and FIG. 25D).

Aqueous foams are inherently unstable. Their instability arises from the large gas-water interfacial energy, which the foam systems tend to reduce by decreasing the total interfacial area via bubble coalescence and Ostwald ripening. Surfactant, such as SDS, is typically added to reduce interfacial energy by its adsorption at the air-water interface. Although an intense color was observed in the bottom solution, weak coloration was observed in the foam phase. The color intensity of the bulk liquid phase was determined by transmitted light spectrometry. Measuring the color intensity of the foam phase by using transmitted light spectrometry is difficult due to the diffusion and scattering of incident light in foams (Kim, et al., *J. Mater. Chem.* 2009, 19, 7043-7049). The color intensities of foams were measured by using hyperspectral imaging in reflectance mode. Quantitative analysis of the color intensity of dyes in the bulk liquid and foam phase is shown in FIGS. 25A-25B, which demonstrate the strong absorbance in bulk liquid and weak reflectance for the foams at wavelengths of 500 and 630 nm. It appears that the majority of dye is concentrated in the bulk solution rather than in the thin films between the bubbles, as is observed qualitatively in the images. This appearance is typical of surfactant-stabilized foams made from colored liquids (Kim, et al., *J. Mater. Chem.* 2009, 19, 7043-7049).

Foam bubbles can alternatively be stabilized by colloidal particles, and the resulting foams are often called "Pickering foams". Colored Pickering foams demonstrated intense coloration in the bulk liquid phase and weak coloration of the foam areas. FIGS. 25C-25D quantify this with strong absorbance for the bulk liquid phase but weak reflectance for foams at wavelengths of 500 and 630 nm. The majority of colorants are concentrated in the bulk solution. The color intensity of the very thin films between the bubbles is insufficient to impart intense color to the foam. Kim and co-workers reported a method of imparting intense color to foams stabilized with cellulose particles in which the dye was embedded in the particles during the synthesis process (Kim, et al., *J. Mater. Chem.* 2009, 19, 7043-7049). However, it is not straightforward to dye many of the particles used to stabilize foams in industry, for example, silica and alumina particles.

Figure 26:
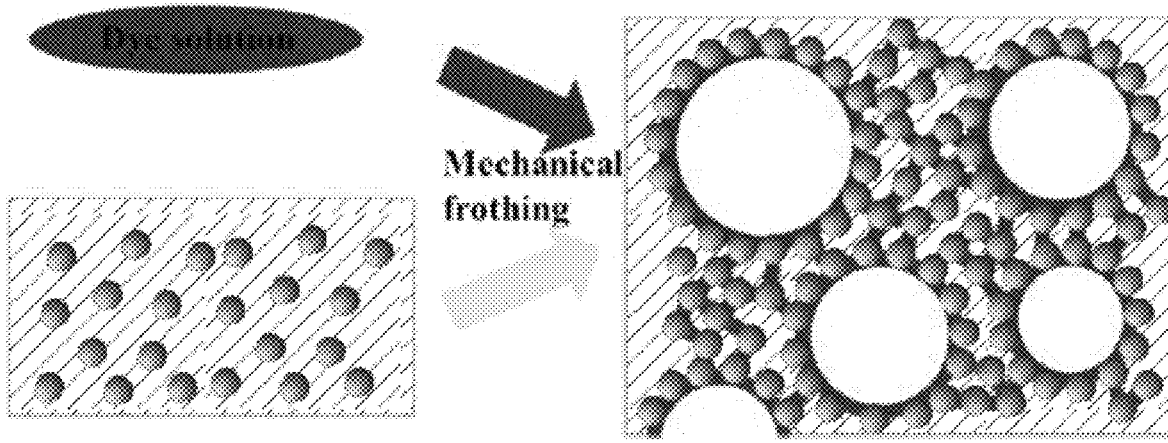
FIG. 26 shows a schematic of one exemplary method of forming a colored capillary foam. The dye is dissolved in the secondary fluid. During the foaming process, dyes absorb onto the bubble surfaces, and they are bridged by particles in the region between bubbles.
Figure 27A:
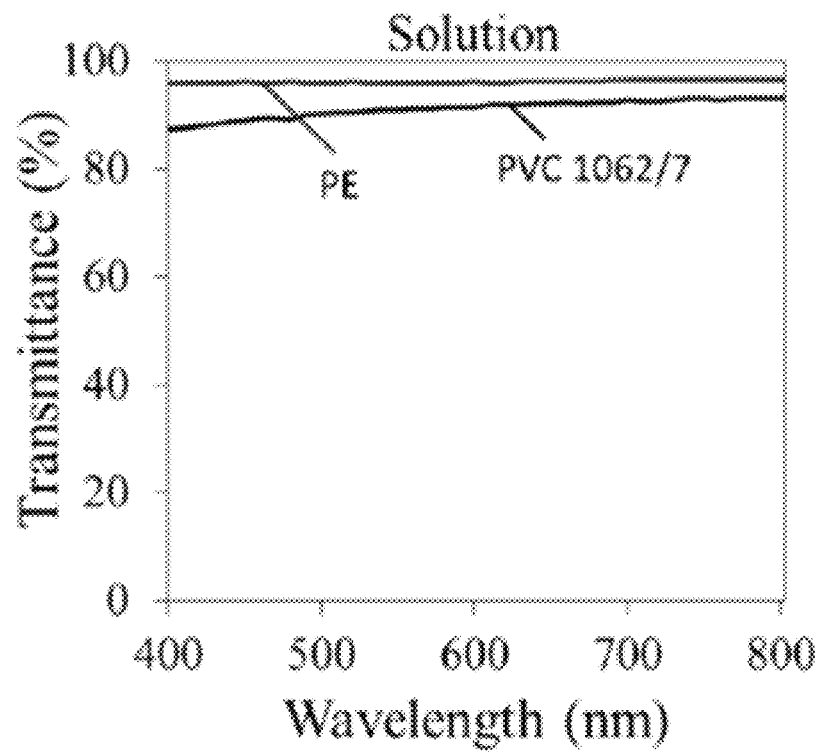
FIGS. 27A-27B show transmittance (FIG. 27A) and reflectance (FIG. 27B) spectra of intensely colored capillary foams produced according to the method in FIG. 26 and stabilized by 2 wt % dye solution (0.37 mg Nile Red dissolved in TMPTMA) and either 7.41 wt % PE particles or PVC 1062/7 particles.
Figure 27B:
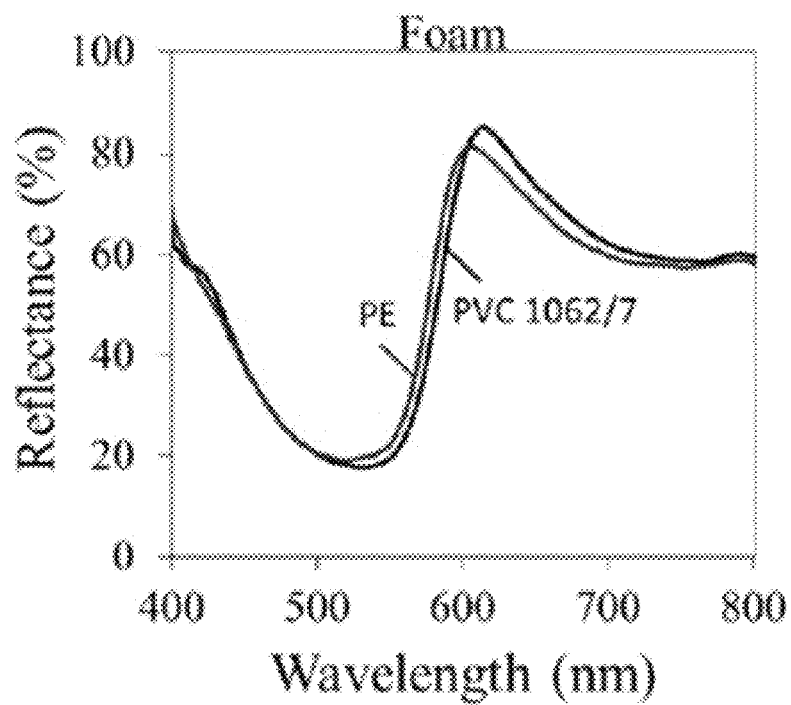

The utilization of both particles and an oil phase in the capillary foams described above suggests an alternative method for incorporating a dye into the thin liquid films surrounding foam bubbles. To demonstrate this principle, described schematically in FIG. 26, particles were dispersed in the water and the dye was dissolved in the oil phase, the oil-based dye solution was added to the aqueous dispersion and the mixture was frothed. On the basis of our previous study, we expect that the particles facilitate spreading of oil-dye solution bubbles, the particles are expected to be bridged by the dye solution. FIGS. 27A-27B quantitatively demonstrate the weak absorbance for the liquid phase and strong reflectance for the foam phase. In addition, the particles between the bubbles are connected by oil bridges. Therefore, the colorant is concentrated both on the bubble surfaces and in the liquid films between the bubbles.

Figure 28:
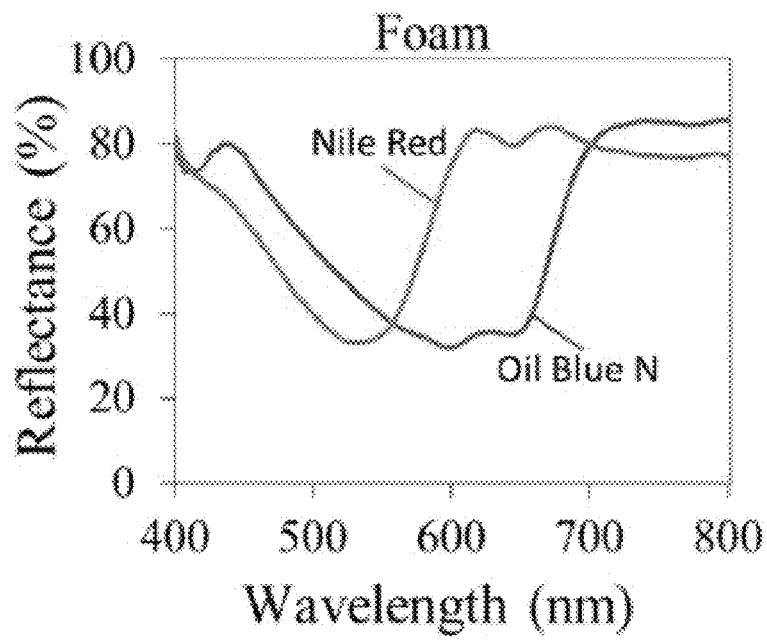
FIG. 28 shows reflectance spectra of dried capillary foams stabilized by the synergistic action of 18.5 vol % PVC 1062/7 particles and 4 wt % TMPTMA(1.5 mg of Nile Red dissolved in 2 g of TMPTMA) and 10 vol % PVC 1062/7 particles and 5 wt % TMPTMA (10.2 mg Oil Blue N dissolved in 2 g of TMPTMA).
Figures 29A, 29B, 29C, 29D, 29E:
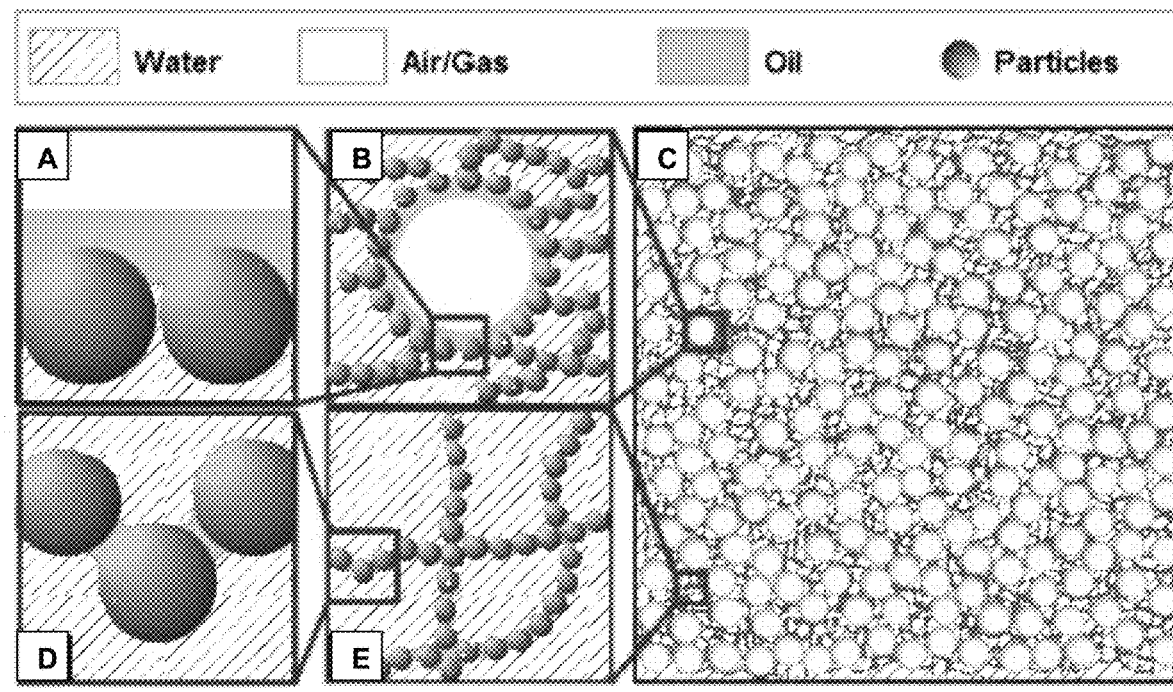
FIGS. 29A-29E show an illustration of the internal structure of a bulk capillary foam (not confined to a pore). The foam bubbles (FIGS. 29A-29B) are coated by a layer of oil and adsorbed colloidal particles that jointly stabilize the bubbles. Excess particles in the water between the coated bubbles are connected by oil bridges and held together by capillary forces (FIGS. 29C-29D). Together, the oil-coated bubbles and oil-bridged particles form a network (FIG. 29E).
Figure 30:
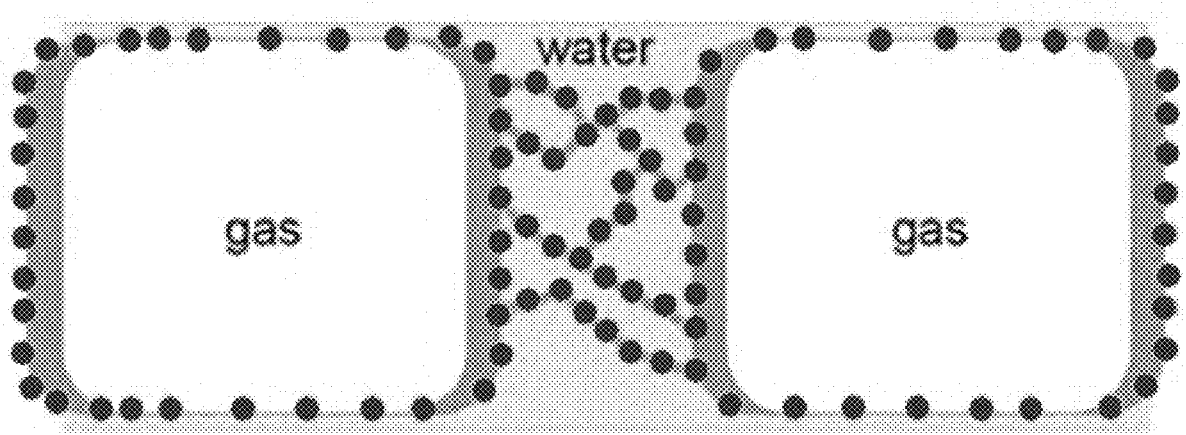
FIG. 30 shows a schematic of lamellar flow within a pore for a particle- and oil-coated capillary foam and surfactant (standard) foam. Note network of oil-bridged particles spanning gas bubbles in the capillary foam.
Figure 30:
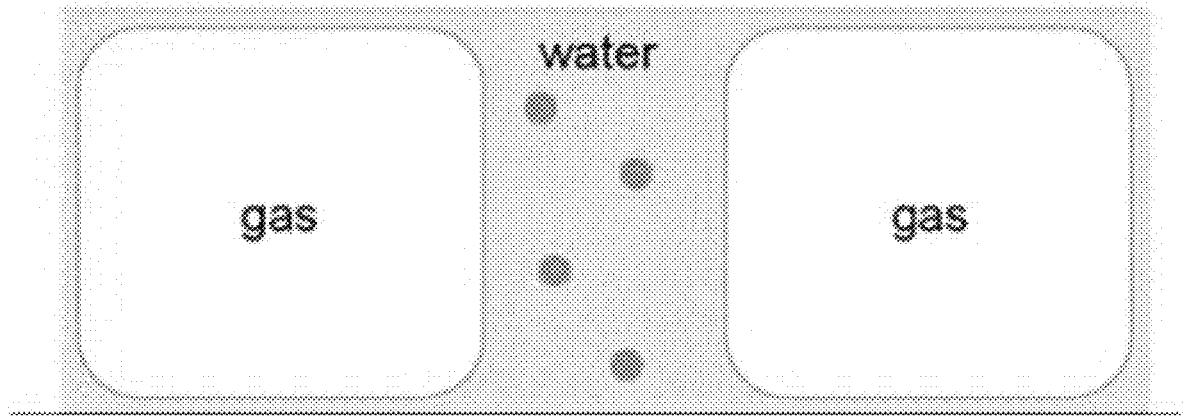
Figure 31:
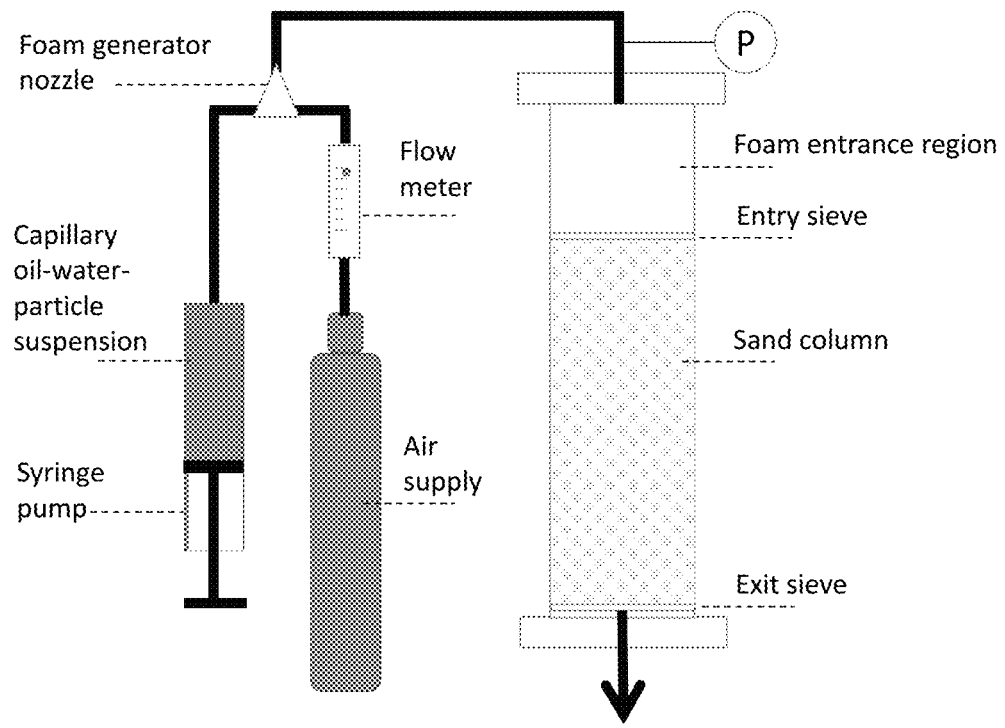
FIG. 31 shows a schematic (not to scale) of sand column apparatus having an acrylic cylindrical column, connection tubing, air supply, syringe pump for capillary suspension, foam generator, and pressure indicator.
Figure 32:
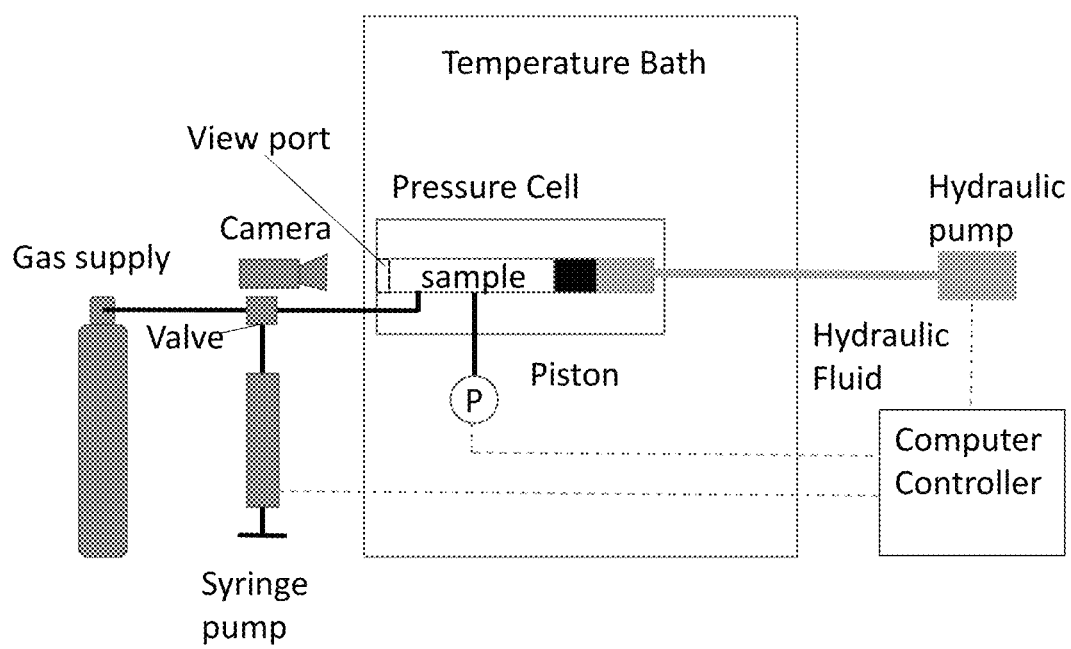
FIG. 32 shows a schematic of computer-controlled high-pressure P, V, T controlled phase observation system.

Capillary foam retained its intense coloration even after drying. FIG. 28 shows that the dried color foam retained its strong reflectance. By contrast, the corresponding wet foams stabilized by surfactant or by particles did not yield intensely colored dried foams. The surfactant-stabilized colored foams coalesced and fully disintegrated during the drying process. For particle-stabilized colored foams, dyes concentrated on the external surfaces rather than within the interior of the dried foam.

Conclusion

In this example, we demonstrate that capillary foams can be prepared either by introducing air and oil simultaneously to a particle suspension, by frothing a capillary suspension, or by mixing oil into a Pickering foam. In addition, capillary foams provide a general, processing route for preparing load-bearing porous solids and intensely colored liquid or solid dried foams. Porous solids formed from capillary foams have porosity on different length scales originating from the original gas bubbles and the particle network in the original liquid phase. Moreover, the secondary liquid originally connecting the particles in the wet foam could be polymerized to further reinforce the particle network before removal of the primary liquid. We also successfully prepared intensely colored liquid and dried foams by introducing an oil-based dye solution and gas bubbles to an aqueous particle suspension. Capillary foams retained their intense coloration even after drying, whereas foams stabilized by surfactant or particles did not allow for intense coloring in either the wet or dry state. Clearly, the presence of the minority liquid phase in capillary foams gives rise to many new opportunities for foam processing.

Example 9: Oil-Tolerant Foams for Enhanced Oil Recovery from Porous Media

This example presents surfactant-free and oil-tolerant foams that can dramatically increase the efficiency of enhanced oil recovery (EOR) of hydrocarbons from porous media. The new approach will utilize a recently-discovered ultrastable class of oil-containing foam, called capillary foam in which gas bubbles are stabilized by the synergistic action of oil and colloidal particles (Zhang, et al., *Langmuir* 2015, 31:9, 2669-2676; Zhang, et al., *Angew. Chem. Int. Ed.* 2014, 53:49, 13385-13389).

Results

The results presented in this example support the feasibility of the capillary foam oil recovery methods. After crude oil is added to the top of the foam, the surfactant foam quickly collapses and is completely gone within 12 h. In contrast, the CF remains stable to exposure to the same amount of crude oil. In this example, the CF was formed from deionized water, air, commercial poly(vinyl chloride) colloidal particles, and a polar oil similar to those outlined in a recent publication (Zhang, et al., *Angew. Chem. Int. Ed.* 2014, 53:49, 13385-13389) The crude oil was obtained from Sigma Aldrich. CFs respond to different volumes of crude oil under exposure to elevated temperatures. Even when the ratio of oil to water increases to 1:9 (the 1 ml crude oil), the CF remains stable and approximately the same volume after 72 h of exposure to 60° C. It is apparent that the crude oil has begun to drain into the CF at elevated temperature, but that the foam supports the presence of oil. This is due to the synergistic action of particles that support oil spreading at the air-water interface. Tunable rheology of capillary foams is possible by adjustment of the particle loading. These CFs, formed from silica, water, air and polar oil, transition from a fluid state at low particle loadings (20 wt %) to a gelled state upon increasing particle loading beyond ~30 wt %. Finally, CFs can be formed by using crude oil itself as the oil phase (without adding an additional hydrocarbon), by using partially hydrophobized silica particles, water, and air as the gas phase. A small amount of frothing was accomplished with a lab-scale mixer to incorporate the gas phase.

The device provided can be used for surfactant-free technology for improved containment and recovery of deep well marine oil spills and accompanying releases of gas. The new approach will utilize a recently-discovered ultra-stable class of oil-containing foam, called capillary foam, in which gas bubbles are stabilized by the synergistic action of oil and colloidal particles (Zhang, et al., *Angew Chem. Int. Ed.* 2014, 53: 13385-13389). A schematic of a capillary foam is shown in FIGS. 29A-29E.

The devices mitigate offshore oil spills through the flotation of oily bubbles and the formation of a capillary foam. The incorporation of the oil from a spill site in oil-coated bubbles or bubble agglomerates (foam floes). The coated bubbles and floes rise toward the ocean surface, entraining and combining with dispersed oil droplets and particulate matter in their path, and finally accumulating at the surface in the form of a capillary foam, which can be collected by skimming using conventional means and transferred onto vessels, where the foam can be decomposed into its constituents with a suitable defoaming agent. One possible embodiment of this is sketched in FIG. 33.

In the envisioned bubble flotation device, oil from the spill site is collected in the lower compartment (collector) of the device, which may resemble an inverted funnel (as shown in the figure) or a large bag that can be sealed around the oil source and that supports a somewhat elevated pressure controlled by a relief valve (not shown). In addition to the incoming oil, air is pumped into the collector and passes through a porous slab at the top end of the collector in the form of oil coated bubbles. These bubbles pass through a layer of colloidal particles dispensed onto the top surface of the porous slab (in the form of a concentrated slurry), and characterized by a high affinity for the oil-water interface. These particles adsorb to the rising oily bubbles, and promote bubble agglomeration into flocs of capillary foam, i.e. bubbles engulfed in a mixed coating of particles and oil that are connected via oil-bridged particles. Individual oily bubbles or bubble agglomerates rise toward the ocean surface, where they accumulate as a (capillary) foam, that can be removed mechanically from the water surface (by scooping, or pumping) and loaded onto vessel, where it can be collapsed and separated into its individual components through addition of defoamer. This strategy has a number of significant benefits:

1. In contrast to dispersed oil, the oil bound in a capillary foam can be removed from the water surface and recovered.
2. Oil spread around the air bubbles is transported toward the surface regions of the water column where bacterial degradation is most effective (Fingas, *Oil spill science and technology* 2011: Elsevier).
3. The large surface-to-volume ratio of a thin oil film surrounding an air bubble is also expected to facilitate biodegradation.
4. Oil released prior to the remediation effort and dispersed as droplets in the region above the spill site can be entrained or captured by collisions with the rising oily bubbles. It is well documented that (standard) "flotation is an efficient way to remove emulsified heavy oil from seawater" (Wang, *Colloid Chemistry-Based Principles and Solutions*, Somasundaran, et al., eds., 2014, Wiley: Hoboken, N.J.). On the other hand, it has been found that oil-coated bubbles provide superior performance in bitumen flotation used for processing oil sand ores, because the induction time for bubble bitumen attachment in the process tends to be much shorter for oil-coated bubbles than for "naked" air bubbles (Su, *Minerals Engineering*, 2010. 19:641-650).
5. The colloidal particles suitable for the proposed flotation method include environmentally benign, readily-available (mass-produced) particles such as partially-ydrophobized silica. There is a possibility that mineral fines in sea water will also aid in floatation.
6. In contrast to conventional surfactant-based foams, capillary foams are stable to the presence of oil (Zhang, et al., *Angew. Chem. Int. Ed.* 2014, 53, 13385-13389).
7. Any gases released along with the oil will be captured in the foam bubbles along with the air (or inert gas) pumped into the collector.
8. In principle, the principle slurry pumped into the device offers opportunities for the targeted delivery of oil-degrading microbes to the oil-water interface.

Containment of surface oil slicks by current technology calls for the rapid deployment of booms to confine the oil, followed by recovery using surface vessels equipped with skimming equipment (Ventikos, *Hazardous Materials* 2014, 107:51-58). Upon reaching the surface, the network of capillary-connected particles between bubbles will aid in the containment of oil and prevent spreading. The potential increases in viscosity as oil ages on the surface through evaporation and photo-oxidation may also act to increase the strength of these capillary networks. The capillary foam can be recovered from the surface with existing skimming or flotation technology. The weir-type skimmer, for example, would ideally be suited to collecting foam from the top surface, as the foam breaks up once entering the weir. Separation equipment typically on-board surface recovery vessels can be adapted to the problem of oil-water separation in capillary foams.

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

We claim:

1. A liquid foam comprising
a continuous liquid phase comprising a bulk fluid,
a discontinuous phase comprising a gas, wherein the discontinuous phase is dispersed within the continuous phase to form a plurality of bubbles having an interface between the continuous phase and the discontinuous phase,
a secondary fluid and a plurality of particles adsorbed at the interface between the continuous phase and the discontinuous phase,
wherein the particles form networks connected by capillary or pendular bridges of the secondary fluid that span the space between bubbles.

2. The liquid foam according to claim 1, wherein the bulk fluid is selected from the group consisting of water and other aqueous solutions, a C1-C5 alcohol, a C1-C5 glycol, a C1-C5 aminoalcohol, dimethyl sulfoxide, dimethylformamide, dimethylacetamide, dimethyl sulfone, sulfolane, and a mixture thereof.

3. The liquid foam according to claim 1, wherein the secondary fluid is selected from the group consisting of trimethylolpropane trimethacrylate (TMPTMA), diisonyl phthalate (DINP), paraffin, and a combination thereof.

4. The liquid foam according to claim 1, wherein the secondary fluid is selected from the group consisting of substituted and unsubstituted C12-C50 linear, branched, or cyclic alkanes; substituted and unsubstituted phenyl; and a combination thereof.

5. The liquid foam according to claim 1, wherein the secondary fluid comprises a photopolymerizable monomer, a cross-linkable monomer, or a combination thereof.

6. The liquid foam according to claim 1, wherein the secondary fluid is present in an amount from about 0.5 percent by weight to about 5 percent by weight based upon an entire weight of the bulk fluid.

7. The liquid foam according to claim 1, wherein the gas is selected from the group consisting of air, oxygen, nitrogen, carbon dioxide, helium, neon, argon, and a combination thereof.

8. The liquid foam according to claim 1, wherein the bubbles in the plurality of bubbles have an average diameter of about 10 μm to about 1000 μm.

9. The liquid foam according to claim 1, wherein the liquid foam is stable for a period of time from about 1 day to about 14 days.

10. The liquid foam according to claim 1, wherein the particles have an affinity for the interface between the secondary fluid and the gas that can be characterized by a contact angle from about 60° to about 120°.

11. The liquid foam according to claim 1, wherein the particles have an affinity for the interface between the secondary fluid and the bulk fluid that can be characterized by a contact angle from about 60° to about 120°.

12. The liquid foam according to claim 1, wherein the secondary fluid has an effective spreading coefficient in the liquid foam from about 5 mN m-1 to about 100 mN m-1.

13. The liquid foam according to claim 1, wherein the particles are present at a concentration from about 0.1 wt % to about 10 wt based upon an entire weight of the foam.

14. The liquid foam according to claim 1, wherein the particles are selected from the group consisting of polymer particles, metal particles, metal oxide particles, silica particles, and combinations thereof.

15. The liquid foam according to claim 1, wherein the particles comprise polymers selected from the group consisting of homo- and co-polymers prepared from vinyl or acrylic monomers, homo- and co-polymers prepared from olefinic monomers, homo- and co-polymers prepared from functional polyaddition or condensation, copolymers thereof, and blends thereof.

16. The liquid foam according to claim 1, wherein the particles comprise polymers selected from the group consisting of cellulose, chitin, starches and other polysaccharides, and derivatives thereof.

17. The liquid foam according to claim 1, wherein the particles have an average diameter from about 50 nm to about 1000 nm.

* * * * *